(12) United States Patent
Sako et al.

(10) Patent No.: US 7,855,743 B2
(45) Date of Patent: Dec. 21, 2010

(54) IMAGE CAPTURING AND DISPLAYING APPARATUS AND IMAGE CAPTURING AND DISPLAYING METHOD

(75) Inventors: Yoichiro Sako, Tokyo (JP); Masaaki Tsuruta, Tokyo (JP); Taiji Ito, Kanagawa (JP); Masamichi Asukai, Kanagawa (JP); Kan Ebisawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 609 days.

(21) Appl. No.: 11/843,284

(22) Filed: Aug. 22, 2007

(65) Prior Publication Data

US 2008/0062297 A1 Mar. 13, 2008

(30) Foreign Application Priority Data

Sep. 8, 2006 (JP) ............................. 2006-244685
Sep. 27, 2006 (JP) ............................. 2006-261975

(51) Int. Cl.
*H04N 5/222* (2006.01)
(52) U.S. Cl. ............................... 348/333.02; 348/222.1
(58) Field of Classification Search ............. 348/222.1, 348/333.01, 333.02, 345
See application file for complete search history.

(56) References Cited

U.S. PATENT DOCUMENTS

| 5,438,360 A | 8/1995 | Edwards |
| 5,623,703 A | 4/1997 | Takagi et al. |
| 5,905,525 A | 5/1999 | Ishibashi et al. |
| 5,978,015 A | 11/1999 | Ishibashi et al. |
| 6,091,546 A | 7/2000 | Spitzer |
| 6,268,885 B1 | 7/2001 | Ohta |
| 6,549,231 B1 * | 4/2003 | Matsui ..................... 348/61 |
| 6,558,050 B1 * | 5/2003 | Ishibashi ............ 348/333.03 |
| 7,183,909 B2 | 2/2007 | Miyajima |
| 2002/0085843 A1 * | 7/2002 | Mann ..................... 396/374 |
| 2002/0128541 A1 | 9/2002 | Kim et al. |
| 2003/0234885 A1 * | 12/2003 | Pilu ..................... 348/333.01 |
| 2004/0101178 A1 * | 5/2004 | Fedorovskaya et al. ..... 382/128 |
| 2004/0196399 A1 | 10/2004 | Stavely |

(Continued)

FOREIGN PATENT DOCUMENTS

CN 1605974 A 4/2005

(Continued)

OTHER PUBLICATIONS

U.S. Appl. No. 12/438,735, filed Feb. 25, 2009, Sako, et al.

*Primary Examiner*—Gevell Selby
(74) *Attorney, Agent, or Firm*—Oblon, Spivak, McClelland, Maier & Neustadt, L.L.P.

(57) ABSTRACT

An image capturing and displaying apparatus is disclosed. The image capturing and displaying apparatus includes an image capturing section, a display section, a user's information obtaining section, and a control section. The image capturing section captures an image such that a direction in which a user sees a subject is a direction of the subject. The display section is disposed in front of eyes of the user and displays the image captured by the image capturing section. The user's information obtaining section obtains information about a motion and a physical situation of the user. The control section controls an operation of the image capturing section or an operation of the display section corresponding to information obtained by the user's information obtaining section.

24 Claims, 30 Drawing Sheets

U.S. PATENT DOCUMENTS

| | | |
|---|---|---|
| 2004/0196400 A1 | 10/2004 | Stavely et al. |
| 2004/0236578 A1 | 11/2004 | Shields |
| 2005/0122405 A1 | 6/2005 | Voss et al. |
| 2005/0122407 A1 | 6/2005 | Kawai |
| 2005/0174470 A1* | 8/2005 | Yamasaki .................. 348/345 |
| 2005/0270399 A1 | 12/2005 | Kawaguchi et al. |
| 2006/0098087 A1 | 5/2006 | Brandt et al. |
| 2006/0125924 A1 | 6/2006 | Ing-Song et al. |

FOREIGN PATENT DOCUMENTS

| | | |
|---|---|---|
| DE | 197 48 372 A1 | 5/1999 |
| EP | 1 522 256 A1 | 4/2005 |
| GB | 2 389 761 A | 12/2003 |
| JP | 8-126031 | 5/1996 |
| JP | 9-27970 | 1/1997 |
| JP | 9-185009 | 7/1997 |
| JP | 2006-227236 | 8/2006 |
| WO | WO 00/33569 | 6/2000 |
| WO | WO 2005/071944 A1 | 8/2005 |

* cited by examiner

THROUGH STATE

NORMALLY CAPTURED IMAGE

TELESCOPIC IMAGE

THROUGH STATE

WIDE ANGLE ZOOM

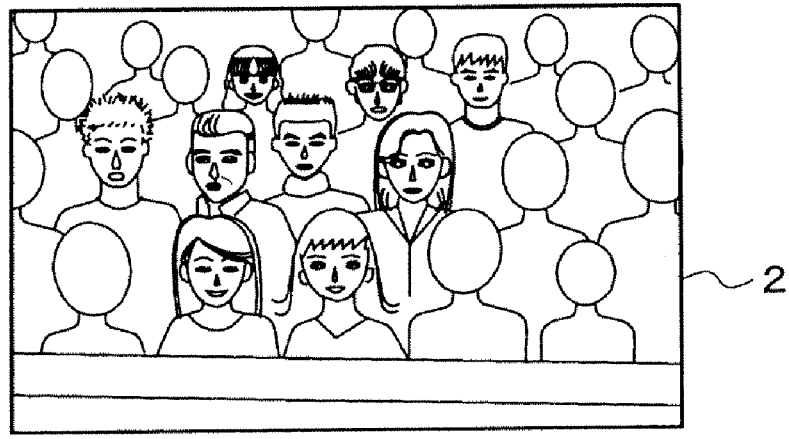
Fig. 5A  NORMALLY CAPTURED IMAGE OR THROUGH STATE
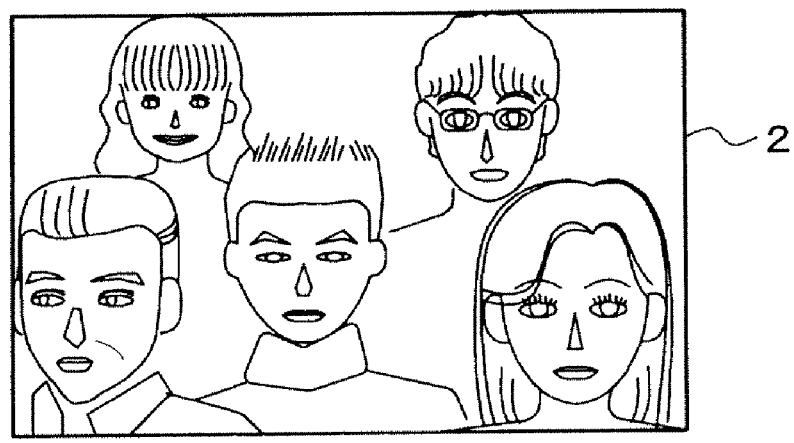
Fig. 5B  ENLARGED IMAGE

NORMALLY CAPTURED IMAGE
OR THROUGH STATE

ADJUSTED IMAGE

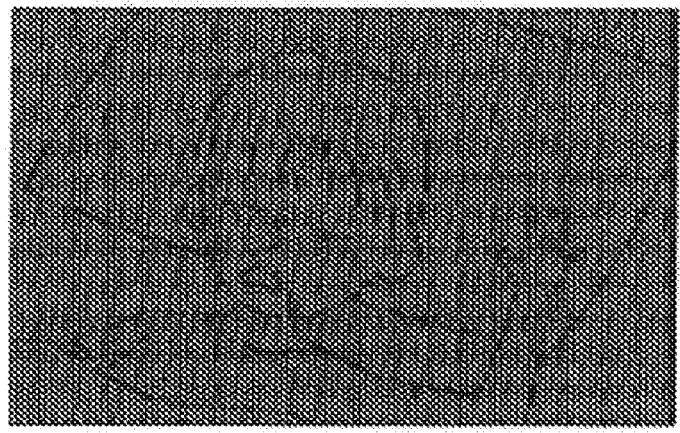
Fig. 7A  NORMALLY CAPTURED IMAGE OR THROUGH STATE
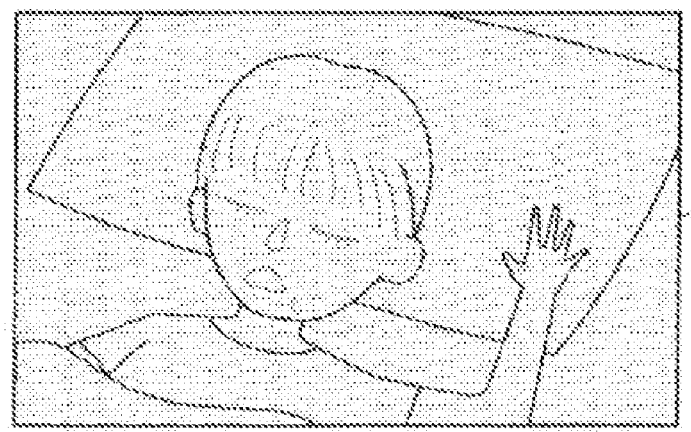
Fig. 7B  INCREASED INFRARED SENSITIVITY IMAGE CAPTURING SENSITIVITY

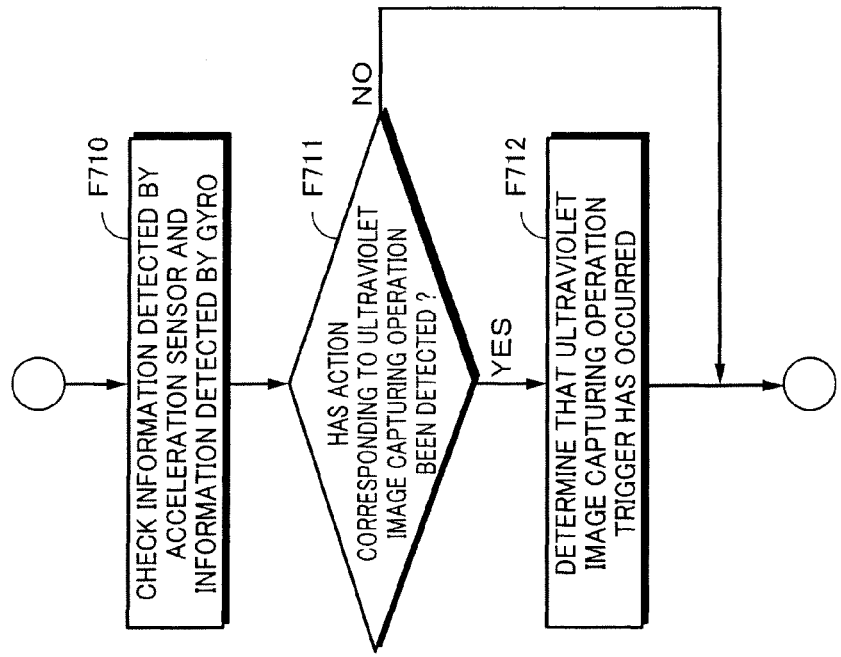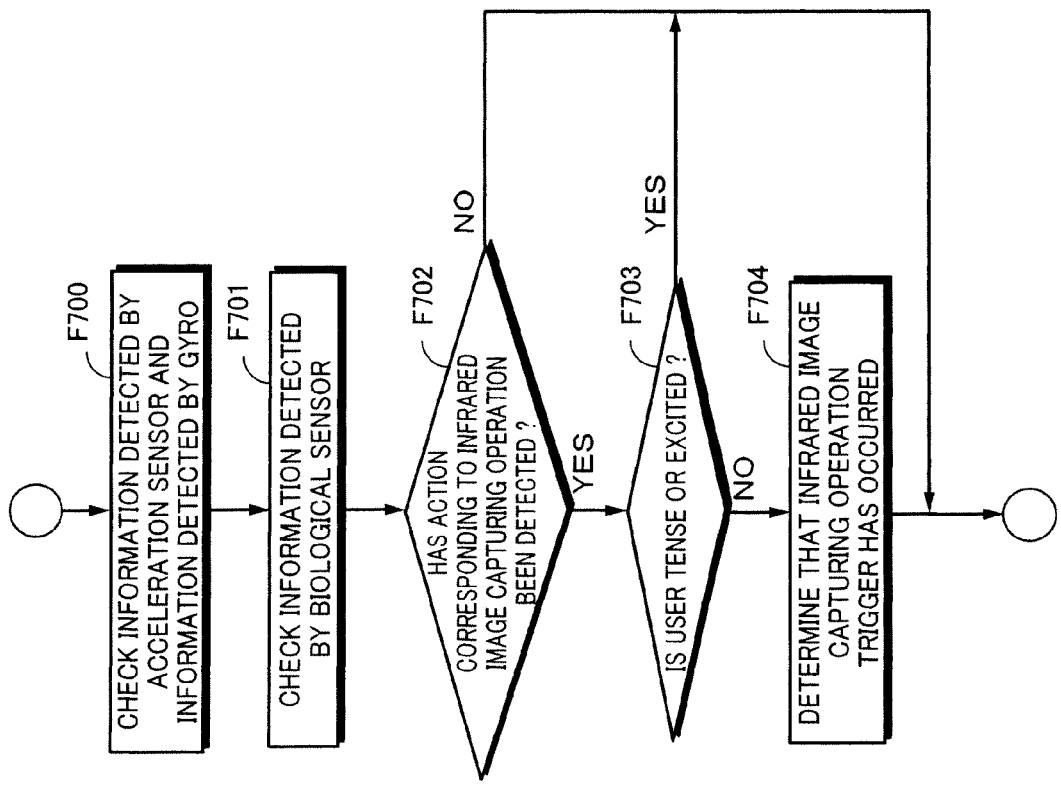

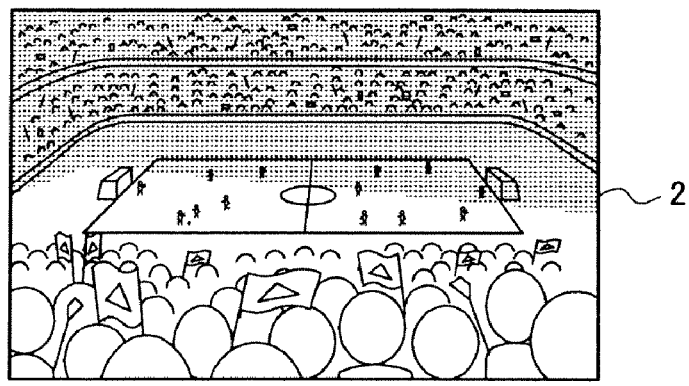
Fig. 21A  DISPLAY IMAGE IN WHICH THERE IS BOUNDARY OF SUNSHINE AND SHADOW
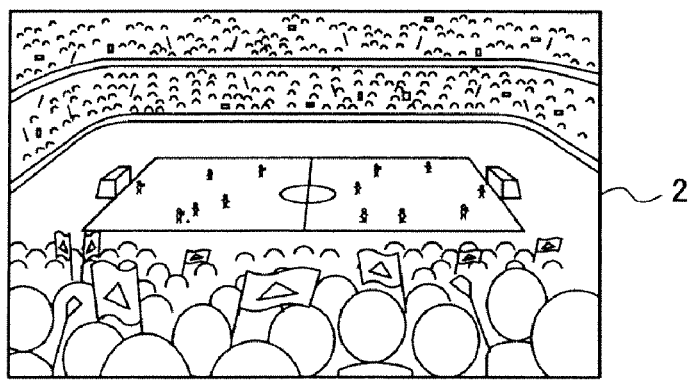
Fig. 21B  ADJUSTED DISPLAY IMAGE

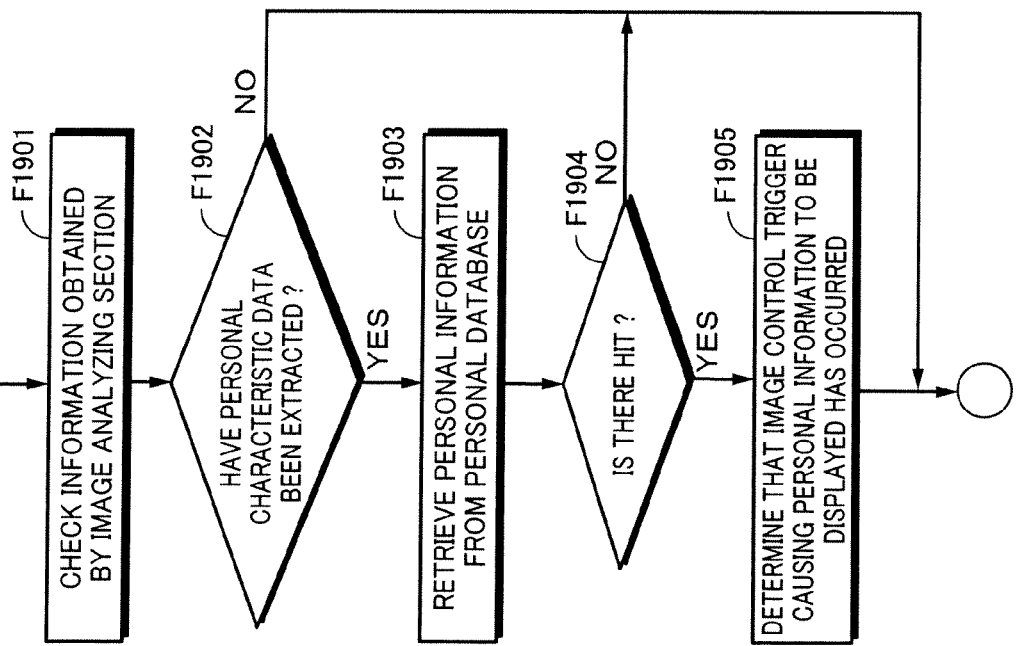
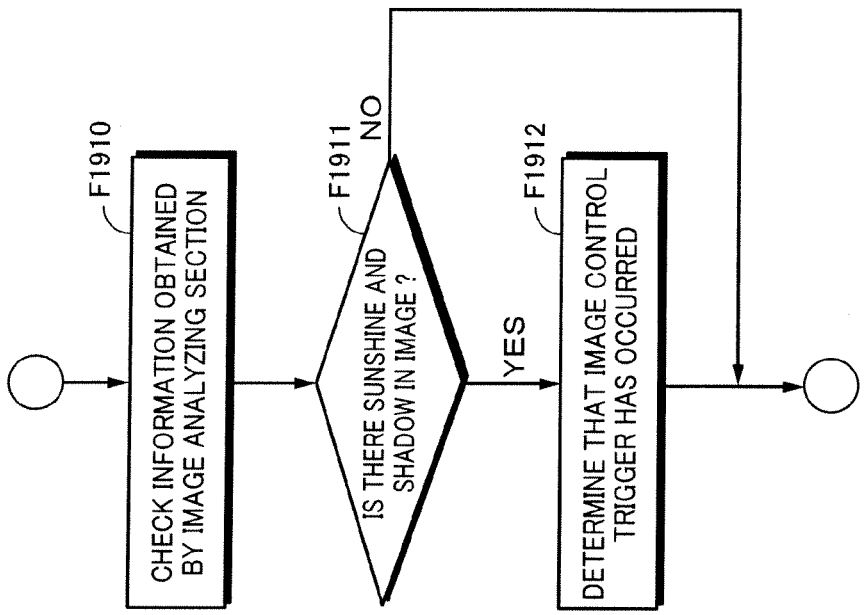
Fig. 30A
Fig. 30B

IMAGE CAPTURING AND DISPLAYING APPARATUS AND IMAGE CAPTURING AND DISPLAYING METHOD

CROSS REFERENCES TO RELATED APPLICATIONS

The present invention contains subject matter related to Japanese Patent Application No. 2006-244685 filed on Sep. 8, 2006 and Japanese Patent Application No. 2006-261975 filed on Sep. 27, 2007, the entire contents of which being incorporated herein by reference.

BACKGROUND OF THE INVENTION

1. Field of the Invention

The present invention relates to an image capturing and displaying apparatus and an image capturing and displaying method that are configured to capture an image of a subject in a user's visual direction as the direction of a subject and display a captured image in front of his or her eyes while he or she puts on the apparatus that is for example an eye-glass type mounting unit or a headgear type mounting unit.

2. Description of the Related Art

Many apparatus that use an eye-glass type mounting unit or a headgear type mounting unit having a display section that is disposed in front of user's eyes and that displays an image have been proposed for example in Japanese Patent Application Laid-Open Nos. HEI 8-126031, HEI 9-27970, and HEI 9-185009.

SUMMARY OF THE INVENTION

However, the apparatus of the related art do not control an image capturing operation and a display operation especially from points of view of an assistance of a user's visual sense and an extension of his or her visual ability.

In view of the foregoing, it would be desirable to assist user's eye sights and extend his or her visual ability. In addition, it would be desirable to properly control a display operation and an image capturing operation to assist user's eye sights and extend his or her visual ability corresponding to his or her situation (for example, wish, visual sense state, physical situation, and so forth). Moreover, it would be desirable to properly control a display operation and an image capturing operation to do those corresponding to an external situation (for example, surrounding environment, subject, date and time, location, and so forth).

According to an embodiment of the present invention, there is provided an image capturing and displaying apparatus. The image capturing and displaying apparatus includes an image capturing section, a display section, a user's information obtaining section, and a control section. The image capturing section captures an image such that a direction in which a user sees a subject is a direction of the subject. The display section is disposed in front of eyes of the user and displays the image captured by the image capturing section. The user's information obtaining section obtains information about a motion and a physical situation of the user. The control section controls an operation of the image capturing section or an operation of the display section corresponding to information obtained by the user's information obtaining section.

According to an embodiment of the present invention, there is provided an image capturing and displaying method of an image capturing and displaying apparatus. The image capturing and displaying apparatus includes an image capturing section and a display section. The image capturing section captures an image such that a direction in which a user sees a subject is a direction of the subject. The display section is disposed in front of the user and displays an image captured by the image capturing section. Information about a motion of the user or a physical situation of the user is obtained. An operation of the image capturing section or an operation of the display section is controlled corresponding to the obtained information.

According to an embodiment of the present invention, there is provided an image capturing and displaying apparatus. The image capturing and displaying apparatus includes an image capturing section, a display section, an external information obtaining section, and a control section. The image capturing section captures an image such that a direction in which a user sees a subject is a direction of the subject. The display section is disposed in front of eyes of the user and displays the image captured by the image capturing section. The external information obtaining section obtains external information. The control section controls an operation of the image capturing section or an operation of the display section corresponding to the information obtained by the external information obtaining section.

According to an embodiment of the present invention, there is provided an image capturing and displaying method of an image capturing and displaying apparatus. The image capturing and displaying apparatus includes an image capturing section and a display section. The image capturing section captures an image such that a direction in which a user sees a subject is a direction of the subject. The display section is disposed in front of the user and displays an image captured by the image capturing section. External information is obtained. An operation of the image capturing section or an operation of the display section is controlled corresponding to the obtained information.

According to an embodiment of the present invention, when the user puts on an image capturing and displaying apparatus for example an eye-glass type mounting unit or a headgear type mounting unit, the user sees the display section disposed in front of him or her. When the display section is caused to display an image captured by the image capturing section, the user can see a captured image of a scene in his or her normal visual direction with the display section.

In this case, although the user sees a scene in his or her normal visual direction through the image capturing and displaying apparatus of an embodiment of the present invention, he or she sees an image displayed on the display section as a scene in his or her normal visual scene. When the display mode of an image displayed on the display section is changed corresponding to a user's situation for example user's wish, eye sights, physical situation, and so forth, his or her visual ability can be assisted or extended.

When for example a telescopic image is displayed, the user can see a far scene that he or she is not able to normally see. While a user is reading a book or a newspaper with his or her weak-sighted eyes, if its characters are enlarged by the display section, he or she can clearly see them.

In other words, when the operations of the image capturing section and the display section and the display mode of the captured image are controlled corresponding to a user's situation, a visual situation in which the user feels comfortable can be provided.

According to an embodiment of the present invention, when the user puts on an image capturing and displaying apparatus that is for example an eye-glass type mounting unit or a headgear type mounting unit, the user sees the display section disposed in front of him or her. When the display section is caused to display an image captured by the image capturing section, the user can see a captured image of a scene in his or her normal visual direction with the display section.

In this case, although the user sees a scene in his or her normal visual direction through the image capturing and displaying apparatus of an embodiment of the present invention, he or she sees an image displayed on the display section as his or her normal visual scene. When the display mode of an image displayed on the display section is changed corresponding to an external situation for example surrounding environmental state, a situation of a subject, and so forth, his or her visual ability can be assisted or extended.

When for example a telescopic image is displayed, the user can see a far scene that he or she is not able to normally see. While a user is reading a book or a newspaper with his or her weak-sighted eyes, if its characters are enlarged and the brightness and contrast are adjusted by the display section, he or she can clearly see them.

In other words, when the operations of the image capturing section and the display section and the display mode of the captured image are controlled corresponding to external information, a visual situation in which the user feels comfortable or interesting can be provided to him or her.

According to an embodiment of the present invention, an image captured by the image capturing section, namely an image captured in a user's visual direction as the direction of a subject, is displayed by the display section disposed in front of him or her. When the operation of the image capturing section or the operation of the display section is controlled corresponding to a user's operation or information about his or her physical situation, his or her visual ability can be virtually assisted and extended.

Since the display mode is changed by controlling the image capturing section or the display section corresponding to a user's wish or situation determined corresponding to information that represents his or her motion or physical situation, no operational burden is imposed on him or her. In addition, since the image capturing section and the display section are properly controlled, the image capturing and displaying apparatus has high user-friendliness.

In addition, since the display section can become the through state, namely transparent or semitransparent, instead of displaying an image captured by the image capturing section, the user who puts on the image capturing and displaying apparatus can live free of difficulties. Thus, in a user's normal life, the benefits of this embodiment of the present invention can be effectively obtained.

According to an embodiment of the present invention, an image captured by the image capturing section, namely an image captured in a user's visual direction as the direction of the subject, is displayed by the display section disposed in front of him or her. When the operation of the image capturing section or the operation of the display section is controlled corresponding to external information, his or her visual ability can be virtually assisted and extended.

Since the display mode is changed by controlling the image capturing section or the display section corresponding to a surrounding environment, the type of a subject, its situation, and so forth determined corresponding to external information, no operational burden is imposed on him or her. In addition, since the image capturing section and the display section are properly controlled, the image capturing and displaying apparatus has high user-friendliness.

In addition, since the display section can become the through state, namely transparent or semitransparent, instead of displaying an image captured by the image capturing section, the user who puts on the image capturing and displaying apparatus can live free of difficulties. Thus, in a user's normal life, the benefits of this embodiment of the present invention can be effectively obtained.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 5A and FIG. 5B are schematic diagrams describing a normally captured image display state/through state and an enlarged image display state, respectively, according to embodiments of the present invention;

FIG. 7A and FIG. 7B are schematic diagrams describing a normally captured image display state/through state and an increased infrared sensitivity captured image display state, respectively, according to embodiments of the present invention;

FIG. 17A and FIG. 17B are flow charts showing an image control trigger determination process according to the first embodiment of the present invention;

FIG. 21A and FIG. 21B are schematic diagrams describing a non-adjusted image display state and an adjusted image display state, respectively, according to the second embodiment of the present invention;

FIG. 30A and FIG. 30B are flow charts showing the image control trigger determination processes according to the second embodiment of the present invention

DETAILED DESCRIPTION OF THE PREFERRED EMBODIMENTS

Next, an image capturing and displaying apparatus and an image capturing and displaying method according to a first embodiment of the present invention will be described in the following order.

[1. Exemplary appearance of image capturing and displaying apparatus]
[2. Exemplary structure of image capturing and displaying apparatus]
[3. Exemplary display images]
[4. Determination of user's situation]
[5. Exemplary operations]
[6. Effects, modifications, and extensions of first embodiment]

[1. Exemplary Appearance of Image Capturing and Displaying Apparatus]

Figure 1:
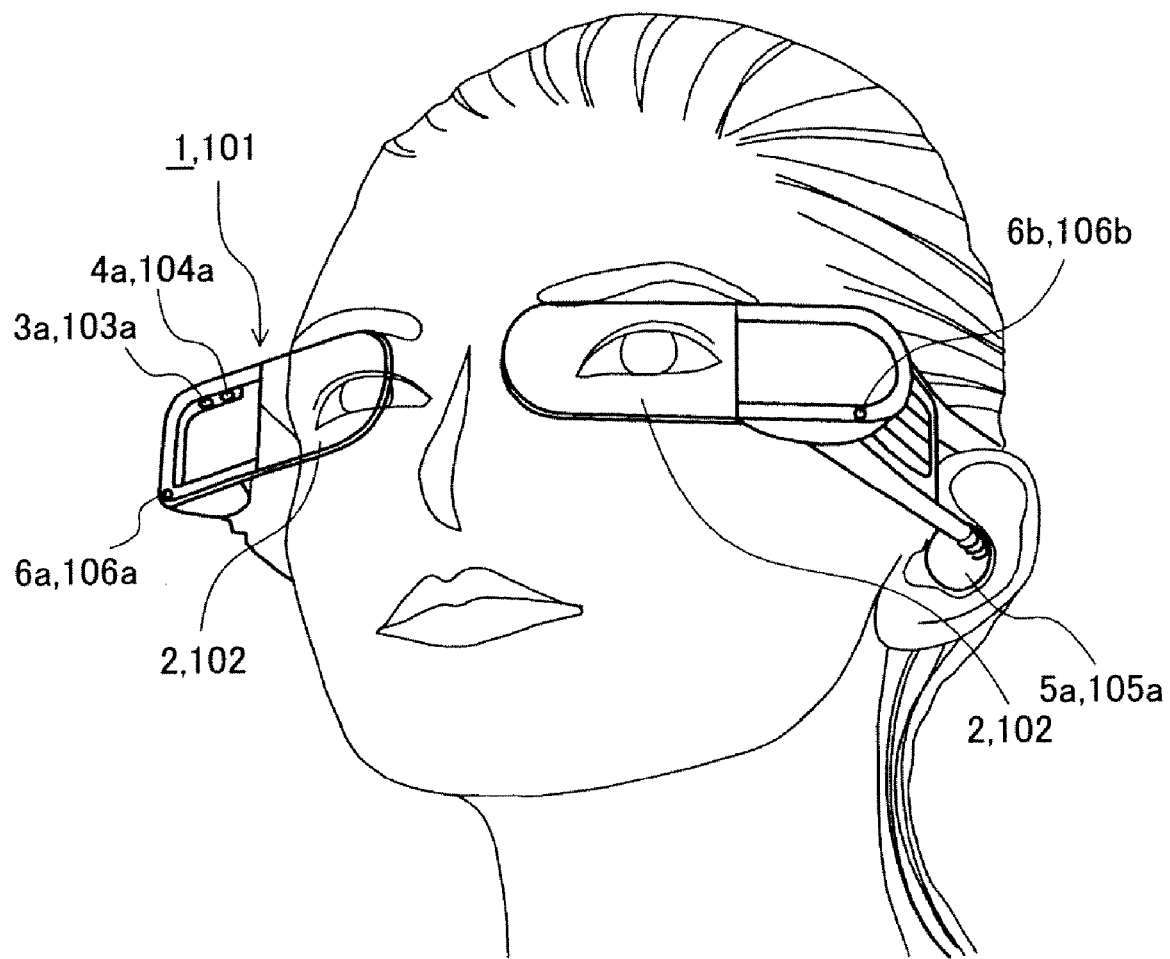
FIG. 1 is a schematic diagram describing an exemplary appearance of an image capturing and displaying apparatus according to embodiments of the present invention.

FIG. 1 shows an exemplary appearance of an image capturing and displaying apparatus 1 that is a eye-glass type display camera according to the first embodiment of the present invention. The image capturing and displaying apparatus 1 has a mounting unit having a semicircular shape that surrounds the user's head from each of both head side portions to a rear head portion. As shown in FIG. 1, the user puts on the image capturing and displaying apparatus 1 by hanging its predetermined portions on both conchae of his or her ears.

In the mounting state as shown in FIG. 1, a pair of display sections 2 for the left eye and the right eye are disposed just in front of the eyes of the user, namely, at the positions of lenses of regular eye-glasses. The display sections 2 are composed of for example a liquid crystal panel. By controlling the transmissivity of the display sections 2, they can become the through state, namely transparent or semitransparent as shown in FIG. 1. When the display sections 2 has become the through state, even if the user continually puts on the image capturing and displaying apparatus 1 like eye-glasses, it does not affect his or her normal life.

In the state that the user puts on the image capturing and displaying apparatus 1, an image capturing lens 3a is disposed forward such that it captures an image of a subject in a user's visual direction as the direction of the subject.

In addition, a light emission section 4a that lights up the image capturing direction of the image capturing lens 3a is disposed. The light emission section 4a is composed of for example an LED (Light Emitting Diode).

A pair of earphone speakers 5a that are inserted into the user's left and right ear holes in the mounting state of the image capturing and displaying apparatus 1 are disposed (only left side earphone speaker 5a is shown in FIG. 1).

In addition, microphones 6a and 6b that collect external sounds are disposed on the right of the right eye display section 2 and on the left of the left eye display section 2, respectively.

FIG. 1 is just exemplary. Thus, there may be many structures in which the user puts on the image capturing and displaying apparatus 1. As long as the image capturing and displaying apparatus 1 is an eye-glass type mounting unit or a headgear type mounting unit and as long as at least according to this embodiment, the display sections 2 are disposed just in front of the eyes of the user and the image capturing direction of the image capturing lens 3a is the user's visual direction, namely in front of the user, the structure of the image capturing and displaying apparatus 1 is not limited to that shown in FIG. 1. In addition, as well as the structure of which the display sections 2 are disposed corresponding to both the eyes of the user, one display section 2 may be disposed corresponding to one eye of the user.

Likewise, the earphone speakers 5a may not be left and right stereo speakers. Instead, one earphone speaker may be disposed corresponding to one ear of the user. Likewise, one of the microphones 6a and 6b may be disposed. In addition, the image capturing and displaying apparatus 1 may not have any microphones and any earphone speakers.

In addition, the image capturing and displaying apparatus 1 may not have the light emission section 4a.

[2. Exemplary Structure of Image Capturing and Displaying Apparatus]

Figure 2:
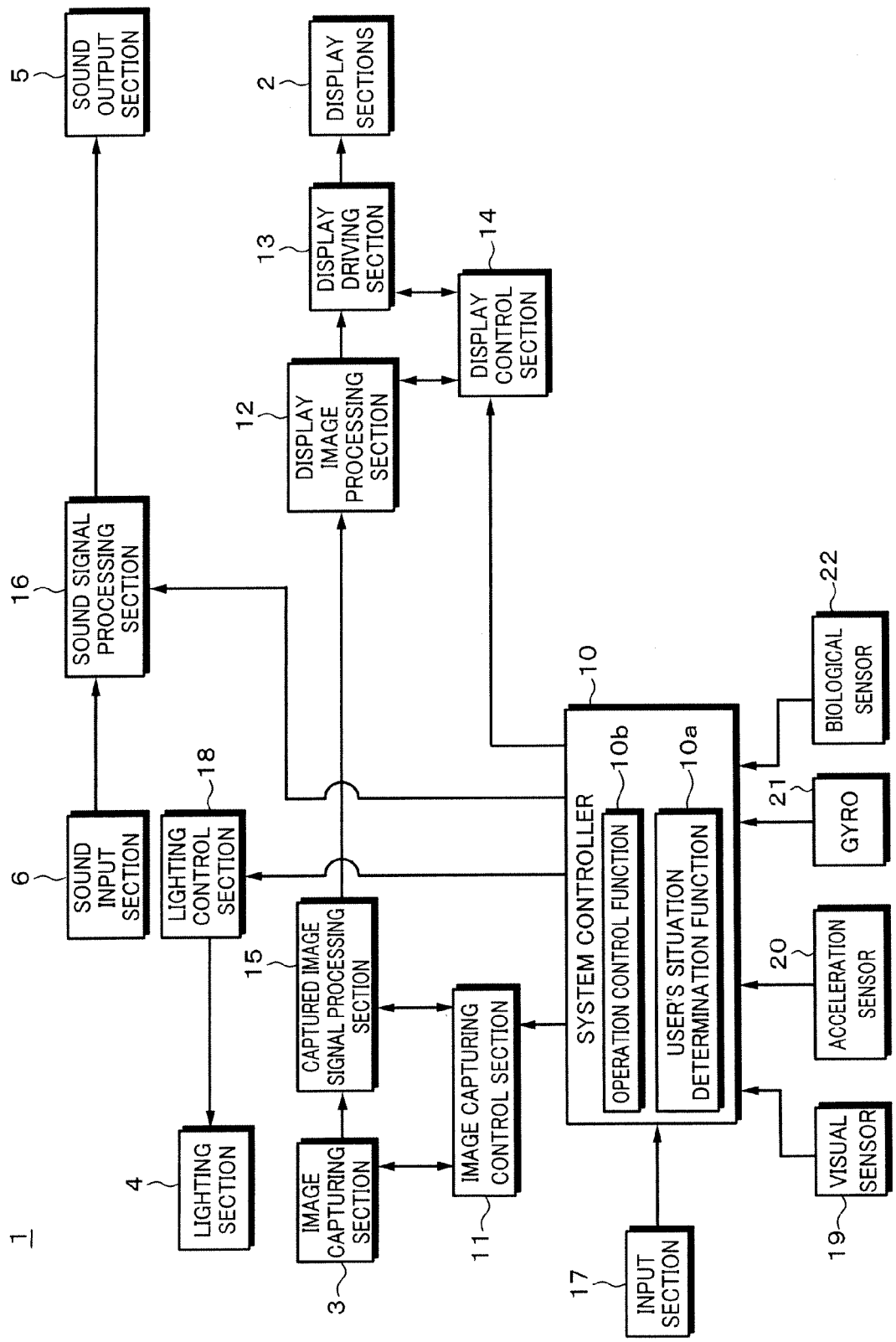
FIG. 2 is a block diagram showing an image capturing and displaying apparatus according to a first embodiment of the present invention.

FIG. 2 shows an exemplary internal structure of an image capturing and displaying apparatus 1.

A system controller 10 is composed of a microcomputer that includes for example a CPU (Central Processing Unit), a ROM (Read Only Memory), a RAM (Random Access Memory), an nonvolatile memory section, and an interface section. The system controller 10 is a control section that controls all the sections of the image capturing and displaying apparatus 1.

The system controller 10 controls each section of the image capturing and displaying apparatus 1 corresponding to a user's situation. In other words, the system controller 10 operates corresponding to an operation program that detects and determines a user's situation and operates and controls each section corresponding to the determined results. Thus, as shown in FIG. 2, the system controller 10 functionally includes a user's situation determination function 10a that determines the user's situation and an operation control function 10b that controls and commands each section corresponding to the determined results.

Disposed in the image capturing and displaying apparatus 1 are an image capturing section 3, an image capturing control section 11, and a captured image signal processing section 15 as a structure that captures an image in front of the user.

The image capturing section 3 includes a lens system having the image capturing lens 3a (shown in FIG. 1), a diaphragm, a zoom lens, a focus lens, and so forth, a driving system that causes the lens system to perform a focus operation and a zoom operation, and a solid state image sensor array that detects the light of a captured image obtained by the lens system, converts light into electricity, and generates a captured image signal corresponding to the electricity. The solid state image sensor array is composed of for example a CCD (Charge Coupled Device) sensor array or a CMOS (Complementary Metal Oxide Semiconductor) sensor array.

The captured image signal processing section 15 includes a sample hold/AGC (Automatic Gain Control) circuit that adjusts the gain of and trims the waveform of the signal obtained by the solid state image sensor array of the image capturing section 3 and a video A/D converter. The captured image signal processing section 15 obtains a captured image signal as digital data. The captured image signal processing section 15 performs a white balance process, a brightness process, a color signal process, a vibration correction process, and so forth for the captured image signal.

The image capturing control section 11 controls the operations of the image capturing section 3 and the captured image signal processing section 15 corresponding to commands received from the system controller 10. The image capturing control section 11 for example turns on and off the operations of the image capturing section 3 and the captured image signal processing section 15. In addition, the image capturing control section 11 controls the image capturing section 3 to perform an auto focus operation, an automatic exposure adjustment operation, an aperture adjustment operation, a zoom operation, and so forth (by motors).

In addition, the image capturing control section 11 includes a timing generator. The image capturing control section 11 controls the sample hold/AGC circuit and the video A/D converter of the solid state image sensor array and the image capturing control section 11 with a timing signal generated by the timing generator. In addition, the image capturing control section 11 can change the frame rate of a capturing image with the timing signal.

In addition, the image capturing control section 11 controls the image capturing sensitivity and the signal process of the solid state image sensor array and the captured image signal processing section 15. To control an image capturing sensitivity, the image capturing control section 11 controls for example the gain of the signal that has been read from the solid state image sensor array, black level setting, various types of coefficients of digital data of the captured image signal process, a correction amount of the vibration correction process, and so forth. With respect to image capturing sensitivity adjustments, the image capturing control section 11 can perform an overall sensitivity adjustment regardless of a wavelength band and specific sensitivity adjustments for specific wavelength bands such as an infrared region and an ultraviolet region. The wavelength specific sensitivity adjustment can be performed by inserting a wavelength filter into the image capturing lens system and by performing a wavelength filter calculation process for the captured image signal. In these cases, the image capturing control section 11 can control the sensitivity for example by inserting a wavelength filter and/or specifying a filter calculation coefficient.

As a structure that displays data to the user, the image capturing and displaying apparatus 1 includes the display sections 2, a display image processing section 12, a display driving section 13, and a display control section 14.

A captured image signal of which an image has been captured by the image capturing section 3 and then processed by the captured image signal processing section 15 is supplied to the display image processing section 12. The display image processing section 12 is for example a so-called video processor. The display image processing section 12 executes various types of display processes for the supplied captured image signal. The display image processing section 12 can perform for example a brightness level adjustment, a color correction, a contrast adjustment, a sharpness (edge enhancement) adjustment, and so forth for the captured image signal. In addition, the display image processing section 12 can generate an enlarged image of which a part of a captured image signal is enlarged and a reduced image, separates an image for a separation display, combines images, generates a character image and a graphic image, and superimposes a generated image with a captured image. In other words, the display image processing section 12 can perform various types of processes for a digital image signal as a captured image signal.

The display driving section 13 is composed of a pixel driving circuit that displays the image signal supplied from the display image processing section 12 on the display sections 2, which are for example a liquid crystal display. In other words, the display driving section 13 applies a driving signal based on the image signal to each pixel formed in a matrix shape in the display sections 2 at predetermined horizontal/vertical drive timings to cause the display sections 2 display an image. In addition, the display driving section 13 controls the transmissivity of each pixel to cause the display sections 2 to become the through state.

The display control section 14 controls the process and operation of the display image processing section 12 and the operation of the display driving section 13 corresponding to commands received from the system controller 10. In other words, the display control section 14 causes the display image processing section 12 to execute the foregoing various types of processes. In addition, the display control section 14 controls the display driving section 13 to cause the display sections 2 to switch the display state between the through state and the image display state.

In the following description, the state of which the display sections 2 becomes transparent or semitransparent is referred to as the "through state", whereas the operation (and its state) of which the display sections 2 displays an image is referred to as the "monitor display state".

In addition, the image capturing and displaying apparatus 1 includes a sound input section 6, a sound signal processing section 16, and a sound output section 5.

The sound input section 6 includes the microphones 6a and 6b shown in FIG. 1 and a microphone amplifying section that processes sound signals obtained by the microphones 6a and 6b.

The sound signal processing section 16 is composed of for example an A/D converter, a digital signal processor, a D/A converter, and so forth. The sound signal processing section 16 converts a sound signal supplied from the sound input section 6 into digital data and performs processes of a sound volume adjustment, a sound quality adjustment, an acoustic effect, and so forth under the control of the system controller 10. The sound signal processing section 16 converts the resultant sound signal into an analog signal and supplies the analog signal to the sound output section 5. The sound signal processing section 16 is not limited to the structure that performs a digital signal process. Instead, the sound signal processing section 16 may perform signal processes with an analog amplifier and an analog filter.

The sound output section 5 includes the pair of earphone speakers 5a shown in FIG. 1 and an amplifier circuit for the earphone speakers 5a.

The sound input section 6, the sound signal processing section 16, and the sound output section 5 allow the user to hear an external sound through the image capturing and displaying apparatus 1.

The sound output section 5 may be structured as a so-called osseous conduction speaker.

In addition, the image capturing and displaying apparatus 1 includes a lighting section 4 and a lighting control section 18. The lighting section 4 is composed of the light emission section 4a (for example, a light emission diode) shown in FIG. 1 and a light emission circuit that causes the light emission section 4a to emit light. The lighting control section 18 causes the lighting section 4 to execute a light emission operation corresponding to a command supplied from the system controller 10.

Since the light emission section 4a of the lighting section 4 is disposed such that the light emission section 4a lights up forward, the lighting section 4 performs a lighting operation in the user's visual direction.

As a structure that obtains user's information, the image capturing and displaying apparatus 1 includes a visual sensor 19, an acceleration sensor 20, a gyro 21, a biological sensor 22, and an input section 17.

The visual sensor 19 detects information about user's visual sense. The visual sensor 19 is a sensor that is capable of detecting information about user's visual sense such as a visual line direction, a focus distance, a dilation of pupils, an eye fundus pattern, eyelid opening/closing, and so forth.

The acceleration sensor 20 and the gyro 21 output signals corresponding to a user's motion. The acceleration sensor 20 and the image capturing control section 11 are sensors that detect motions of the head, the neck, the whole body, the arms, the legs, and so forth of the user.

The biological sensor 22 detects user's biological information. The biological sensor 22 is a sensor that detects for example heart rate information, pulse information, perspiration information, cerebral wave information, galvanic skin response (GSR), body temperature, blood pressure, respiratory activity information, and so forth of the user. The detection signals of the biological sensor 22 become information with which tense state, excited state, calm state, drowsy state, comfortable state, uncomfortable state, and so forth are determined.

The input section 17 is a section with which the user manually inputs information. Formed in the input section 17 is a switch with which the user can input his or her eye sights.

With the visual sensor 19, the acceleration sensor 20, the gyro 21, the biological sensor 22, and the input section 17, information about a motion or a physical situation of the user who puts on the image capturing and displaying apparatus 1 is obtained as user's information and supplied to the system controller 10.

In the process of the user's situation determination function 10a, the system controller 10 determines a user's wish or situation corresponding to the obtained user's information. In the process of the operation control function 10b, the system controller 10 controls the image capturing operation and display operation corresponding to the determined user's wish or situation. In other words, the system controller 10 commands the image capturing control section 11 to control the operations of the captured image signal processing section 15 and commands the display control section 14 to control the operations of the display image processing section 12 and the display driving section 13.

As the structure that obtains user's information in the image capturing and displaying apparatus 1, the visual sensor 19, the acceleration sensor 20, the gyro 21, the biological sensor 22, and the input section 17 have been exemplified. However, the image capturing and displaying apparatus 1 may not include all of these sensors. In addition, the image capturing and displaying apparatus 1 may include other sensors such as a sensor that detects the voice of the user and a sensor that detects the movements of lips.

[3. Exemplary Display Images]

The system controller 10 controls the image capturing operation and the display operation corresponding to a user's wish or situation. As a result, the user recognizes various display modes of the display sections 2. FIG. 3A to FIG. 3C to FIG. 9A to FIG. 9C exemplify various display modes.

Figure 3A:
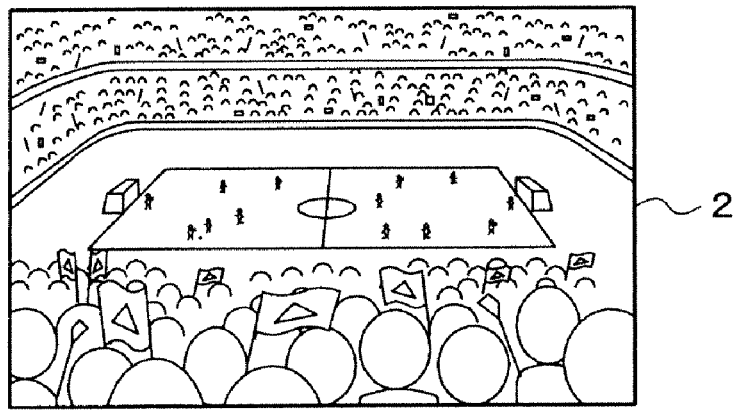
FIG. 3A, FIG. 3B, and FIG. 3C are schematic diagrams describing a through state, a normally captured image display state, and a telescopic image display state, respectively, according to embodiments of the present invention.

FIG. 3A shows the state that the display sections 2 are the through state. In other words, in this state, the display sections 2 are simple transparent planar members and the user sees a scene in the visual field through the transparent display sections 2.

Figure 3B:
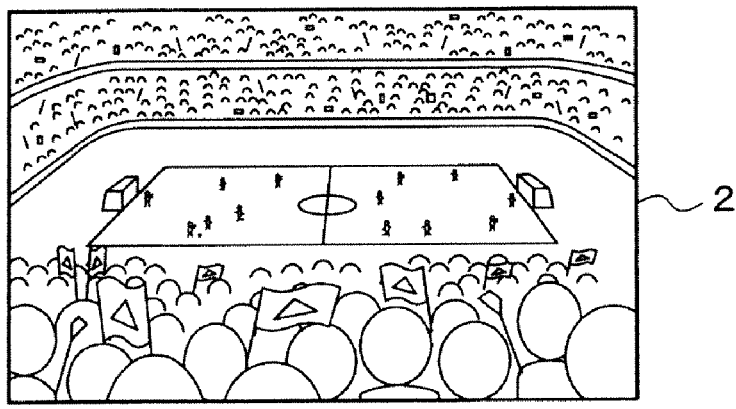

FIG. 3B shows the state that an image captured by the image capturing section 3 is displayed on the display sections 2 that operate in the monitor display state. The image capturing section 3, the captured image signal processing section 15, the display image processing section 12, and the display driving section 13 operate in the state shown in FIG. 3A such that they normally display the captured image on the display sections 2. In this case, the captured image (normally captured image) displayed on the display sections 2 is nearly the same as an image that appears on the display sections 2 that operate in the through state. In other words, in this state, the user sees a normal visual field as a captured image.

Figure 3C:
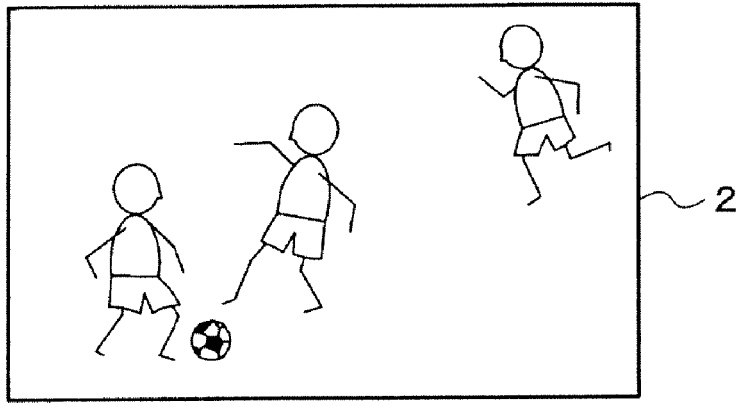

FIG. 3C shows the state that the system controller 10 causes the image capturing section 3 to capture a telescopic image through the image capturing control section 11 and the telescopic image is displayed on the display sections 2.

In contrast, when the system controller 10 causes the image capturing section 3 to capture a wide angle image through the image capturing control section 11, a short-distant wide-angle image (not shown) is displayed on the display sections 2. Although the image capturing section 3 performs the telescopic and wide angle controls by driving the zoom lens of the image capturing section 3, the captured image processing section 15 may perform these controls by processing signals.

Figure 4A:
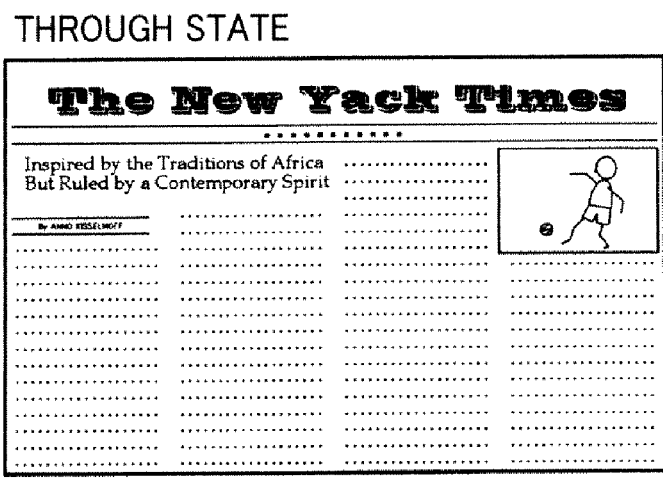
FIG. 4A and FIG. 4B are schematic diagrams describing a through state and a wide angle zoom image display state, respectively, according to embodiments of the present invention.

FIG. 4A shows the state that the display sections 2 are in the through state, for example the user is reading a newspaper.

Figure 4B:
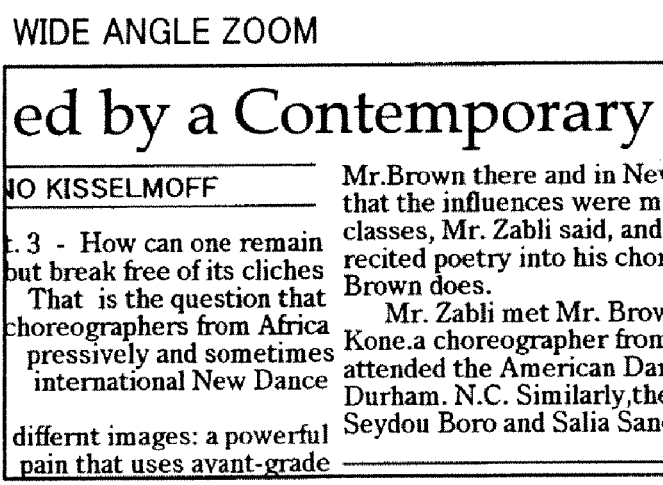

FIG. 4B shows a so-called wide angle zoom state. In other words, FIG. 4B shows the state that a short-focus-distance zoom image is captured and displayed on the display sections 2 such that for example characters of the newspaper are enlarged.

FIG. 5A shows the state that the display sections 2 display a normally captured image or the display sections 2 are in the through state.

At this point, when the system controller 10 commands the display image processing section 12 to perform an image enlarging process through the display control section 14, an enlarge image as shown in FIG. 5B is displayed on the display sections 2.

Figure 6A:
FIG. 6A and FIG. 6B are schematic diagrams describing a normally captured image display state/through state and an adjusted image display state, respectively, according to embodiments of the present invention.

FIG. 6A shows the state that the display sections 2 display a normally captured image or the display sections 2 are in the through state. In particular, FIG. 6A shows the state that the user is reading a newspaper or a book. In this case, it is assumed that since the surroundings are dim, the user is unable to see characters of the newspaper or the like with a normally captured image or in the through state of the display sections 2.

Figure 6B:
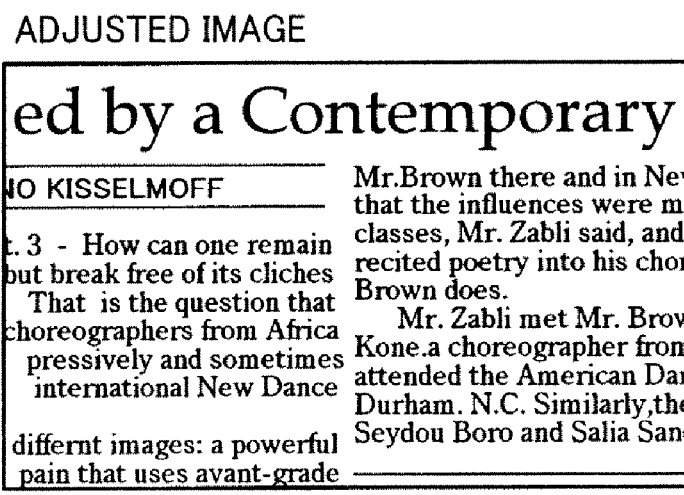

In this case, the system controller 10 commands the image capturing control section 11 (the image capturing section 3 and the captured image signal processing section 15) to increase the image capturing sensitivity and/or causes the display control section 14 (the display image processing section 12 and the display driving section 13) to increase the brightness and adjust the contrast and sharpness such that a sharper image as shown in FIG. 6B than that as shown in FIG. 6A is displayed on the display sections 2. Instead, when the system controller 10 causes the lighting section 4 to perform the lighting operation, an image may be sharply displayed on the display sections 2.

FIG. 7A shows the state that the display sections 2 display a normally captured image or the display sections 2 are in the through state. In this case, the user is staying in a dark bed room where a child is sleeping. Since the user is staying in a dark room, he or she is unable to clearly see the child with a normally captured image or in the through state of the display sections 2.

At this point, when the system controller 10 commands the image capturing control section 11 (the image capturing section 3 and the captured image signal processing section 15) to increase the infrared image capturing sensitivity, an infrared captured image is displayed on the display sections 2 as shown in FIG. 7B such that the user is able to see the child's sleeping face and so forth.

Figure 8A:
FIG. 8A and FIG. 8B are schematic diagrams describing a normally captured image display state/through state and an increased ultraviolet sensitivity captured image display state, respectively, according to embodiments of the present invention.

FIG. 8A shows the state that the display sections 2 display a normally captured image or the display sections 2 are in the through state.

Figure 8B:

When the system controller 10 commands the image capturing control section 11 (the image capturing section 3 and the captured image signal processing section 15) to increase the ultraviolet image capturing sensitivity, a captured image with a ultraviolet component as shown in FIG. 8B is displayed on the display sections 2.

Figure 9A:
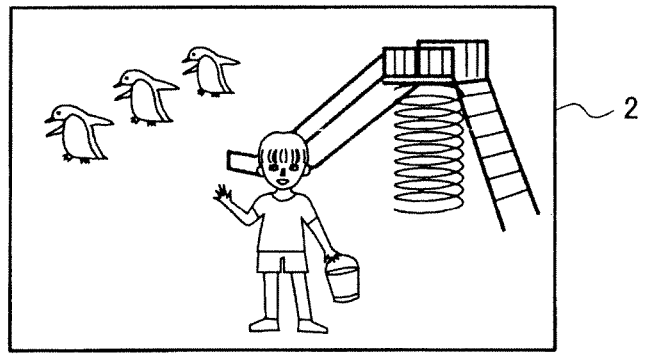
FIG. 9A, FIG. 9B, and FIG. 9C are schematic diagrams describing a through state, a two-separated image display state, and a four-separated image display state, respectively, according to embodiments of the present invention.

FIG. 9A shows the state that the display sections 2 are in the through-state.

Figure 9B:
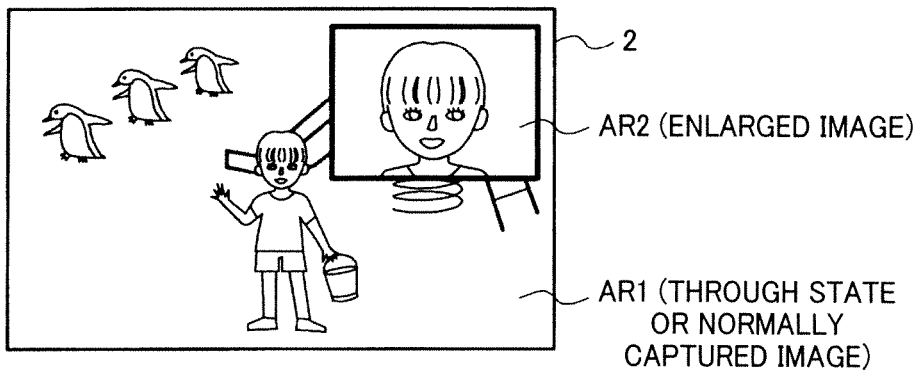

When the system controller 10 commands the display control section 14 (the display image processing section 12 and the display driving section 13) to separately display an image or separately display an image and partially enlarge an image, images shown in FIG. 9B can be displayed on the display sections 2. In other words, the screen of the display sections 2 is separated into areas AR1 and AR2 where area AR1 is in the through state or in a normal image display state and area AR2 is in an enlarged image display state.

Figure 9C:
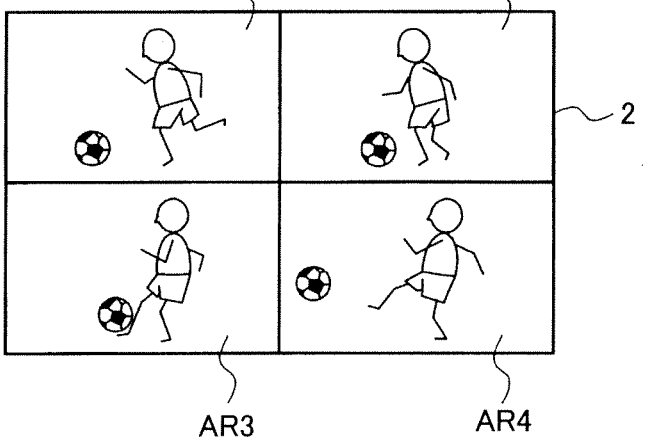

FIG. 9C shows another exemplary separation display. In this case, the screen of the display sections 2 is separated into areas AR1, AR2, AR3, and AR4 that display frames of an image captured at intervals of a predetermined time period. The system controller 10 causes the display image processing section 12 to extract one frame at intervals of 0.5 second from a captured image signal and display the extracted frames in the order of areas AR1, AR2, AR3, AR4, AR1, AR2, and so forth. In this case, an image that is a so-called strobe display mode are separately displayed on the display sections 2.

In the foregoing, various types of display images have been exemplified. In this embodiment, however, by controlling each process and each operation of the image capturing section 3, the captured image signal processing section 15, the display image processing section 12, and the display driving section 13, various types of display modes can be accomplished.

For example, it is expected that there are many types of display modes such as a telescopic display mode, a wide angle display mode, a zoom-in display mode and a zoom-out display mode ranging from a telescopic display mode to a wide angle display mode, an image enlargement display mode, an image reduction display mode, a variable frame rate display mode (image captured at high frame rates), a high brightness display mode, a low brightness display mode, a variable contrast display mode, a variable sharpness display mode, an increased sensitivity captured image display mode, an increased infrared sensitivity captured image display mode, an increased ultraviolet sensitivity captured image display mode, image effect display modes such as a mosaic image, a brightness inverted image, a soft focus image, a partial screen highlight image, an image with a variable color atmosphere, and so forth, a slow display mode, a frame-by-frame display mode, separated display modes in combinations of these display modes, separated display modes in combination of a through state and a captured image, a strobe display mode, a still image display mode with one frame of a captured image, and so forth.

[4. Determination of User's Situation]

As described above, as the structure that obtains user's information, the image capturing and displaying apparatus 1 according to this embodiment includes the visual sensor 19, the acceleration sensor 20, the gyro 21, the biological sensor 22, and the input section 17.

The visual sensor 19 detects information about a user's visual sense. The visual sensor 19 can be composed of for example an image capturing section that is disposed near one of the display sections 2 and that captures an image of the eye of the user. The image of the eye of the user captured by the image capturing section is obtained by the system controller 10. The user's situation determination function 10a analyzes the image and detects the visual line direction, the focus distance, the dilation of pupils, the eye fundus pattern, the eyelid opening/closing, and so forth corresponding to the analyzed result. As a result, the user's situation determination function 10a can determine a user's situation and wish corresponding to the detected results.

Instead, the visual sensor 19 may be composed of a light emitting section that is disposed near one of the display sections 2 and that emits light to the eye of the user and a light receiving section that receives light reflected from the eye. By detecting the thickness of the lens of the user's eye with for example a signal corresponding to the received light, the focus distance of the user's eye can be detected.

By detecting the visual line direction of the user's eye, the system controller 10 can determine a portion on which the user is focusing in an image displayed on the display sections 2.

In addition, the system controller 10 can recognize the visual line direction of the user's eye as an operation input. For example, when the user moves the visual line to the left and right, the system controller 10 can recognize these operations as predetermined operation inputs to the image capturing and displaying apparatus 1.

By detecting the focus distance of the user's eye, the system controller 10 can determine whether a scene on which the user is focusing is far or near. The system controller 10 can perform a zoom control, an enlargement control, a reduction control, and so forth corresponding to the determined result. For example, when the user sees a far scene, the system controller 10 may perform the telescopic display operation.

When a dilation of pupils is detected in the through state, the brightness of the surroundings can be determined. When a dilation of pupils is detected in the monitor display state, the glare and so forth that the user feel for an image that is displayed can be determined. The brightness, the image capturing sensitivity, and so forth can be adjusted corresponding to the determined results.

When an eye fundus pattern of the user is detected, the user can be authenticated corresponding to the detected result. Since an eye fundus pattern is unique for each user, the user who puts on the image capturing and displaying apparatus 1 can be identified. The image capturing and displaying apparatus 1 can be controlled corresponding to the identified result. Instead, the system controller 10 may control the monitor display only for a predetermined user.

When the eyelid opening/closing operations of the user are detected, the glare and fatigue of the user's eye can be determined. In addition, the opening/closing operations of the eyelids can be recognized as user's intentional operation inputs. When the user has performed the opening/closing operations of the eyelids three times, these actions may be determined as a predetermined operation input.

The acceleration sensor 20 and the gyro 21 output signals corresponding to the motion of the user. The acceleration sensor 20 detects for example the motion in the linear direction. The gyro 21 suitably detects the motion and the vibration of a rotating system.

The acceleration sensor 20 and the gyro 21 can detect the motion of the whole body of the user or the motion of each portion of his or her body depending on the positions where they are disposed in the image capturing and displaying apparatus 1.

When the acceleration sensor 20 and the gyro 21 are disposed in the eye-glass type image capturing and displaying apparatus 1 shown in FIG. 1, namely when the acceleration sensor 20 and the gyro 21 detect the motion of the head of the user, information of the acceleration sensor 20 becomes acceleration information as the motion of the user's head or his or her whole body. In this case, the information of the gyro 21 becomes information of an angular velocity and a vibration as a motion of the user's head or his or her whole body.

Thus, an action of which the user moves the head from the neck can be detected. For example, the state that the user looks up and the state that he or she looks down can be determined. When the user looks down, it can be determined that he or she is seeing an near subject, for example he or she is reading a book or the like. In contrast, when the user looks up, it can be determined that he or she is seeing a far subject.

When the system controller 10 has detected a user's action of moving his or her head from his or her neck, the system controller 10 may recognize it as a user's intentional action. For example, if the user has shaken his or her neck to the left twice, the system controller 10 can determine the action as a predetermined operation input.

Depending on the acceleration sensor 20 and the gyro 21, they may be able to determine whether the user is in a stop state (non-walking state), a walking state, or a running state.

In addition, the acceleration sensor 20 and the gyro 21 may be able to detect a state change from a standing state to a sitting state or vice versa.

When the acceleration sensor 20 and the gyro 21 are separated from the headgear mounting unit and disposed at one arm or one foot of the user, they can detect a motion of only the arm or foot.

The biological sensor 22 detects for example heart rate information (heart rate), pulse information (pulse rate), perspiration information, brain wave information (for example, information of α wave, β wave, θ wave, and δ wave), a galvanic skin response, a body temperature, a blood pressure, respiration activities (for example, a respiration speed, a depth, and a breathing capacity), and so forth as user's biological information. The system controller 10 can determine whether the user is in a tense state, an excited state, an emotionally calm state, a comfortable state, or an uncomfortable state corresponding to the detected information.

It can be determined whether the user has put on the image capturing and displaying apparatus 1 corresponding to the detected biological information. For example, when the user has not put on the image capturing and displaying apparatus 1, the system controller 10 may control the image capturing and displaying apparatus 1 to operate in a standby state in which only biological information is detected. When the system controller 10 has detected that the user has put on the image capturing and displaying apparatus 1 corresponding to the detected biological information, the system controller 10 may turn on the power of the image capturing and displaying apparatus 1. In contrast, when the user has put off the image capturing and displaying apparatus 1, the system controller 10 may restore the image capturing and displaying apparatus 1 to the standby state.

In addition, information detected by the biological sensor 22 can be used to authenticate the user (identify the user who has put on the image capturing and displaying apparatus 1).

When the biological sensor 22 is disposed in the mounting frame of the eye-glass type image capturing and displaying apparatus 1, the foregoing information is detected at the side head portion or the rear head portion of the user. Instead, the biological sensor 22 may be separated from the mounting frame of the image capturing and displaying apparatus 1 and disposed at a predetermined position of the user's body.

The input section 17 is a section with which the use can manually input his or her eye sight information. When the user inputs information of his or her eye sights, for example, the values of eye sights and information about myopia, hyperopia, astigmatism, presbyopia, and so forth, the system controller 10 can control the display of an image corresponding to the user's eye sights.

[5. Exemplary Operations]

In the image capturing and displaying apparatus 1 according to this embodiment of the present invention, the system controller 10 controls the image capturing operation and the display operation corresponding to user's information detected by the visual sensor 19, the acceleration sensor 20, the gyro 21, the biological sensor 22, and the input section 17. As a result, the display sections 2 perform a display operation corresponding to a user's wish and situation so as to assist and extend the user's visual sense.

Next, various types of exemplary operations under the control of the system controller 10 will be described.

Figure 10:
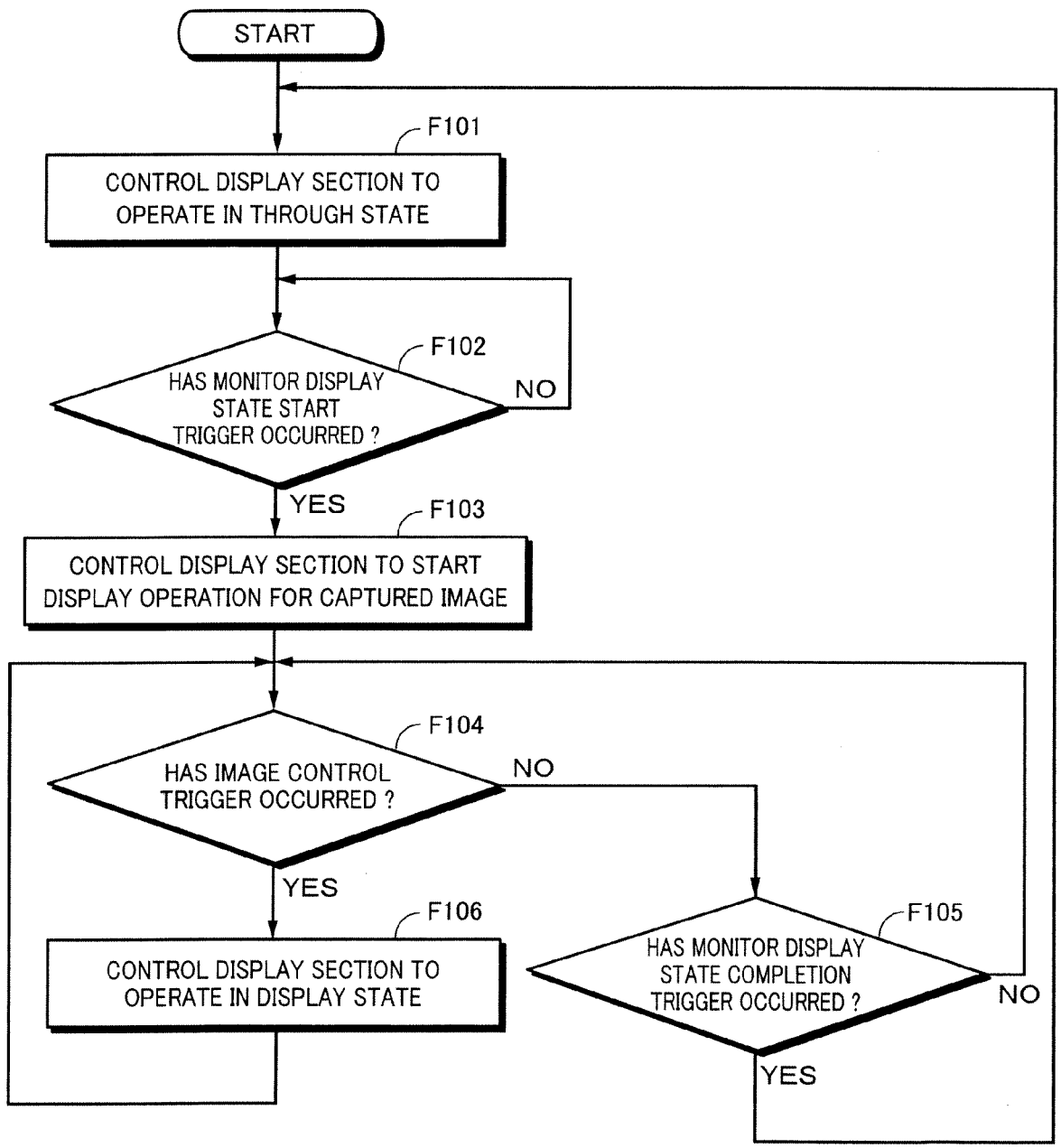
FIG. 10 is a flow chart showing a control process according to the first embodiment of the present invention.

FIG. 10 shows a control process as the operation control function 10*b* of the system controller 10.

At step F101, the system controller 10 controls the display control section 14 to cause the display sections 2 to become the through state. When the image capturing and displaying apparatus 1 is initially turned on, the flow advances to step F101. At step F101, the system controller 10 controls the display sections 2 to become the through state.

While the display sections 2 is in the through state, the flow advances to step F102. At step F102, the system controller 10 determines whether or not a monitor display state start trigger has occurred. The monitor display state start trigger occurs when the system controller 10 has determined that the monitor display state has been started corresponding to a user's wish or situation determined by the user's situation determination function 10*a*. The system controller 10 determines whether or not a monitor display state start trigger has occurred corresponding to a user's operation, a user's intentional motion (a motion recognized as an operation), or a user's unintentional motion or situation (including recognition of the user). Specific examples will be described later.

When the determined result denotes that a monitor display state start trigger has occurred, the flow advances to step F103. At step F103, the system controller 10 executes the monitor display start control. In other words, the system controller 10 commands the image capturing control section 11 to cause the image capturing section 3 and the captured image signal processing section 15 to perform a normal image capturing operation. In addition, the system controller 10 commands the display control section 14 to cause the display image processing section 12 and the display driving section 13 to cause the display sections 2 to display a captured image signal as the normally captured image.

In this process, the through state as shown in FIG. 3A is switched to the monitor display state for the normally captured image as shown in FIG. 3B.

While the display sections 2 display a normally captured image, which is the same as a scene that the user sees in the through state, the flow advances to step F104. At step F104, the system controller 10 monitors whether or not an image control trigger has occurred. At step F105, the system controller 10 monitors whether or not a monitor display state completion trigger has occurred.

An image control trigger occurs when the system controller 10 has determined that it is necessary to change the display image mode in the monitor display state corresponding to a user's wish or situation determined by the user's situation determination function 10*a*. A monitor display state completion trigger occurs when the system controller 10 has determined that it is necessary to complete the monitor display state and switch the monitor display state to the through state corresponding to a user's wish or situation determined by the user's situation determination function 10*a*. The system control 10 determines whether or not a monitor display state completion trigger has occurred corresponding to a user's operation, a user's intentional motion (a motion recognized as an operation), or a user's unintentional motion or situation (user's physical situation, user's recognition, and so forth). These specific examples will be described later.

When the determined result denotes that an image control trigger has occurred, the flow advances from step F104 to step F106. At step F106, the system controller 10 controls the display operation for a captured image. In other words, the system controller 10 commands the image capturing control section 11 and the display control section 14 to cause the display sections 2 to display the image in the display mode corresponding to a user's wish or situation at that point.

After the system controller 10 has controlled the display mode at step F106, the flow returns to step F104 or F105. At step F104 or step F105, the system controller 10 monitors whether or not a trigger has occurred.

When the determined result denotes that a monitor display state completion trigger has occurred, the flow returns from step F105 to step F101. At step F101, the system controller 10 commands the image capturing control section 11 to complete the image capturing operation and commands the display control section 14 to cause the display sections 2 to become the through state.

While the user puts on the image capturing and displaying apparatus 1 and its power is turned on, the operation control function 10*b* of the system controller 10 performs the control process as shown in FIG. 10.

In this process, the monitor display start control is performed corresponding to the determined result of whether or not a monitor display state start trigger has occurred. The display mode is controlled corresponding to the determined result of whether or not an image control trigger has occurred. The monitor display stop and through state control is performed corresponding to the determined result of whether or not a monitor display state completion trigger has occurred. Specific examples of the trigger determinations and controls will be described later with reference to FIG. 11A and FIG. 11B to FIG. 19A and FIG. 19B.

FIG. 11A and FIG. 11B to FIG. 19A and FIG. 19B show exemplary processes of the user's situation determination function 10*a* of the system controller 10. It is assumed that these processes are executed in parallel with the process of the operation control function 10*b* shown in FIG. 10. These parallel processes are executed such that while for example the system controller 10 is executing the process shown in FIG. 10, detection processes shown in FIG. 11A and FIG. 11B to FIG. 19A and FIG. 19B are periodically executed as interrupt processes. The programs of the processes shown in FIG. 11A and FIG. 11B to FIG. 19A and FIG. 19B may be built in the program that executes the process shown in FIG. 10. Instead, these programs may be other programs periodically called. In other words, the structure of these programs is not limited to a particular one.

Figure 11B:
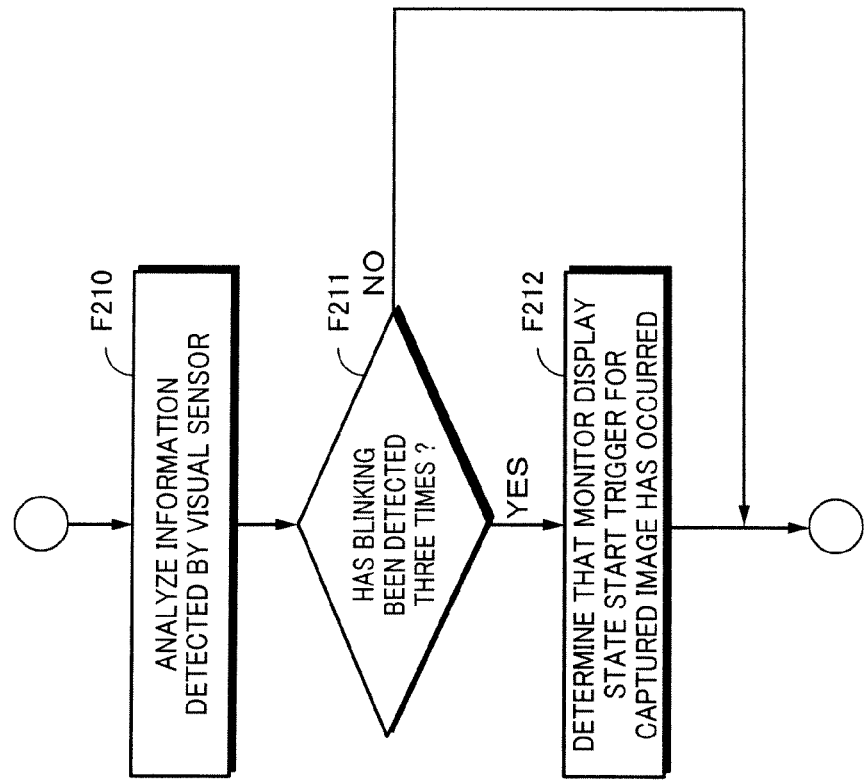
FIG. 11A and FIG. 11B are flow charts showing monitor display start trigger determination processes according to the first embodiment of the present invention.
Figure 11A:
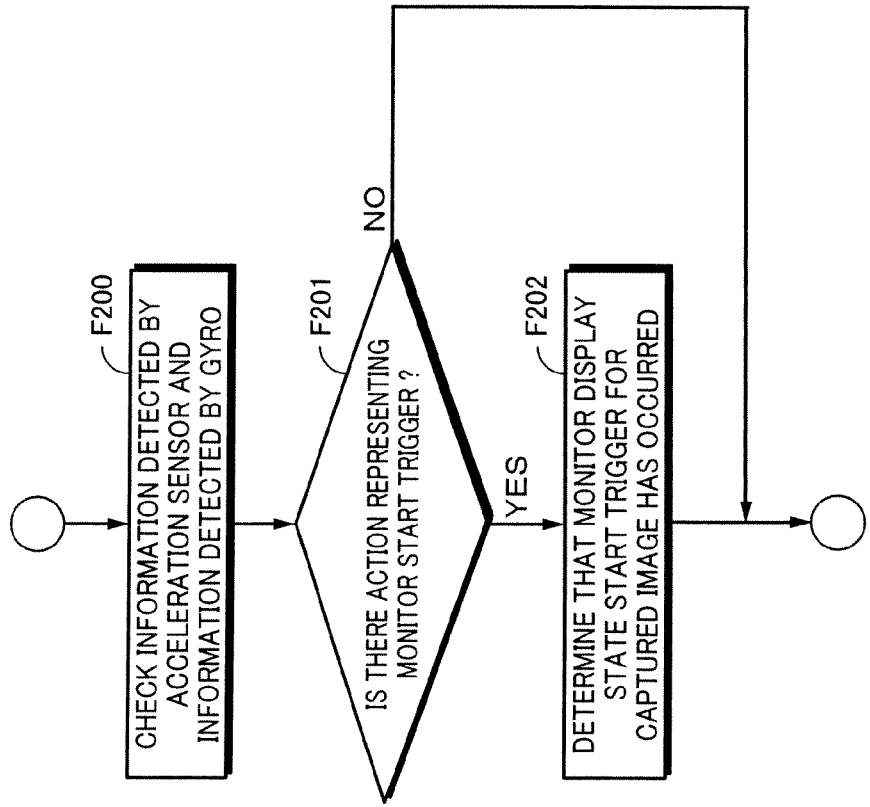

With reference to FIG. 11A and FIG. 11B, an exemplary process of determining whether a monitor display state start trigger that causes the through state to be switched to the monitor display state has occurred will be described.

FIG. 11A and FIG. 11B show exemplary processes of detecting a user's motion as a monitor display start operation.

At step F200 shown in FIG. 11A, the system controller 10 monitors information (an acceleration signal or an angular velocity signal) detected by the acceleration sensor 20 or the gyro 21.

It is defined that predetermined motions such as shaking the neck up and down twice, shaking the neck sideways once, turning the neck once, and so forth are operations that denote that the user commands the image capturing and displaying apparatus 1 to operate in the monitor display state. When the system controller 10 has determined that the user have performed a motion that denotes that he or she commands the image capturing and displaying apparatus 1 to start the monitor display state corresponding to detected information of the acceleration sensor 20 and/or the gyro 21, the flow advances from step F201 to step F202. At step F202, the system controller 10 determines that a monitor display state start trigger for the captured image signal has occurred.

When the determined result at step F202 denotes that a monitor display state start trigger has occurred, the flow advances from step F102 to step F103 shown in FIG. 10. At step F103, the system controller 10 controls the display sections 2 to start the display operation for the captured image.

Other examples of user's predetermined motions that are detected as information of the acceleration sensor 20 and/or the gyro 21 and that command the image capturing and displaying apparatus 1 to operate in the monitor display state are jumping, swinging the hand, shaking the arm, shaking the foot, and so forth.

FIG. 11B is an exemplary process of determining whether or not a monitor display state start trigger has occurred corresponding to information of the visual sensor 19.

At step F210, the system controller 10 analyzes information detected by the visual sensor 19. When an image capturing section that captures an image of the eye of the user is disposed as the visual sensor 19, the system controller 10 analyzes the image captured by the image capturing section.

When it is assumed that a particular action of which the user blinks successively three times has been defined as an operation that the user commands the image capturing and displaying apparatus 1 to operate in the monitor display state, the system controller 10 monitors the action by analyzing the captured image.

When the system controller 10 has detected that the user has blinked successively three times, the flow advances from step F211 to step F212. At step F212, the system controller 10 determines that a monitor display state start trigger for the captured image signal has occurred.

When the determined result at step F212 denotes that a monitor display state start trigger has occurred, the flow advances from step F102 to step F103 shown in FIG. 10. At step F103, the system controller 10 controls the display sections 2 to start the display operation for the captured image in the monitor display state.

Other examples of the user's actions that are detected corresponding to information detected by the visual sensor 19 and that command the image capturing and displaying apparatus 1 to operate in the monitor display state include turning eyeballs, moving them sideways two times, moving them up and down two times, and so forth.

Other than these exemplary processes of switching the image capturing and displaying apparatus 1 from the through state to the monitor display state corresponding to user's intentional actions, there may be other actions.

To switch the through state to the monitor display state, for example a switch may be disposed. The display state may be switched corresponding to the operation of the switch.

When the user has input visual sight information from the input section 17, the system controller 10 may determine that a monitor display state start trigger has occurred.

Instead, when the user has put on the image capturing and displaying apparatus 1, the system controller 10 may determine that a monitor display state start trigger has occurred. Since the system controller 10 can determine whether the user has put on the image capturing and displaying apparatus 1 corresponding to information detected by the biological sensor 22, when the biological sensor 22 has detected for example pulses, brain waves, a galvanic skin response, or the like, the system controller 10 may determine that a monitor display state start trigger has occurred. In this case, when the user has just put on the image capturing and displaying apparatus 1, the image capturing and displaying apparatus 1 operates in the monitor display state.

Instead, when a predetermined user has put on the image capturing and displaying apparatus 1, it may start operating in the monitor display state. The user may be identified corresponding to an eye fundus pattern detected by the visual sensor 19 and a signal detected by the biological sensor 22. When the eye fundus pattern and the biological information of the user who uses the image capturing and displaying apparatus 1 have been registered, the system controller 10 can determine whether or not the predetermined user has put on the image capturing and displaying apparatus 1.

Thus, when the predetermined user puts on the image capturing and displaying apparatus 1, the system controller 10 authenticates him or her. When the image capturing and displaying apparatus 1 has recognized the predetermined user, the system controller 10 determines that a monitor display state start trigger has occurred and controls the image capturing and displaying apparatus 1 to operate in the monitor display state.

When the functions of the image capturing and displaying apparatus 1 are permitted to be used for only a predetermined user, such a personal authentication may be added to conditions of determining whether or not a monitor display state start trigger has occurred.

When a captured image is displayed on the display sections 2 corresponding to the foregoing monitor display start trigger, as shown in FIG. 9B, area AR1 may be in the through state on the screen of the display sections 2 and a captured image may be displayed in area AR2 that is a part of the screen.

Next, with reference to FIG. 12A and FIG. 12B to FIG. 17A and FIG. 17B, exemplary processes of determining whether or not an image control trigger has occurred as the process at step F104 shown in FIG. 10.

Figure 12B:
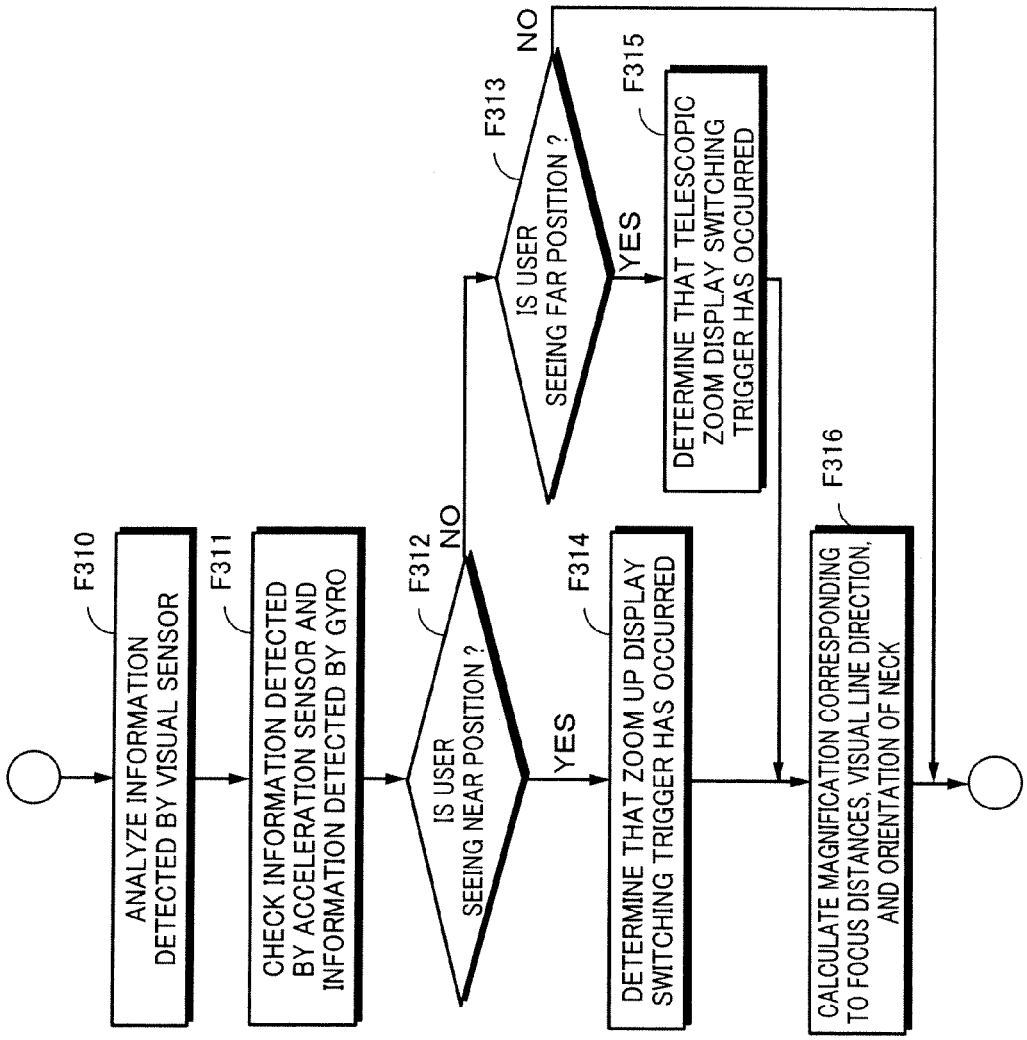
FIG. 12A and FIG. 12B are flow charts showing image control trigger determination processes according to the first embodiment of the present invention.
Figure 12A:
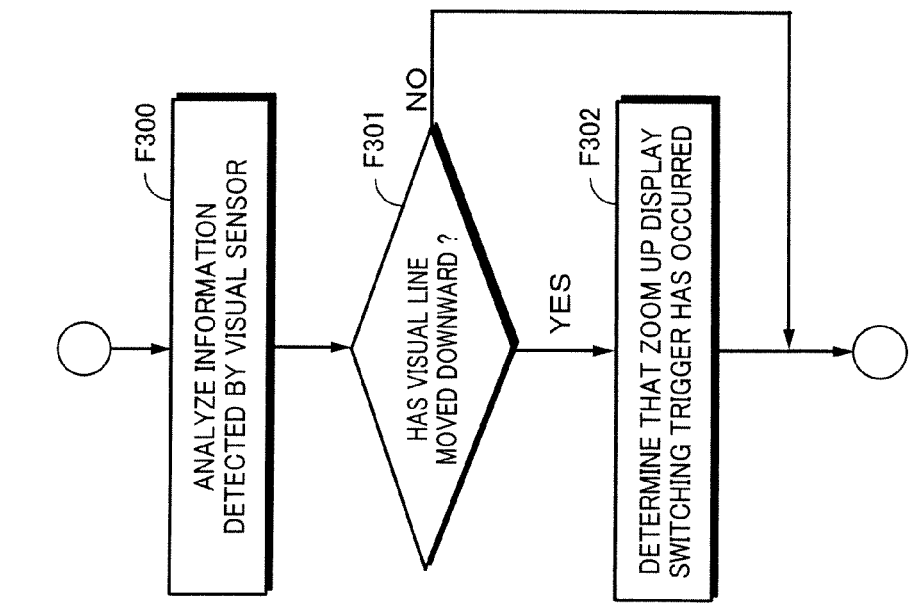

FIG. 12A shows an exemplary process of controlling a zoom operation corresponding to the movement of the user's visual line.

At step F300 shown in FIG. 12A, the system controller 10 analyzes information detected by the visual sensor 19. For example, when an image capturing section that captures an image of a user's eye is disposed as the visual sensor 19, the system controller 10 analyzes the captured image.

When the system controller 10 has detected that the user's visual direction has moved downward, the flow advances from step F301 to step F302. At step F302, the system controller 10 determines that a zoom up (wide angle zoom) display switching trigger has occurred.

When the determined result at step F302 denotes that a wide angle zoom switching trigger has occurred, the flow advances from step F104 to F106 shown in FIG. 10. At step F106, the system controller 10 commands the image capturing control section 11 to perform a zoom up operation. Thus, the display sections 2 display an image as shown in FIG. 4B.

When the user's visual line moves downward, he or she is reading a newspaper or a book or seeing a position very close to the eyes. Thus, when the image is zoomed up, it is suitably displayed for the user who is myopia or presbyopic.

FIG. 12B is an exemplary process of controlling a zoom operation corresponding to a motion of the user's neck (head) and his or her focus distances of his or her eyes.

At step F310 shown in FIG. 12B, the system controller 10 analyzes information detected by the visual sensor 19 and detects the focus distances and visual direction of user's eyes corresponding to the analyzed result. At step F311, the system controller 10 monitors information (an acceleration signal and an angular velocity signal) detected by the acceleration sensor 20 and the gyro 21 and determines a motion of the user's neck corresponding to the detected information.

Thereafter, at step F312 and step F313, the system controller 10 determines whether the user is seeing a near position or a far position corresponding to the detected results of the focus distances of the user's eyes and the orientation of his or her neck.

When the system controller 10 has determined that the user is seeing a near position (especially, his or her hand), the flow advances from step F312 to step F314. At step F314, the system controller 10 determines that a zoom up (wide angle zoom) display switching trigger has occurred. At step F316, the system controller 10 calculates a proper zoom magnification corresponding to the focus distance of the user's eyes and the orientation of his or her neck (head).

When the system controller 10 has determined that the user is seeing a far position, the flow advances from step F313 to step F315. At step F315, the system controller 10 determines that a telescopic zoom display switching trigger has occurred. At step F316, the system controller 10 calculates a proper zoom magnification corresponding to the focus distances of the user's eyes and the origination of his or her neck (head).

When the processes of step F314 and step F316 or the processes of step F315 and step F316 have been performed, the flow advances from step F104 to step F106 shown in FIG. 10. At step F106, the system controller 10 commands the image capturing control section 11 to perform a zoom operation with the calculated magnification.

Thus, the display sections 2 display a zoom up image as shown in FIG. 4B or a telescopic image as shown in FIG. 3C corresponding to a scene that the user is seeing.

Such operations become a function of assisting both users who are myopia and hyperopia.

In FIG. 12A and FIG. 12B, processes of changing a display image by the zoom operation of the display driving section 13 are exemplified. Instead, the system controller 10 may cause the display image processing section 12 to execute an image enlargement process, an image reduction process, or the like corresponding to the user's visual direction, the focus distances of his or her eyes, the orientation of his or her neck, and so forth.

Figure 13A:
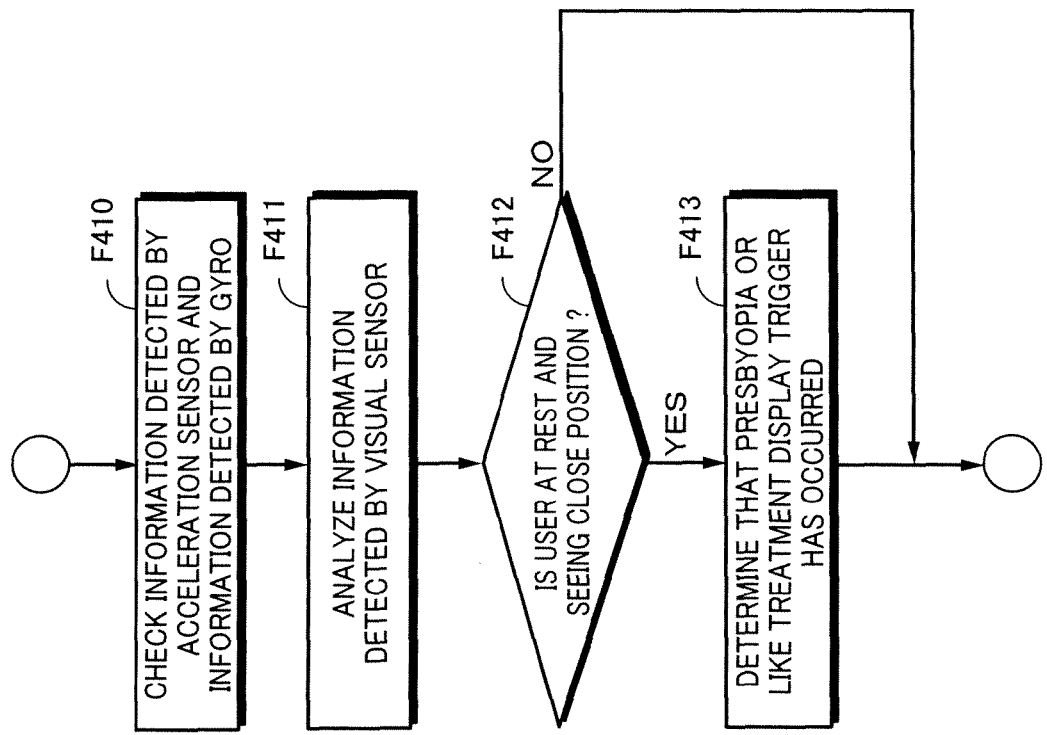
FIG. 13A and FIG. 13B are flow charts showing image control trigger determination processes according to the first embodiment of the present invention.

FIG. 13A shows an exemplary process of inputting information about user's eye sights from the input section 17. When information about user's eye sights has been input from the input section 17, the flow advances from step F400 to step F401 shown in FIG. 13A. At step F401, the system controller 10 determines that an eye sight basis display switching trigger has occurred. At step F402, the system controller 10 calculates a magnification corresponding to the values of the eye sights.

When the processes of step F401 and step F402 have been performed, the flow advances from step F104 to step F106 shown in FIG. 10. At step F106, the system controller 10 commands the display image processing section 12 to performs an enlarge display operation with the calculated magnification. In this process, the display sections 2 display an enlarged image corresponding to the user's eye sights.

Instead, the system controller 10 may correlatively pre-store users' eye fundus patterns and eye sight information to for example an internal memory. The user is identified by detecting his or her eye fundus pattern. The system controller 10 may command the display sections 2 to display an enlarged image corresponding to the eye sights of the user.

Figure 13B:
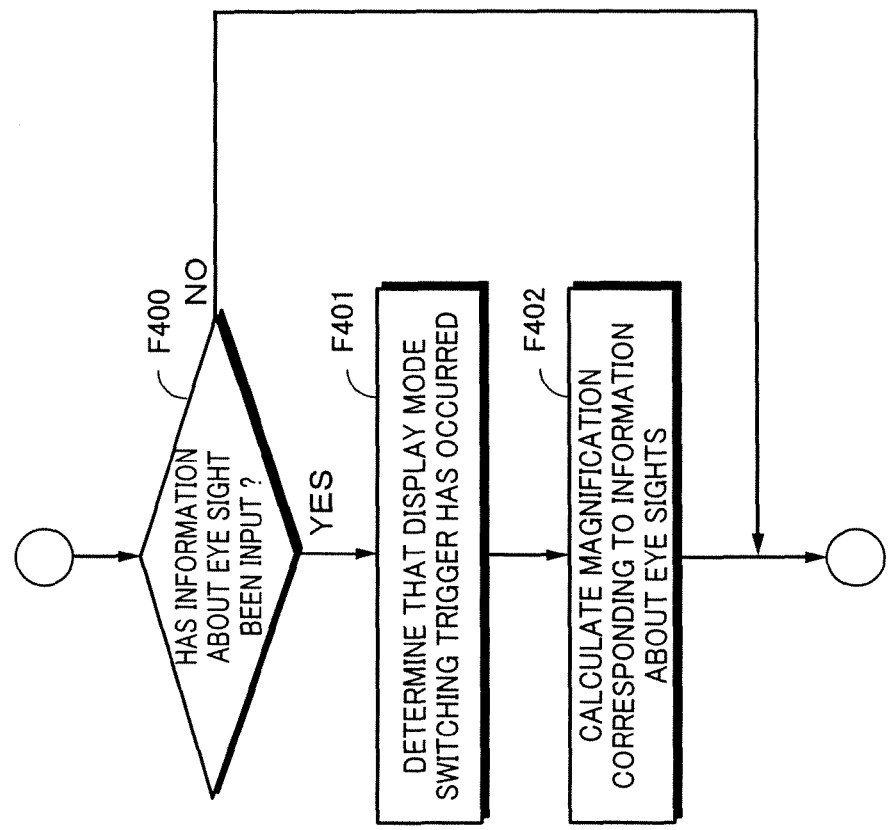

FIG. 13B shows an exemplary process of treating a decreased sensitivity against brightness, blurring, and so forth for the users who are for example presbyopic and astigmatic and treating a dark environment.

At step F410, the system controller 10 monitors information (an acceleration signal and an angular velocity signal) detected by the acceleration sensor 20 and the gyro 21 and determines a motion of the user corresponding to the detected results. For example, the system controller 10 determines whether or not the user is at rest of which he or she is not walking corresponding to the detected results. At step F411, the system controller 10 analyzes information detected by the visual sensor 19 and detects the focus distances of the user's eyes, a dilation of pupils of his or her eyes, and the screw-up (the state of eyelids of his or her eyes) corresponding to the analyzed results.

When the determined result denotes that the user is at rest and is seeing a near distance or is screwing up his or her eyelids, the flow advances from step F412 to step F413. At step F413, the system controller 10 determines that a presbyopia or the like treatment display trigger has occurred.

When the determined result at step F413 denotes that the trigger has occurred, the flow advances from step F104 to step F106 shown in FIG. 10. In this case, the system controller 10 commands the display driving section 13 to improve the image capturing sensitivity and commands the captured image signal processing section 15 or the display image processing section 12 to perform a process of increasing the brightness and contrast and enhancing the edge (sharpness). Thus, in this process, the display sections 2 clearly display an image as shown in FIG. 6B. Thus, this process visually assists a user who is presbyopia or who is in a dark place when he or she reads for example a newspaper.

In this case, as shown in FIG. 4B, the system controller 10 may cause the display sections 2 to perform an image enlarging operation.

When the system controller 10 has determined that the user is in a dark place corresponding to a dilation of the pupils of his or her eyes, the system controller 10 may control the lighting section 4 to light up.

Figure 14:
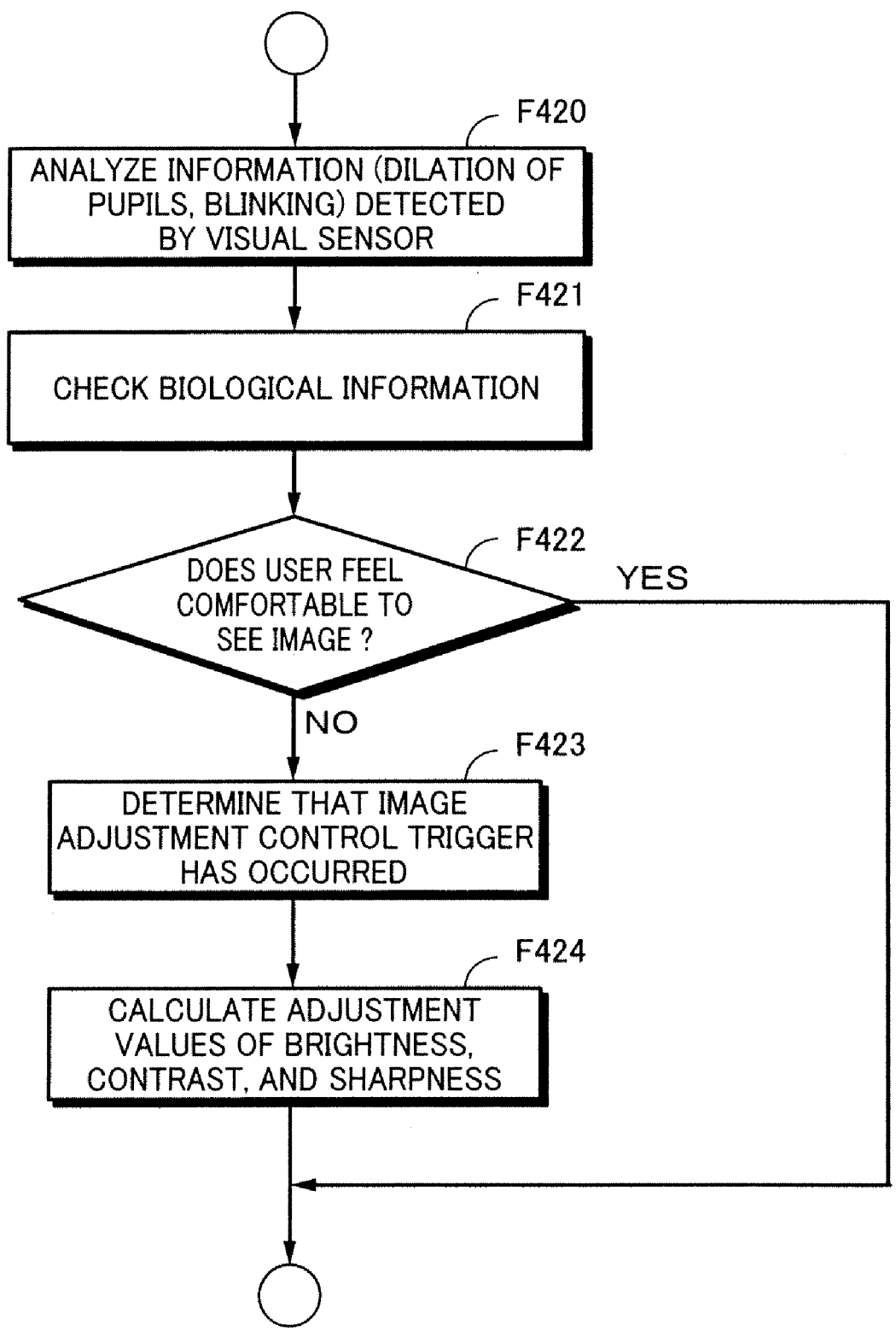
FIG. 14 is a flow chart showing an image control trigger determination process according to the first embodiment of the present invention.

FIG. 14 shows an exemplary process of treating a user's visual sense depending on whether he or she is comfortable or uncomfortable.

At step F420 shown in FIG. 14, the system controller 10 analyzes information detected by the visual sensor 19 and detects a dilation of the pupils of the user's eyes and blinking (the number of times per unit time) of his or her eyes corresponding to the analyzed results.

At step F421, the system controller 10 checks information of brain waves, heart rate, amount of perspiration, blood pressure, and so forth detected by the biological sensor 22.

The system controller 10 determines whether the user feels comfortable or uncomfortable to see an image displayed on the display sections 2 corresponding to the information detected by the visual sensor 19 and the biological sensor 22.

When the determined result denotes that the user does not feel comfortable to see the image, the flow advances from step F422 to step F423. At step F423, the system controller 10 determines that an image adjustment control trigger has occurred. In this case, the flow advances to step F424. At step F424, the system controller 10 calculates adjustment values supposed to be comfortable corresponding to a user's situation, for example, those for brightness, contrast, sharpness, image capturing sensitivity, brightness of lighting, and so forth.

When the processes of step F423 and step F424 have been performed, the flow advances from step F104 to step F106 shown in FIG. 10. In this case, at step F106, the system controller 10 commands the image capturing section 13 to adjust the image capturing sensitivity and commands the captured image signal processing section 15 or the display image processing section 12 to perform processes of adjusting the brightness, contrast, sharpness, and so forth. In this process, the quality of an image displayed on the display sections 2 is adjusted such that the user feels comfortable to see the image displayed on the display sections 2. When the determined result denotes that the user is in a dark place, the system controller 10 may control the lighting section 4 to light up.

When the user feels uncomfortable to see an image displayed on the display sections 2 because of for example a situation of user's eye sights, surrounding brightness, and fatigue of his or her eyes, this process provides a comfortable visible situation to him or her. For example, when the user is in a dark place and he or she is unable to clearly see an image, this process provides a clear image to him or her. When the user's eyes are fatigued, this process provides a soft image to him or her.

The processes shown in FIG. 12A and FIG. 12B, FIG. 13A and FIG. 13B, and FIG. 14 are performed without user's intentional operations in such a manner that the system controller 10 determines his or her situation and controls the display image mode corresponding to his or her situation. In contrast, processes shown in FIG. 15, FIG. 16, and FIG. 17A and FIG. 17B are performed in such a manner that user's intentional actions are treated as image control triggers (or one of trigger conditions). Next, with reference to FIG. 15, FIG. 16, and FIG. 17A and FIG. 17B, these processes will be described.

Figure 15:
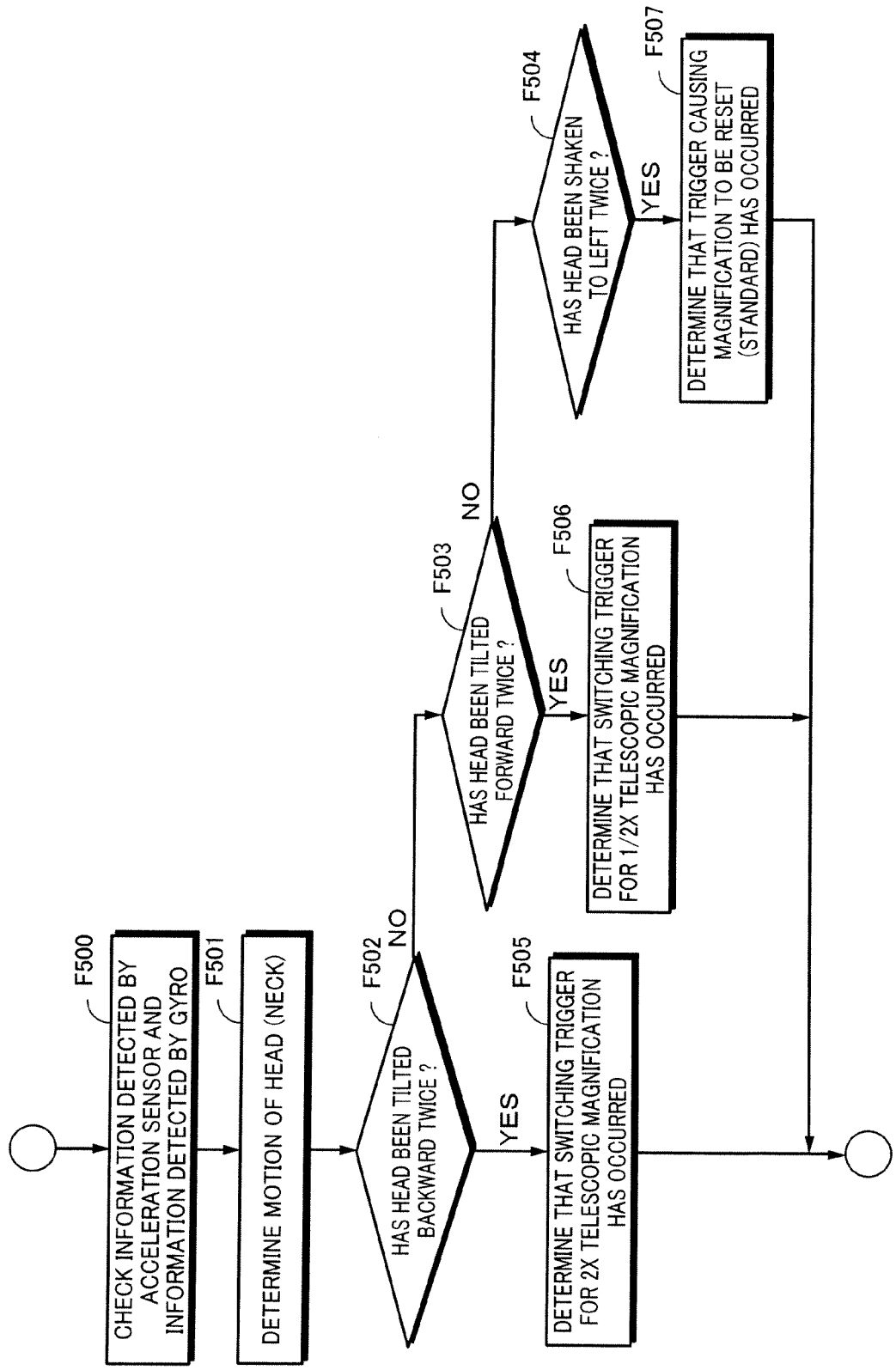
FIG. 15 is a flow chart showing an image control trigger determination process according to the first embodiment of the present invention.

FIG. 15 shows a process of treating a motion of the user's neck (head) as an operation.

At step F500, the system controller 10 monitors information (an acceleration signal and an angular velocity signal) detected by the acceleration sensor 20 and the gyro 21. At step F501, the system controller 10 determines a motion of the user's head corresponding to the detected information. For example, the system controller 10 determines whether the user has tilted his or her head backward twice, he or she has tilted his or her head forward twice, or he or she has shaken his or her neck to the left twice.

When the system controller 10 has detected that the user has tilted his or her head backward twice, the flow advances from step F502 to step F505. At step F505, the system controller 10 determines that an image switching trigger for a 2× telescopic magnification has occurred.

In this case, the flow advances from step F104 to step F106 shown in FIG. 10. At step F106, the system controller 10 commands the image capturing control section 11 to perform a zoom operation with a 2× telescopic magnification. Thus, the display sections 2 display an image with a 2× telescopic magnification as shown in FIG. 3C.

When the system controller 10 has detected that the user has tilted his or her head forward twice, the flow advances from step F503 to step F506. At step F506, the system controller 10 determines that an image switching trigger of a ½× telescopic magnification has occurred. In this case, the flow advances from step F104 to step F106 shown in FIG. 10. At step F104, the system controller 10 commands the image capturing control section 11 to perform a zoom operation with a ½× telescopic magnification. Thus, the display sections 2 displays an image with a ½× telescopic magnification.

When the system controller 10 has detected that the user has shaken his or her neck to the left twice, the flow advances from step F504 to step F507. At step F507, the system controller 10 determines that an image switching trigger that causes a telescopic magnification to be reset has occurred. In this case, the flow advances from step F104 to step F106 shown in FIG. 10. At step F104, the system controller 10 commands the image capturing control section 11 to perform a zoom operation with a standard magnification. Thus, the display sections 2 display an image with a standard magnification.

Since a user's intentional motion is determined as a trigger and a display image mode is switched corresponding thereto, his or her desired visual sight is provided to him or her.

Besides motions of a user's neck, motions of his or her whole body such as jumping and motions of his or her hands, arms, and legs may be determined as predetermined operations.

Besides zoom operations, an image enlargement operation shown in FIG. 5B, an image reduction operation, an image capturing sensitivity operation, a captured image frame rate selection operation, an increased infrared image capturing sensitivity display operation shown in FIG. 7B, an increased ultraviolet image capturing sensitivity display operation shown in FIG. 8B, a separation display operation shown in FIG. 9B, a strobe display operation shown in FIG. 9C, and so forth may be performed corresponding to user's actions or motions.

Figure 16:
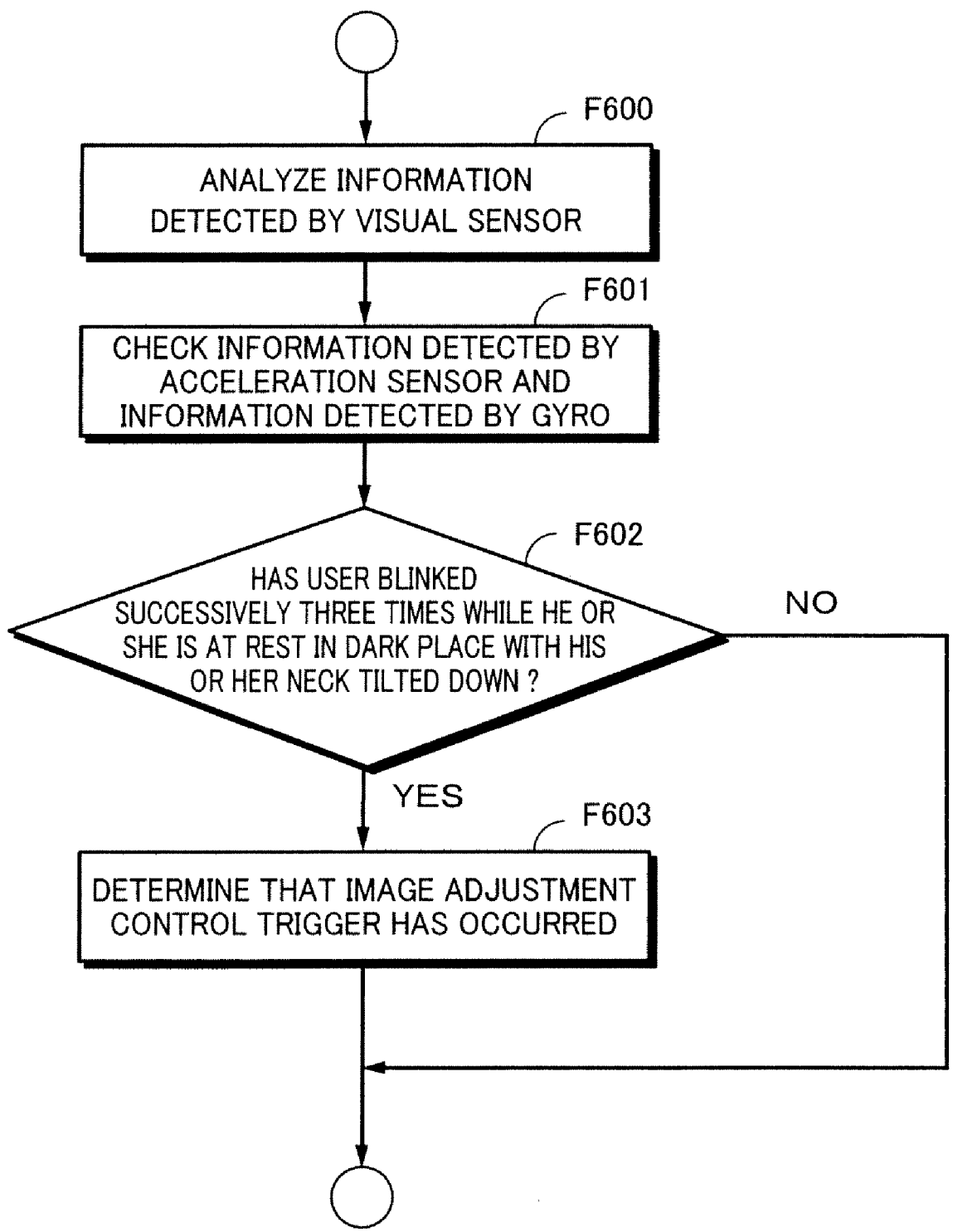
FIG. 16 is a flow chart showing an image control trigger determination process according to the first embodiment of the present invention.

FIG. 16 shows a process of treating a user's action as a predetermined controlling trigger corresponding to his or her situation and an surrounding environment.

At step F600 shown in FIG. 16, the system controller 10 analyzes information detected by the visual sensor 19 and detects a dilation of pupils and blinking of his or her eyes corresponding to the analyzed results. At step F601, the system controller 10 monitors information (an acceleration signal and an angular velocity signal) detected by the acceleration sensor 20 and the gyro 21 and determines whether the user is moving (stops) his or her neck or whole body (non-walking state).

At step F602, the system controller 10 determines whether the user is at rest with his or her neck tilted down, the surrounding environment is dark, and he or she has performed a particular action such as he or she has blinked three times.

In other words, the system controller 10 determines whether or not the user is at rest with his or her neck tilted down corresponding to information detected by the acceleration sensor 20 and the gyro 21. In addition, the system controller 10 determines whether or not the user is in a dark environment corresponding to a dilation of pupils of his or her eyes. While these conditions have been satisfied, the system controller 10 determines whether or not the user has blinked successively three times.

When the user is at rest with his or her neck tilted down and he or she is in a dark environment, he or she is reading something in a dark room. When the user has intentionally blinked successively three times in this situation, the system controller 10 determines that he or she wishes a bright and clear image. Thus, when the system controller 10 has detected that the user has blinked successively three times in such a situation, the flow advances to step F603. At step F603, the system controller 10 determines that an image adjustment control trigger has occurred.

When the process of step F603 has been performed, the flow advances from step F104 to step F106 shown in FIG. 10. In this case, at step F106, the system controller 10 commands the display driving section 13 to increase the image capturing sensitivity and commands the captured image signal processing section 15 or the display image processing section 12 to perform a process of increasing the brightness, enhancing the contrast and sharpness, and so forth. Instead, the system controller 10 may command the lighting section 4 to light up.

As a result, the user can see an image in a comfortable situation.

In this example, an operation of blinking of user's eyes is enabled as long as user's situation and surrounding environmental conditions have been satisfied. This process is effective since an image is not changed even after the user has unintentionally performed a relevant action.

FIG. 17A shows an exemplary process of capturing an image with an increased infrared sensitivity described with reference to FIG. 7B. An operation corresponding to a user's action is enabled or disabled corresponding to a user's physical situation.

At step F700 shown in FIG. 17A, the system controller 10 monitors information (an acceleration signal and an angular velocity signal) detected by the acceleration sensor 20 and the gyro 21 and determines a motion of the user's neck and a motion of his or her whole body corresponding to the detected results.

At step F701, the system controller 10 checks brain waves, heart rate, amount of perspiration, blood pressure, and so forth detected by the biological sensor 22. The system controller 10 determines whether or not the user is tense or excited corresponding to the information detected by the biological sensor 22.

When the system controller 10 has detected a predetermined action (for example, he or she has shaken his or her neck) that causes the image capturing and displaying apparatus 1 to perform an infrared image capturing operation, the flow advances from step F702 to step F703. At step F703, the system controller 10 determines whether the user is tense or excited.

When the system controller 10 has determined that the user is neither tense, nor excited, the system controller 10 determines that the user's action is a valid operation. Thereafter, the flow advances to step F704. At step F704, the system controller 10 determines that an increased infrared sensitivity image capturing operation trigger has occurred.

When the process of step F704 has been performed, the flow advances from step F104 to step F106 shown in FIG. 10. In this case, at step F106, the system controller 10 commands the image capturing section 3 to increase the infrared image capturing sensitivity. Thus, the display sections 2 display an image as shown in FIG. 7B.

In contrast, when the determined result at step F703 denotes that the user is tense or excited, the system controller 10 determines that an increased infrared sensitivity image capturing operation trigger have not occurred. In other words, the system controller 10 disables the operation corresponding to the user's action.

Thus, the validity of an operation corresponding to a user's action may be determined along with a condition of his or her physical situation. In this case, a special image capturing function such as an increased infrared sensitivity image capturing operation can be effectively prevented from being improperly used.

FIG. 17B shows an exemplary process of capturing an image with an increased ultraviolet sensitivity described with reference to FIG. 8B.

At step F710 shown in FIG. 17B, the system controller 10 monitors information (an acceleration signal and an angular velocity signal) detected by the acceleration sensor 20 and the gyro 21 and determines a motion of his or her neck, a motion of his or her whole body, or the like corresponding to the detected results.

When the system controller 10 has detected that the user has performed a predetermined action that causes the image capturing and displaying apparatus 1 to perform an ultraviolet image capturing operation, the flow advances from step F711 to step F712. At step F712, the system controller 10 determines that an increased ultraviolet sensitivity image capturing operation trigger has occurred.

After the process of step F712 has been performed, the flow advances from step F104 to step F106 shown in FIG. 10. In this case, at step F106, the system controller 10 commands the image capturing section 3 to increase the ultraviolet image capturing sensitivity. Thus, the display sections 2 display an image as shown in FIG. 8B.

In the foregoing, display mode switching triggers for captured images and display modes have been exemplified. It should be noted that there may be other examples.

When the display mode of the display sections 2 is switched corresponding to an image control trigger, as shown in FIG. 9B, area AR1 of the screen of the display sections 2 may be the through state or display a normally captured image and area AR2 that is a part of the screen may display an image in another display mode. Instead, AR1, which is a wide area, may display an image corresponding to an image control trigger. Instead, the screen may be equally divided and a normally captured image and an image corresponding to an image control trigger may be displayed therein.

Next, with reference to FIG. 18A, FIG. 18B, FIG. 19A, and FIG. 19B, triggers detected at step F105 shown in FIG. 10, namely triggers that cause the monitor display state to be switched to the through state for captured images will be described.

Figure 18B:
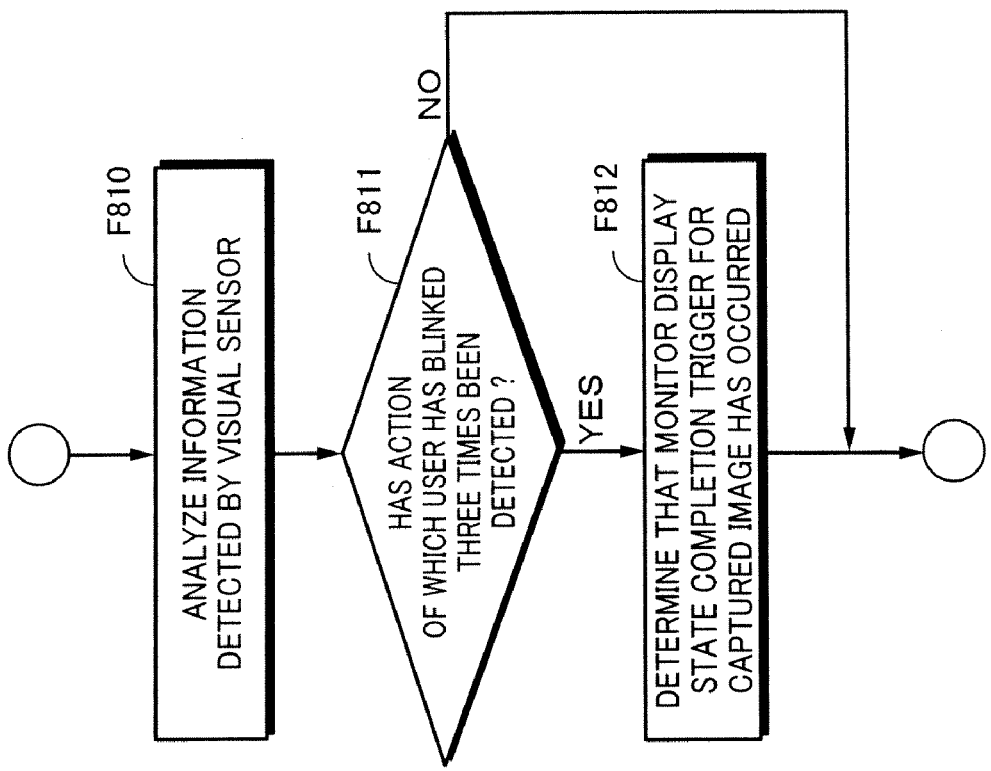
FIG. 18A and FIG. 18B are flow charts showing monitor display completion trigger determination processes according to the first embodiment of the present invention.
Figure 18A:
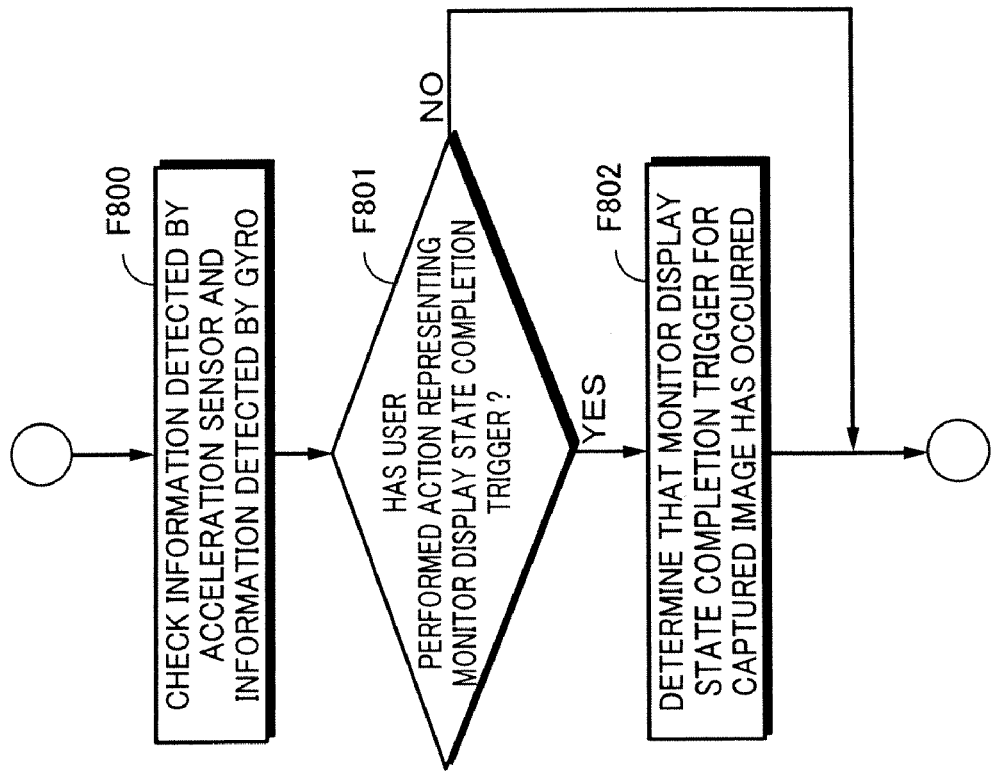

FIG. 18A shows an exemplary process of completing the monitor display state corresponding to a user's intentional action.

At step F800 shown in FIG. 18A, the system controller 10 monitors information detected by the acceleration sensor 20 and the gyro 21 and determines a motion of the user's neck, a motion of his or her whole body, or the like corresponding to the detected information.

When the system controller 10 has detected that the user has performed a predetermined action that causes the image capturing and displaying apparatus 1 to complete the monitor display state, the flow advances from step F801 to step F802. At step F802, the system controller 10 determines that a captured image monitor display completion trigger has occurred.

When the process of step F802 has been performed, the flow advances from step F105 to step F101 shown in FIG. 10. In this case, at step F101, the system controller 10 commands the display control section 14 to switch the display state to the through state. Thus, the display sections 2 restore the display state to the through state as shown in FIG. 3A.

FIG. 18B shows an exemplary process of completing the monitor display state corresponding to a user's intentional action.

At step F810 shown in FIG. 18B, the system controller 10 analyzes information detected by the visual sensor 19. When a predetermined action of which the user has blinked successively three times has been defined as a user's operation that causes the image capturing and displaying apparatus 1 to complete the monitor display state, the system controller 10 monitors the action by analyzing an image.

When the system controller 10 has detected that the user has blinked successively three times, the flow advances from step F811 to step F812. At step F812, the system controller 10 determines that a monitor display state completion trigger for a captured image signal has occurred.

When the process of step F812 has been performed, the flow advances from step F105 to step F101 shown in FIG. 10. At step F101, the system controller 10 commands the display control section 14 to switch the display state to the through state. Thus, the display sections 2 restore the display state to the through state as shown in FIG. 3A.

In the processes shown in FIG. 18A and FIG. 18B, when the user causes the image capturing and displaying apparatus 1 to operate in the through state, display sections 2 become the through state corresponding to his or her wish.

Of course, there may be other types of user's actions that cause the display sections 2 to restore the display state to the through state.

Figure 19B:
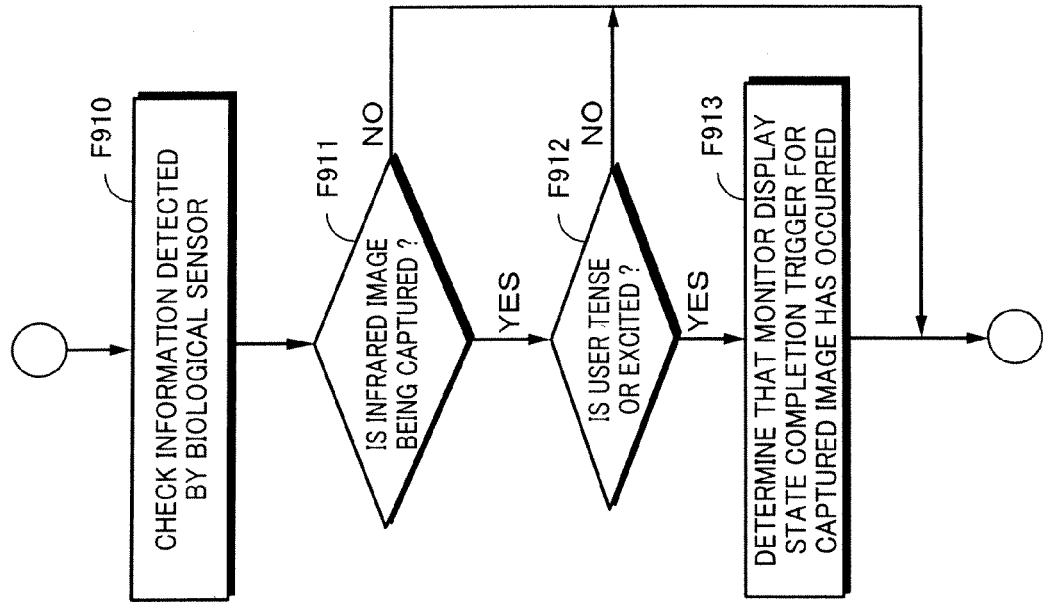
FIG. 19 are flow charts showing a monitor display completion trigger determination process according to the first embodiment of the present invention.
Figure 19A:
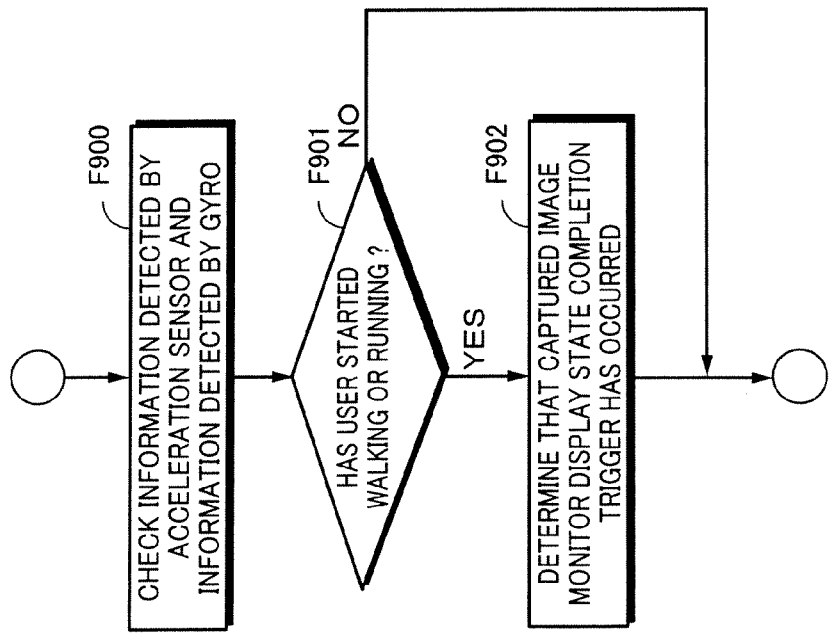

FIG. 19A shows an exemplary process of automatically restoring the display state to the through state corresponding to a user's motion (a motion that he or she does not recognize as an operation).

At step F900 shown in FIG. 19A, the system controller 10 monitors information detected by the acceleration sensor 20 and the gyro 21 and determines whether or not there is a motion of the user's whole body. In particular, the system controller 10 detects whether the user is at rest, walking, or running.

When the system controller 10 has determined that the user has started walking or running, the flow advances from step F901 to step F902. At step F902, the system controller 10 determines that a monitor display state completion trigger for a captured image has occurred.

When the process of step F902 has been performed, the flow returns from step F105 to step F101 shown in FIG. 10. In this case, at step F101, the system controller 10 commands the display control section 14 to switch the display state to the through state. Thus, the display sections 2 restore the display state to the through state as shown in FIG. 3A.

While the user is walking or running, it is preferred to restore the display state to the through state from a safety point of view.

Instead of restoration of the display state to the through state, while the user is walking or running, the system controller 10 may command the display control section 14 to switch the display state to the monitor display state for a normally captured image that is similar to that the user sees in the through state as shown in FIG. 3B.

FIG. 19B shows an exemplary process of automatically restoring the display state to the through state corresponding to a user's physical situation such that an infrared image capturing operation is prevented from being improperly used.

At step F910 shown in FIG. 19B, the system controller 10 checks information about for example brain waves, heart rate, amount of perspiration, blood pressure, and so forth detected by the biological sensor 22. The system controller 10 determines whether the user is tense or excited corresponding to the information detected by the biological sensor 22.

While an increased infrared sensitivity image capturing operation is being executed, the flow advances from step F911 to step F912. At step F912, the system controller 10 determines whether the user is tense or excited.

When the determined result denotes that the user is neither tense, nor excited, the system controller 10 permits the image capturing and displaying apparatus 1 to continue the increased infrared sensitivity image capturing operation. In contrast, when the determined result denotes that the user is tense or exited, the flow advances to step F913. At step F913, the system controller 10 determines that a monitor display state completion trigger for a captured image has occurred.

When the process of step F913 has been performed, the flow returns from step F105 to step F101 shown in FIG. 10. In this case, at step F101, the system controller 10 commands the display control section 14 to switch the display state to the through state. In other words, the system controller 10 commands the display control section 14 to complete the monitor display state for the increased infrared sensitivity image capturing operation. As a result, the display sections 2 restore the display state to the through state.

It is preferred to complete the increased infrared sensitivity image capturing operation and restore the display state to the through state corresponding to a user's physical situation to prevent him or her from improperly using the increased infrared sensitivity image capturing operation.

Instead of restoration of the display state to the through state, the increased infrared sensitivity image capturing operation may be completed and a normally captured image may be displayed.

[6. Effects, Modifications, and Extensions of First Embodiment]

According to this embodiment, an image captured by the image capturing section 3 disposed in the eye-glass type mounting unit or the headgear type mounting unit, namely a captured image in the direction of user's eyes as the direction of a subject, is displayed on the display sections 2 in front of his or her eyes. In this case, an image capturing operation or a display operation is controlled corresponding to information about his or her motion or physical situation. As a result, a situation of virtually assisting or extending user's visual ability can be created.

Since the image capturing operation of the image capturing section 3 and the changes of the display modes corresponding to signal processes of the captured image signal processing section 15 and the display image processing section 12 are performed corresponding to a user's wish or situation determined corresponding to information about his or her motion or physical situation. Thus, no operational burden is imposed on the user. In addition, since the image capturing and displaying apparatus 1 is appropriately controlled, the user can use it with ease.

In addition, since the display sections 2 become the through state, which is transparent or semitransparent, by controlling its transmissivity, while the user puts on the mounting unit, it does not disturb his or her ordinary life. Thus, in the user's ordinary life, the benefits of the image capturing and displaying apparatus 1 according to this embodiment can be effectively used.

In this embodiment, the image capturing operation of the image capturing section 3 and the display modes accomplished by the signal processes of the captured image signal processing section 15 and the display image processing section 12 have been mainly described. For example, the switching of power on, power off, and standby, the sound volume, and the sound quality of a sound that is output from the sound output section 5 may be controlled corresponding to a user's action and/or physical situation. For example, the sound volume may be adjusted in consideration of user's comfort corresponding to information detected by for example the biological sensor 22.

The appearance and structure of the image capturing and displaying apparatus 1 are not limited to those shown in FIG. 1 and FIG. 2. Instead, various modifications may be made.

For example, a storage section that stores an image signal captured by the image capturing section 3 and a transmission section that transmits the image signal to other devices may be disposed in the image capturing and displaying apparatus 1.

In addition to the image capturing section 3 as a source of an image that is displayed on the display sections 2, an input section and a receiving section that input an image from an external device may be disposed in the image capturing and displaying apparatus 1.

In addition, a character recognition section that recognizes characters contained in an image and a sound synthesizing section that performs a sound synthesizing process may be disposed in the image capturing and displaying apparatus 1. When a captured image contains characters, the sound synthesizing section may generate a reading voice signal and the sound output section 5 may output a voice corresponding to the signal.

In this embodiment, an example of which the image capturing and displaying apparatus 1 is an eye-glass type mounting unit or a head mounting unit was described. However, as long as the image capturing and displaying apparatus captures an image in the direction of user's eyes and displays an image in front of his or her eyes, the apparatus may be any type such as a headphone type, a neckband type, an ear hanging type, or the like on which the user puts. Instead, the image capturing and displaying apparatus 1 may be a unit that is attached to eye-glasses, a visor, a headphone, or the like using a mounting member such as a clip.

Second Embodiment

Next, an image capturing and displaying apparatus and an image capturing and displaying method according to a second embodiment of the present invention will be described in the following order.

[1. Exemplary appearance of image capturing and displaying apparatus]
[2. Exemplary structure of image capturing and displaying apparatus]
[3. Exemplary display images]
[4. Determination of user's situation]
[5. Exemplary operations]
[6. Effects, modifications, and extensions of second embodiment]

[1. Exemplary Appearance of Image Capturing and Displaying Apparatus]

An exemplary appearance of the image capturing and displaying apparatus according to the second embodiment is the same as that according to the first embodiment.

[2. Exemplary Structure of Image Capturing and Displaying Apparatus]

Figure 20:
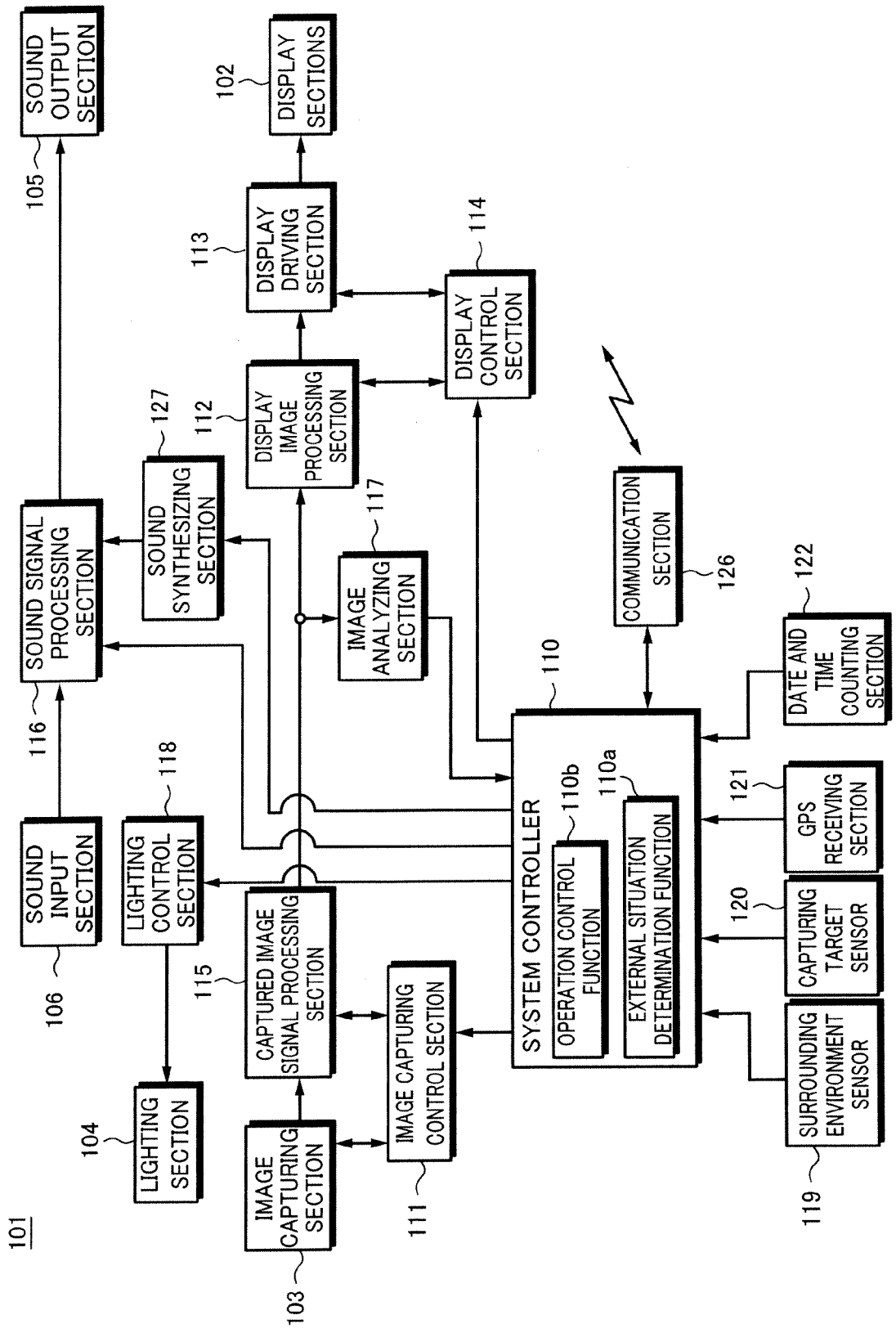
FIG. 20 is a block diagram showing an image capturing and displaying apparatus according to a second embodiment of the present invention.

FIG. 20 shows an exemplary internal structure of an image capturing and displaying apparatus 101 according to the second embodiment of the present invention.

A system controller 110 is composed of a microcomputer including for example a CPU (Central Processing Unit), a ROM (Read Only Memory), a RAM (Random Access Memory), a nonvolatile memory section, and an interface section. The system controller 110 is a control section that controls all the sections of the image capturing and displaying apparatus 101.

The system controller 110 controls each section of the image capturing and displaying apparatus 101 corresponding to an external situation. In other words, the system controller 110 operates corresponding to an operation program that detects and determines an external situation and controls each section corresponding to the detected and determined situation. Thus, as shown in FIG. 20, the system controller 110 functionally includes an external situation determination function 110*a* that determines an external situation and an operation control function 110*b* that controls and commands each section corresponding to the determined result of the external situation determination function 110*a*.

Disposed in the image capturing and displaying apparatus 101 are an image capturing section 103, an image capturing control section 111, and a captured image signal processing section 115 as a structure that captures an image in front of the user.

The image capturing section 103 includes a lens system having the image capturing lens 103*a* (shown in FIG. 1), a diaphragm, a zoom lens, a focus lens, and so forth, a driving system that causes the lens system to perform a focus operation and a zoom operation, and a solid state image sensor array that detects the light of a captured image obtained by the lens system, converts the light into electricity, and generates a captured image signal corresponding to the electricity. The solid state image sensor array is composed of for example a CCD (Charge Coupled Device) sensor array or a CMOS (Complementary Metal Oxide Semiconductor) sensor array.

The captured image signal processing section 115 includes a sample hold/AGC (Automatic Gain Control) circuit that adjusts the gain of and trims the waveform of the signal obtained by the solid state image sensor array of the image capturing section 103 and a video A/D converter. The captured image signal processing section 115 obtains a captured image signal as digital data. The captured image signal processing section 115 performs a white balance process, a brightness process, a color signal process, a vibration correction process, and so forth for the captured image signal.

The image capturing control section 111 controls the operations of the image capturing section 103 and the captured image signal processing section 115 corresponding to commands received from the system controller 110. The image capturing control section 111 for example turns on and off the operations of the image capturing section 103 and the captured image signal processing section 115. In addition, the image capturing control section 111 controls the image capturing section 103 to perform an auto focus operation, an automatic exposure adjustment operation, an aperture adjustment operation, a zoom operation, and so forth (by motors).

In addition, the image capturing control section 111 includes a timing generator. The image capturing control section 111 controls the sample hold/AGC circuit and the video A/D converter of the solid state image sensor array and the image capturing control section 111 with a timing signal generated by the timing generator. In addition, the image capturing control section 111 can change the frame rate of a capturing image with the timing signal.

In addition, the image capturing control section 111 controls the image capturing sensitivity and the signal process of the solid state image sensor array and the captured image signal processing section 115. To control an image capturing sensitivity, the image capturing control section 111 controls for example the gain of the signal that has been read from the solid state image sensor array, black level setting, various types of coefficients of digital data of the captured image signal process, a correction amount of the vibration correction process, and so forth. With respect to image capturing sensitivity adjustments, the image capturing control section 111 can perform an overall sensitivity adjustment regardless of a wavelength band and specific sensitivity adjustments for specific wavelength bands such as an infrared region and an ultraviolet region (for example, an image can be captured such that a predetermined wavelength band is cut). The wavelength specific sensitivity adjustment can be performed by inserting a wavelength filter into the image capturing lens system and by performing a wavelength filter calculation process for the captured image signal. In these cases, the image capturing control section 111 can control the sensitivity for example by inserting a wavelength filter and/or specifying a filter calculation coefficient.

As a structure that displays data to the user, the image capturing and displaying apparatus 101 includes the display sections 102, a display image processing section 112, a display driving section 113, and a display control section 114.

A captured image signal of which an image has been captured by the image capturing section 103 and then processed by the captured image signal processing section 115 is supplied to the display image processing section 112. The display image processing section 112 is for example a so-called video processor. The display image processing section 112 executes various types of display processes for the supplied captured image signal. The display image processing section 112 can perform for example a brightness level adjustment, a color correction, a contrast adjustment, a sharpness (edge enhancement) adjustment, and so forth for the captured image signal. In addition, the display image processing section 112 can generate an enlarged image of which a part of a captured image signal is enlarged and a reduced image, highlight a part of an image, separates an image for a separation display, combines images, generates a character image and a graphic image, and superimposes a generated image with a captured image. In other words, the display image processing section 112 can perform various types of processes for a digital image signal as a captured image signal.

The display driving section 113 is composed of a pixel driving circuit that displays the image signal supplied from the display image processing section 112 on the display sections 102, which are for example a liquid crystal display. In other words, the display driving section 113 applies a driving signal based on the image signal to each pixel formed in a matrix shape in the display sections 102 at predetermined horizontal/vertical drive timings to cause the display sections 102 display an image. In addition, the display driving section 113 controls the transmissivity of each pixel to cause the display sections 102 to become the through state.

The display control section 114 controls the process and operation of the display image processing section 112 and the operation of the display driving section 113 corresponding to commands received from the system controller 110. In other words, the display control section 114 causes the display image processing section 112 to execute the foregoing various types of processes. In addition, the display control section 114 controls the display driving section 113 to cause the display sections 102 to switch the display state between the through state and the image display state.

In the following description, the state of which the display sections 102 becomes transparent or semitransparent is referred to as the "through state", whereas the operation (and its state) of which the display sections 102 displays an image is referred to as the "monitor display state".

In addition, the image capturing and displaying apparatus 101 includes a sound input section 106, a sound signal processing section 116, and a sound output section 105.

The sound input section 106 includes the microphones 106a and 106b shown in FIG. 1 and a microphone amplifying section that processes sound signals obtained by the microphones 106a and 106b.

The sound signal processing section 116 is composed of for example an A/D converter, a digital signal processor, a D/A converter, and so forth. The sound signal processing section 116 converts a sound signal supplied from the sound input section 106 into digital data and performs processes of a sound volume adjustment, a sound quality adjustment, an acoustic effect, and so forth under the control of the system controller 110. The sound signal processing section 116 converts the resultant sound signal into an analog signal and supplies the analog signal to the sound output section 105. The sound signal processing section 116 is not limited to the structure that performs a digital signal process. Instead, the sound signal processing section 116 may perform signal processes with an analog amplifier and an analog filter.

The sound output section 105 includes the pair of earphone speakers 105a shown in FIG. 1 and an amplifier circuit for the earphone speakers 105a.

The sound input section 106, the sound signal processing section 116, and the sound output section 105 allow the user to hear an external sound through the image capturing and displaying apparatus 101.

The sound output section 105 may be structured as a so-called osseous conduction speaker.

In addition, the image capturing and displaying apparatus 101 includes a sound synthesizing section 127. The sound synthesizing section 127 synthesizes a sound corresponding to a command issued from the system controller 110 and outputs the synthesized sound signal.

The sound synthesizing section 127 outputs the synthesized sound signal to the sound signal processing section 116. The sound signal processing section 116 processes the synthesized sound signal and supplies the resultant signal to the sound output section 105. The sound output section 105 outputs the sound to the user.

The sound synthesizing section 127 generates a sound signal of a reading voice that will be described later.

In addition, the image capturing and displaying apparatus 1 includes a lighting section 104 and a lighting control section 118. The lighting section 104 is composed of the light emission section 104a (for example, a light emission diode) shown in FIG. 1 and a light emission circuit that causes the light emission section 104a to emit light. The lighting control section 118 causes the lighting section 104 to execute a light emission operation corresponding to a command supplied from the system controller 110.

Since the light emission section 104a of the lighting section 104 is disposed such that the light emission section 104a lights up forward, the lighting section 104 performs a lighting operation in the user's visual direction.

As a structure that obtains external information, the image capturing and displaying apparatus 101 includes a surrounding environment sensor 119, a capturing target sensor 120, a GPS receiving section 121, a date and time counting section 122, an image analyzing section 128, and a communication section 126.

The surrounding environment sensor 119 is specifically a brightness sensor, a temperature sensor, a humidity sensor, an atmospheric pressure sensor, and so forth that detect information about surrounding brightness, temperature, humidity, weather, and so forth as a surrounding environment of the image capturing and displaying apparatus 101.

The capturing target sensor 120 is a sensor that detects information about a capturing target of an image capturing operation of the image capturing section 103. The capturing target sensor 120 may be a distance measurement sensor that detects information about the distance for example from the image capturing and displaying apparatus 101 to the capturing target.

The capturing target sensor 120 may be a sensor such as an infrared sensor that is a pyroelectric sensor that detects information of a predetermined wavelength and energy of an infrared emission of the capturing target. In this case, the capturing target sensor 120 can detect whether the capturing target is a living body such as a human or an animal.

Instead, the capturing target sensor 120 may be a sensor that detects information of a predetermined wavelength and energy of an ultraviolet emission of the capturing target such as one of various types of UV (Ultra Violet) sensors. In this case, the capturing target sensor 120 can detect whether the capturing target is a fluorescent material or a phosphor and detect a dose of an external ultraviolet emission necessary for countermeasures against sun tanning.

The GPS receiving section 121 receives radio waves from GPS (Global Positioning System) satellites, obtains the current position of the image capturing and displaying apparatus 101, and outputs information of latitude and longitude of the current position.

The date and time counting section 122 is a so-called clock section that counts date and time (years, months, days, hours, minutes, and seconds) and outputs information of the current date and time.

The image analyzing section 128 analyzes an image captured and processed by the image capturing section 103 and the captured image signal processing section 115. In other words, the image analyzing section 128 analyzes an image as a subject and obtains information of the subject contained in the captured image.

The communication section 126 communicates data with an external device. Examples of the external device include any types of devices having information processing function and a communication functions such as a computer device, a PDA (Personal Digital Assistant), a mobile phone, a video device, an audio device, and a tuner device.

In addition, examples of the external device may include a terminal device and a server device connected to a network such as the Internet.

In addition, examples of the external device may include a non-contact type communication IC card having a built-in IC chip, a two-dimensional barcode such as a QR code, and a hologram memory from which the communication section 126 obtains information.

In addition, examples of the external device may include another image capturing and displaying apparatus 101.

The communication section 126 may communicate to for example a near access point corresponding to for example a wireless LAN system, the Bluetooth system, or the like. Instead, the communication section 126 may directly communicate with an external device having a corresponding communication function.

These surrounding environment sensor 119, the capturing target sensor 120, the GPS receiving section 121, the date and time counting section 122, the image analyzing section 128, and the communication section 126 obtain external information of the image capturing and displaying apparatus 101 and supply the obtained information to the system controller 110.

The system controller 110 performs the process of the operation control function 110b to control the image capturing operation and the display operation corresponding to the external information obtained by the external situation determination function 110a. In other words, the system controller 110 commands the image capturing control section 111 to control the operations of the image capturing section 103 and the captured image signal processing section 115. In addition, the system controller 110 commands the display control section 114 to control the operations of the display image processing section 112 and the display driving section 113.

In this embodiment, the structure that obtains the external information is composed of the surrounding environment sensor 119, the capturing target sensor 120, the GPS receiving section 121, the date and time counting section 122, the image analyzing section 128, and the communication section 126. However, in the structure, some of them may be omitted. In addition, another sensor such as a voice analyzing section that detects and analyzes a surrounding voice may be disposed in the image capturing and displaying apparatus 101.

[3. Exemplary Display Images]

The system controller 110 controls the image capturing operation and the display operation corresponding to obtained external information. As a result, the user recognizes various display modes of the display sections 102. FIG. 3A to FIG. 3C to FIG. 9A to FIG. 9C, FIG. 21A and FIG. 21B, and FIG. 22A to FIG. 22B exemplify various display modes.

FIG. 3A shows the state that the display sections 102 are the through state. In other words, in this state, the display sections 102 are simple transparent planar members and the user sees a scene in the visual field through the transparent display sections 102.

FIG. 3B shows the state that an image captured by the image capturing section 103 is displayed on the display sections 102 that operate in the monitor display state. The image capturing section 103, the captured image signal processing section 115, the display image processing section 112, and the display driving section 113 operate in the state shown in FIG. 3A such that they normally display the captured image on the display sections 102. In this case, the captured image (normally captured image) displayed on the display sections 102 is nearly the same as an image that appears on the display sections 102 that operate in the through state. In other words, in this state, the user sees a normal visual field as a captured image.

FIG. 3C shows the state that the system controller 110 causes the image capturing section 103 to capture a telescopic image through the image capturing control section 111.

In contrast, when the system controller 110 causes the image capturing section 103 to capture a wide angle image through the image capturing control section 111, a short-distant wide-angle image (not shown) is displayed on the display sections 102. Although the image capturing section 103 performs the telescopic and wide angle controls by driving the zoom lens of the image capturing section 103, the captured image processing section 115 may perform these controls by processing signals.

FIG. 4A shows the state that the display sections 102 are in the through state, for example the user is reading a newspaper.

FIG. 4B shows a so-called wide angle zoom state. In other words, FIG. 4B shows the state that a short-focus-distance zoom image is captured and displayed on the display sections 102 such that for example characters of the newspaper are enlarged.

FIG. 5A shows the state that the display sections 102 display a normally captured image or the display sections 102 are in the through state.

At this point, when the system controller 110 commands the display image processing section 112 to perform an image enlarging process through the display control section 114, an enlarge image as shown in FIG. 5B is displayed on the display sections 102.

FIG. 6A shows the state that the display sections 102 display a normally captured image or the display sections 102 are in the through state. In particular, FIG. 6A shows the state that the user is reading the newspaper or a book. In this case, it is assumed that since the surroundings are dim, the user is unable to see characters of newspaper or the like with a normally captured image or in the through state of the display sections 102.

In this case, the system controller 110 commands the image capturing control section 111 (the image capturing section 103 and the captured image signal processing section 115) to increase the image capturing sensitivity and/or causes the display control section 114 (the display image processing section 112 and the display driving section 113) to increase the brightness and adjust the contrast and sharpness such that a sharper image as shown in FIG. 6B than that as shown in FIG. 6A is displayed on the display sections 102. Instead, when the system controller 110 causes the lighting section 104 to perform the lighting operation, an image may be sharply displayed on the display sections 102.

FIG. 7A shows the state that the display sections 102 display a normally captured image or the display sections 102 are in the through state. In this case, the user is staying in a dark bed room where a child is sleeping. Since the user is staying in a dark room, he or she is unable to clearly see the child with a normally captured image or in the through state of the display sections 102.

At this point, when the system controller 110 commands the image capturing control section 111 (the image capturing section 103 and the captured image signal processing section 115) to increase the infrared image capturing sensitivity, an infrared captured image is displayed on the display sections 102 as shown in FIG. 7B such that the user is able to see the child's sleeping face and so forth.

FIG. 8A shows the state that the display sections 102 display a normally captured image or the display sections 102 are in the through state.

When the system controller 110 commands the image capturing control section 111 (the image capturing section 103 and the captured image signal processing section 115) to increase the ultraviolet image capturing sensitivity, a captured image with a ultraviolet component as shown in FIG. 8B is displayed on the display sections 102.

FIG. 9A shows the state that the display sections 102 are in the through state.

When the system controller 110 commands the display control section 114 (the display image processing section 112 and the display driving section 113) to separately display an image or separately display an image and partially enlarge an image, images shown in FIG. 9B can be displayed on the display sections 102. In other words, the screen of the display sections 102 is separated into areas AR1 and AR2 where area AR1 is in the through state or in a normal image display state and area AR2 is in an enlarged image display state.

FIG. 9C shows another exemplary separation display. In this case, the screen of the display sections 102 is separated into areas AR1, AR2, AR3, and AR4 that display frames of an image captured at intervals of a predetermined time period. The system controller 110 causes the display image processing section 112 to extract one frame at intervals of 0.5 second from a captured image signal and display the extracted frames in the order of areas AR1, AR2, AR3, AR4, AR1, AR2, and so forth. In this case, an image that is a so-called strobe display mode are separately displayed on the display sections 102.

FIG. 21A shows the state that the display sections 102 display a normally captured image or is in the through state. Since the image shown in FIG. 21A is a scene of a soccer stadium in which there is a boundary of sunshine and shadow on the pitch, the image is hard to see.

The system controller 110 increase the image capturing sensitivity or the display brightness for pixels corresponding to the shadow portion on a CCD sensor or a CMOS sensor. In contrast, the system controller 110 decreases the image capturing sensitivity or the display brightness for the pixels corresponding to the sunshine. As a result, an image of which the influence of sunshine and shadow is decreased is displayed as shown in FIG. 21B.

Figure 22A:
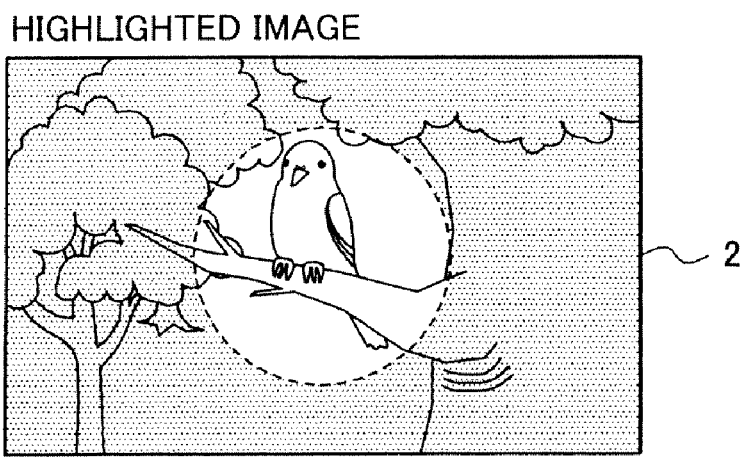
FIG. 22A and FIG. 22B are schematic diagrams describing highlighted image display states according to the second embodiment of the present invention.
Figure 22B:
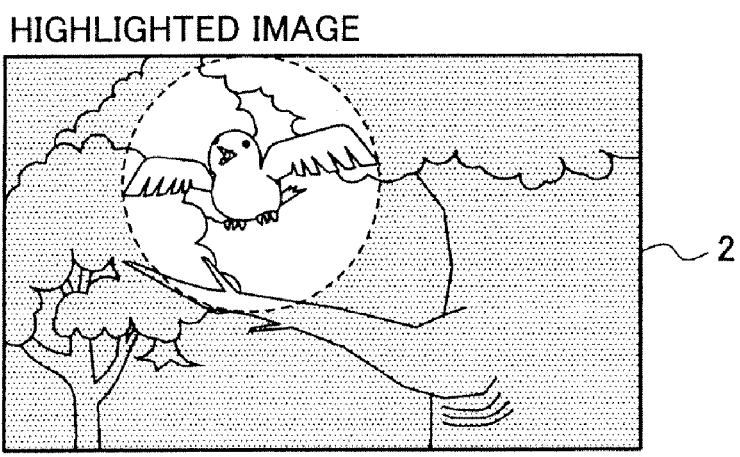

FIG. 22A and FIG. 22B show the states that an image containing for example a bird is displayed such that the bird is highlighted.

When a bird is detected in an image, if the bird is highlighted, the user is prevented from missing the bird as a subject.

As a process of highlighting an image, the brightness of a portion of interest may be decreased. Instead, the brightness of other than the portion of interest may be decreased. The portion of interest may be displayed in color. Other than the portion of interest may be displayed in monochrome. Instead, the portion of interest may be highlighted with any character image such as a frame, a cursor, a pointer mark, or the like.

The foregoing display images are just exemplary. In other words, when the processes and operations of the image capturing section 103, the captured image signal processing section 115, the display image processing section 112, and the display driving section 113 are controlled, various display modes may be accomplished.

For example, it is expected that there are many types of display modes such as a telescopic display mode, a wide angle display mode, a zoom-in display mode and a zoom-out display mode ranging from a telescopic display mode to a wide angle display mode, an image enlargement display mode, an image reduction display mode, a variable frame rate display mode (an image captured at high frame rates or an image captured at low frame rates), a high brightness display mode, a low brightness display mode, a variable contrast display mode, a variable sharpness display mode, an increased sensitivity captured image display mode, an increased infrared sensitivity captured image display mode, an increased ultraviolet sensitivity captured image display mode, an image display mode in which a predetermined wavelength band is cut, image effect display modes such as a mosaic image, a brightness inverted image, a soft focus image, a partial screen highlight image, an image with a variable color atmosphere, and so forth, a slow display mode, a frame-by-frame display mode, separated display modes in combinations of these display modes, separated display modes in combination of a through state and a captured image, a strobe display mode, a still image display mode with one frame of a captured image, and so forth.

[4. Detection of External Information]

As described above, as a structure that obtains external information, the image capturing and displaying apparatus 101 includes the surrounding environment sensor 119, the capturing target sensor 120, the GPS receiving section 121, the date and time counting section 122, the image analyzing section 128, and the communication section 126.

Examples of the surrounding environment sensor 119 may include a brightness sensor, a temperature sensor, a humidity sensor, an atmospheric pressure sensor, and so forth.

The brightness sensor detects information of the surrounding brightness of the image capturing and displaying apparatus 101.

The temperature sensor, humidity sensor, and atmospheric pressure sensor obtain information with which the temperature, humidity, atmospheric pressure, and weather can be determined.

Since the surrounding environment sensor 119 can determine the surrounding brightness, an outdoor weather situation, and so forth, the system controller 110 can control the image capturing operation and the display operation corresponding to the surrounding brightness and weather situation determined as the external information.

The capturing target sensor 120 detects information about the capturing target. The capturing target sensor 120 may be a distance measurement sensor or a pyroelectric sensor. The capturing target sensor 120 can obtain the distance to the capturing target and information with which the capturing target is determined.

When the capturing target sensor 120 has detected the distance to the capturing target, the system controller 110 can control the image capturing operation and the display operation corresponding to the detected distance. When the capturing target sensor 120 has detected that the capturing target is a living body such as a human, the system controller 110 can control the image capturing operation and display operation corresponding to the capturing target.

The GPS receiving section 121 obtains information of latitude and longitude of the current position. When the GPS receiving section 121 has detected the latitude and longitude of the current position, with reference to a map database or the like, information about the current position (information about neighborhood of the current position) can be obtained. When the image capturing and displaying apparatus 101 includes a record medium (such as a HDD (Hard Disk Drive) or a flash memory) (not shown in FIG. 20) that the system controller 110 can access and that has a relatively large recording capacity and the record medium has recorded a map database, information about the current position can be obtained.

Even if the image capturing and displaying apparatus 101 does not have a built-in map database, the image capturing and displaying apparatus 101 may cause the communication section 126 to access for example a network server or a device having a built-in map database, transmit information of latitude and longitude of the current position to the network server or the device, request the network server or the device to transmit information about the current position to the communication section 126, and receive the information.

Examples of information about the current position include place names, building names, facility names, store names, station names, and so forth.

In addition, examples of information about the current position include information representing the types of buildings such as parks, theme parks, concert halls, theaters, movie theaters, and sports facilities.

In addition, examples of information about the current position include types and names of natural things such as seashores, rivers, mountains, mountain tops, forests, lakes, and plains.

Examples of information about more detailed position include areas in theme parks, areas of baseball stadiums and soccer stadiums, and areas of concert halls.

When information about the current position has been obtained, the system controller 110 can control the image capturing operation and the display operation corresponding to the current position, geographic conditions, facilities, and so forth near the current position.

The date and time counting section 122 counts for example the years, months, days, hours, minutes, and seconds. The system controller 110 can recognize the current time, day or night, month, season, and so forth corresponding to the values counted by the date and time counting section 122. Thus, the system controller 110 can control the image capturing operation and display operation corresponding to day or night (time) and those corresponding to the current season.

The image analyzing section 128 can detect various types of information about the capturing target from a captured image.

First, the image analyzing section 128 can identify a person, an animal, a natural thing, a building, a machine, or the like as the type of a capturing target from a captured image. As an animal, the image analyzing section 128 can identify a situation of which a bird has been captured as a subject, a situation of which a cat has been captured as a subject, or the like. As a natural thing, the image analyzing section 128 can identify a sea, a mountain, a tree, a river, a lake, a sky, the sun, the moon, or the like from a captured image. As a building, the image analyzing section 128 can identify a house, a building, a stadium, or the like from a captured image. As a device, the image analyzing section 128 can identify a personal computer, an AV (Audio Visual) device, a mobile phone, a PDA, an IC card, a two-dimensional bar code, or the like as a capturing target from a captured image.

When characteristics of the shapes of various types of capturing targets are pre-registered to the image analyzing section 128, it can determine a subject contained in a captured image corresponding to the registered characteristics.

In addition, the image analyzing section 128 can detect a motion of a subject, for example a fast motion of a subject, from a captured image for example by detecting the difference of adjacent frames of the image. For example, the image analyzing section 128 can detect a situation of which a subject, for example a player in a sports match or a running car, is being captured.

In addition, the image analyzing section 128 can determine a surrounding situation by analyzing an image. For example, the image analyzing section 128 can determine the brightness due to day, night, or weather. In addition, the image analyzing section 128 can recognize the strength of rain or the like.

In addition, the image analyzing section 128 can determine a situation of which for example a book or a newspaper is being captured by analyzing an image. For example, the image analyzing section 128 can determine such a situation by recognizing characters from an image or the shape of a book or a newspaper.

When the image analyzing section 128 has recognized characters, the system controller 110 can supply the recognized characters as text data to the sound synthesizing section 127.

In addition, when a person is a subject, the image analyzing section 128 can identify the person from the face by analyzing the image. As well known, a person's face can be registered as personal characteristic data that are relative position information of structural elements of the face. For example, the ratio (Ed/EN) of the distance EN between the center of the eyes and the nose and the distance Ed of the eyes and the ratio (Ed/EM) of the distance EM between the center of the eyes and the mouth and the distance Ed of the eyes are unique to each person. In addition, a person's face is not affected by wearing things such as a hair style, eye glasses, and so forth. In addition, it is known that a person's face does not change as he or she ages.

Thus, when a captured image contains a person's face, the image analyzing section 128 can detect the foregoing personal characteristic data by analyzing the image.

When the image analyzing section 128 has detected personal characteristic data from the captured image, if the system controller 110 has for example a HDD (Hard Disk Drive), a flash memory, or the like as a record medium that the system controller 110 can access and that has recorded a personal database, the image analyzing section 128 can obtain personal information of the subject from the personal database. Even if the image capturing and displaying apparatus 101 does not have a built-in personal database, the system controller 110 may cause the communication section 126 to access for example a network server or a device having a built-in personal database, request the server or device to transmit information to the communication section 126, and receive particular personal information therefrom.

When the user has registered personal information such as the name, organization, and so forth of each person whom the user had met to the personal database along with personal characteristic data, if the user meets a particular person (his or her image has been captured), the image capturing and displaying apparatus 101 can retrieve information about the person from the personal database.

When a personal database that has registered information about famous people and personal characteristic data has been prepared, if the user meets a famous person, the image capturing and displaying apparatus 101 can retrieve information about the person from the personal database.

The communication section 126 can obtain various types of external information.

For example, as described above, the communication section 126 can obtain information retrieved by an external device corresponding to information of latitude and longitude, personal characteristic data, and so forth transmitted from the image capturing and displaying apparatus 101.

In addition, the communication section 126 can obtain meteorological information such as weather information, temperature information, and humidity information from an external device.

In addition, the communication section 126 can obtain facility use information, photography prohibition/permission information, facility guide information, and so forth from an external device.

In addition, the communication section 126 can obtain identification information of an external device. Examples of identification information include a device type identified as a network device in a predetermined communication protocol and a device ID.

In addition, the communication section 126 can obtain image data that is stored in an external device, image data that is reproduced or displayed by an external device, and image data that is received by an external device.

In the foregoing, information that the surrounding environment sensor 119, the capturing target sensor 120, the GPS receiving section 121, the date and time counting section 122, the image analyzing section 128, and the communication section 126 can individually obtain has been exemplified. Instead, a plurality of these sections may detect and determine predetermined external information.

The weather at the present time can be more accurately determined in combination of information of humidity and so forth obtained by the surrounding environment sensor 119 and weather information received by the communication section 126.

In addition, the current position and the situation of an capturing target can be more accurately determined corresponding to information about the current place obtained by the GPS receiving section 121 and the communication section 126 and information obtained by the image analyzing section 117 than the foregoing structure.

5. Exemplary Operations

In the image capturing and displaying apparatus 101 of this embodiment, the system controller 110 determines situations of the surroundings, a capturing target, and so forth corresponding to external information obtained by the surrounding environment sensor 119, the capturing target sensor 120, the GPS receiving section 121, the date and time counting section 122, the image analyzing section 128, and the communication section 126 and controls the image capturing operation and the display operation corresponding to the determined results such that the user's visual sense is assisted and extended.

Next, various exemplary operations performed under the control of the system controller 110 will be described.

FIG. 10 shows a control process as the operation control function 110*b* of the system controller 110.

At step F101, the system controller 110 controls the display control section 114 to cause the display sections 102 to become the through state. When the image capturing and displaying apparatus 1 is initially turned on, the flow advances to step F101. At step F101, the system controller 110 controls the display sections 102 to become the through state.

While the display sections 2 are in the through state, at step F102, the system controller 110 determined whether or not a monitor display state start trigger has occurred. A monitor display start switch (not shown) may be disposed in the image capturing and displaying apparatus 101. When the user has operated this switch, the system controller 110 may determine that a monitor display state start trigger has occurred. Instead, as will be described later, the system controller 110 may determine that a monitor display state start trigger has occurred corresponding to external information.

When the determined result denotes that a monitor display state start trigger has occurred, the flow advances to step F103. At step F103, the system controller 110 executes the monitor display start control. In other words, the system controller 110 commands the image capturing control section 111 to cause the image capturing section 103 and the captured image signal processing section 115 to perform a normal image capturing operation. In addition the system controller 110 commands the display control section 114 to cause the display image processing section 112 and the display driving section 113 to cause the display sections 102 to display a captured image signal as the normally captured image.

In this process, the through state as shown in FIG. 3A is switched to the monitor display state for the normally captured image as shown in FIG. 3B.

While the display sections 102 display a normally captured image, which is the same as a scene that the user sees in the through state, the flow advances to step F104. At step F104, the system controller 110 monitors whether or not an image control trigger has occurred. At step F105, the system controller 110 monitors whether or not a monitor display state completion trigger has occurred.

When the system controller 110 has determined that it is necessary to change the monitor display mode corresponding to an external situation (surroundings, subject, current date and time, current position, and so forth) determined by the external situation determination function 110*a*, the system controller 110 determines that an image control trigger has occurred at step F104.

When the user has performed the monitor display mode completion operation with the predetermined switch, the system controller 110 determines that a monitor display state completion trigger has occurred at step F105. Like the trigger at step F102, the system controller 110 may determine that a monitor display state completion trigger has occurred corresponding to detected external information.

When the determined result denotes that an image control trigger has occurred, the flow advances from step F104 to step F106. At step F106, the system controller 110 controls the display operation for a captured image. In other words, the system controller 110 commands the image capturing control section 111 and the display control section 114 to cause the display sections 102 to display the image in the display mode corresponding to an external situation at that point.

After the system controller 110 has controlled the display mode at step F106, the flow advances to step F104 or F105. At step F104 or step F105, the system controller 110 monitors whether or not a trigger has occurred.

When the determined result denotes that a monitor display state completion trigger has occurred, the flow returns from step F105 to step F101. At step F101, the system controller 110 commands the image capturing control section 111 to complete the image capturing operation and commands the display control section 114 to cause the display sections 102 to become the through state.

While the user puts on the image capturing and displaying apparatus 101 and its power has been turned on, the operation control function 110b of the system controller 110 performs the control process as shown in FIG. 10.

In this process, the display mode control is performed corresponding to the determined result of whether or not a display control trigger has occurred at step F104. Specific examples of the trigger determinations and controls will be described later with reference to FIG. 23 to FIG. 30A and FIG. 30B.

FIG. 23 to FIG. 30A and FIG. 30B show exemplary processes of the external situation determination function 110a of the system controller 110. It is assumed that these processes are executed in parallel with the process of the operation control function 110b shown in FIG. 10. These parallel processes are executed such that while for example the system controller 110 is executing the process shown in FIG. 10, detection processes shown in FIG. 23 to FIG. 30A and FIG. 30B are periodically executed as interrupt processes. The programs of the processes shown in FIG. 23 to FIG. 30A and FIG. 30B may be built in the program that executes the process shown in FIG. 10. Instead, these programs may be other programs periodically called. In other words, the structure of these programs is not limited to a particular one.

Figure 23:
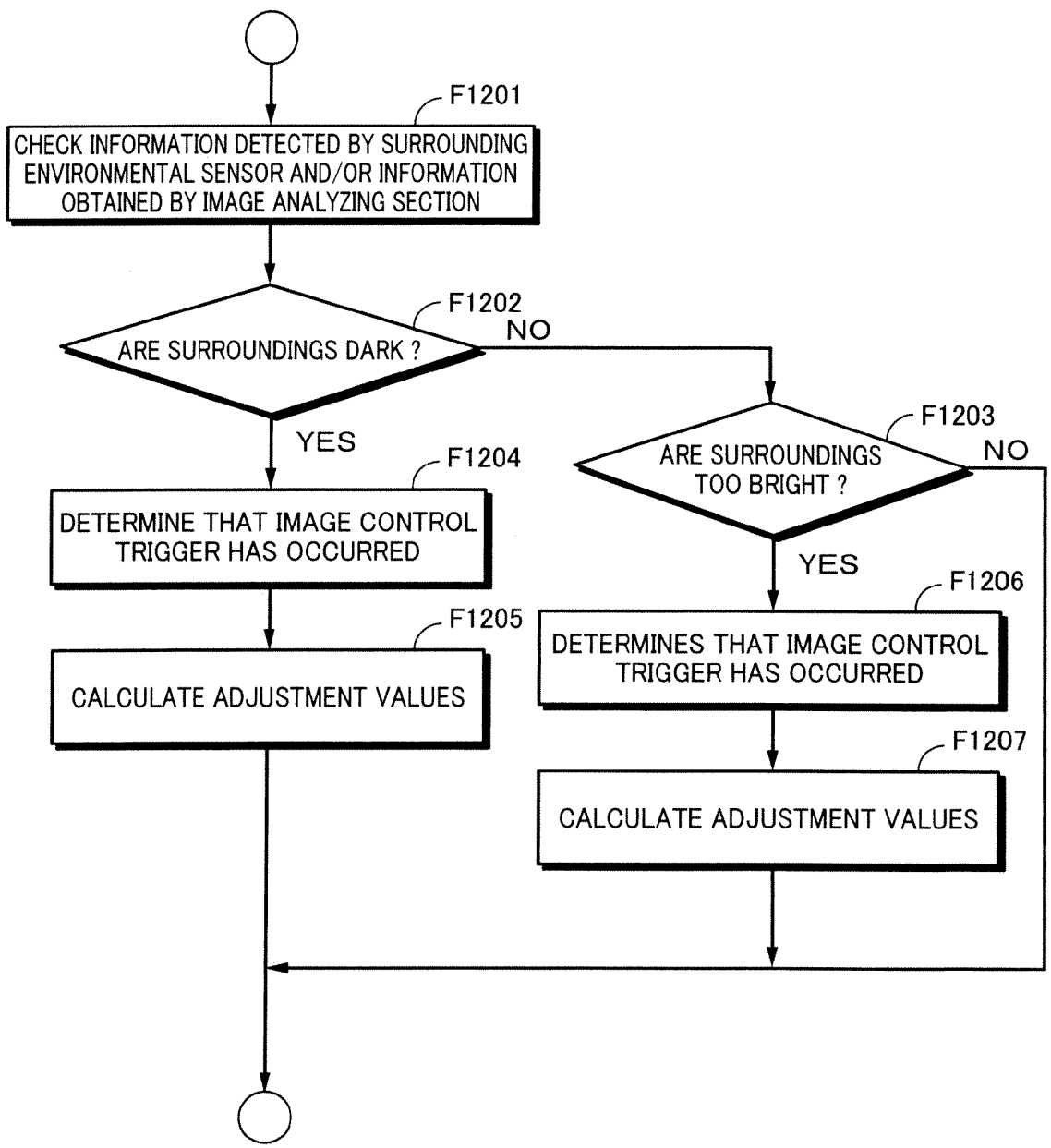
FIG. 23 is a flow chart showing an image control trigger determination process according to the second embodiment of the present invention.

FIG. 23 to FIG. 30A and FIG. 30B show exemplary processes of determining whether or not an image control trigger has occurred at step F104 shown in FIG. 10. FIG. 23 shows an exemplary process of determining whether or not an image control trigger has occurred corresponding to information supplied from the surrounding environment sensor 119 or the image analyzing section 128.

At step F1201 shown in FIG. 23, the system controller 110 monitors one or both of information detected by the surrounding environment sensor 119 and information obtained by the image analyzing section 117. In this example, the surrounding environment sensor 119 is a brightness sensor. The image analyzing section 128 analyzes the surrounding brightness corresponding to a captured image.

The system controller 110 determines whether the surroundings are dark or too bright corresponding to information obtained from one or both of the surrounding environment sensor 119 and the image analyzing section 128. For example, the detected brightness is quantified. When the detected brightness is x lux or less, the system controller 110 determines that the surroundings are dark. When the detected brightness is y lux or more, the system controller 110 determines that the surroundings are too bright.

When the determined result denotes that the surroundings are dark, the flow advances from step F1202 to step F1204. At step F1204, the system controller 110 determines that an image control trigger has occurred.

At step F1205, the system controller 110 calculates adjustment values corresponding to the current brightness (darkness) of the surroundings. For example, the system controller 110 obtains adjustment values of for example display brightness, contrast, sharpness, image capturing sensitivity, and so forth such that the user can comfortably see the surroundings with a captured image.

When the processes of step F1204 and step F1205 have been performed, the flow advances from step F104 to step F106 shown in FIG. 10. At step F106, the system controller 110 commands the image capturing section 103 to adjust the image capturing sensitivity and commands the captured image signal processing section 115 or the display image processing section 112 to adjust the brightness, contrast, sharpness, and so forth. When these sections have performed these processes, the quality of an image displayed on the display sections 102 is adjusted. Thus, even if the surroundings are dark, the user can clearly see the surroundings with an image displayed on the display sections 102. For example, a situation of which the surroundings are dark and an image as shown in FIG. 6A is displayed on the display sections 102 is changed to a situation of which the user can clearly see the image.

When the determined result denotes that the surroundings are dark, the system controller 110 may control the lighting section 104 to light up.

When the determined result denotes that the surroundings are too bright, the flow advances from step F1203 to step F1206. At step F1206, the system controller 110 determines that an image control trigger has occurred.

At step F1207, the system controller 110 calculates adjustment values corresponding to the current brightness of the surroundings. The system controller 110 obtains adjustment values of for example display brightness, contrast, sharpness, image capturing sensitivity, and so forth such that the user can comfortably see the surroundings. In this case, since the surroundings are too bright, the user feels glaring. Thus, the system controller 110 obtains adjustment values with which the image capturing sensitivity and the display brightness are decreased.

When the processes of step F1206 and step F1207 have been performed, the flow advances from step F104 to step F106 shown in FIG. 10. In this case, at step F106, the system controller 110 commands the image capturing section 103 to adjust the image capturing sensitivity and commands the captured image signal processing section 115 or the display image processing section 112 to adjust the brightness, contrast, sharpness, and so forth. In these processes, the quality of the image displayed on the display sections 102 is adjusted. Thus, even if the surroundings are too bright, the user can see the surroundings with an image displayed on the display sections 102 without feeling glaring.

Figure 24B:
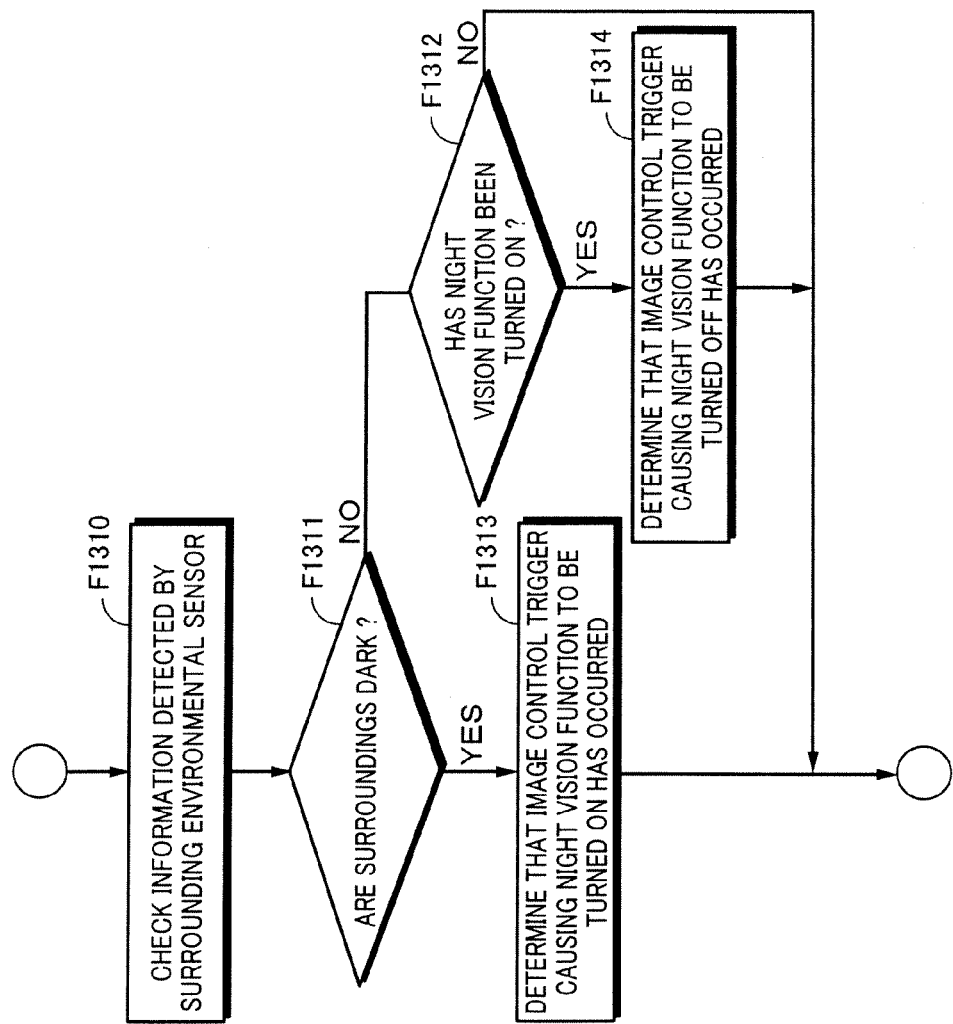
FIG. 24A and FIG. 24B are flow charts showing image control trigger determination processes according to the second embodiment of the present invention.
Figure 24A:
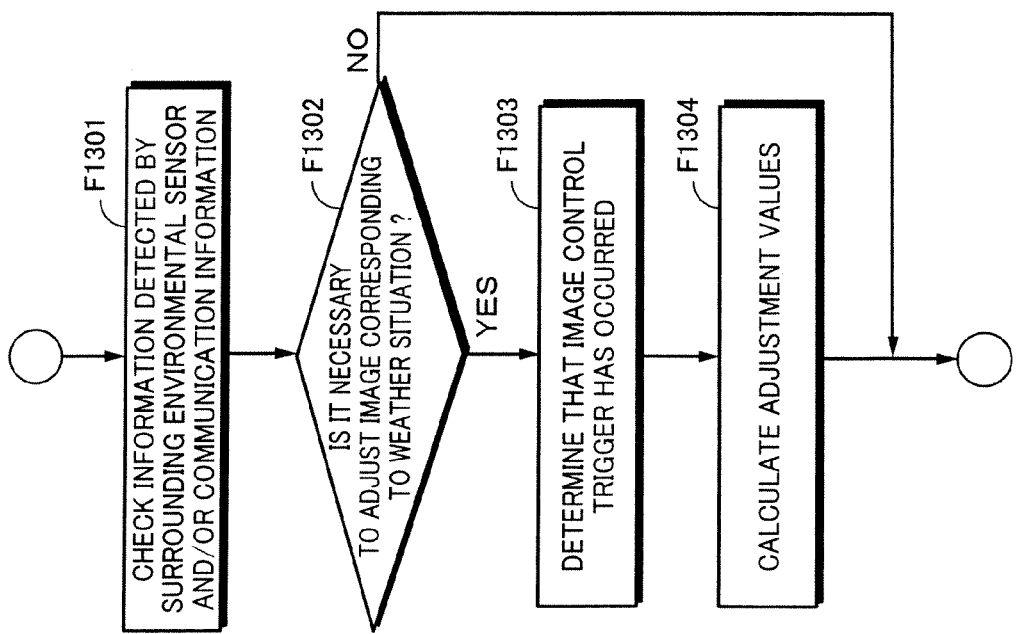

FIG. 24A shows an exemplary process of determining whether or not an image control trigger has occurred corresponding to information detected by the surrounding environment sensor 119 or supplied from the communication section 126.

At step F1301 shown in FIG. 24A, the system controller 110 monitors one or both of information detected by the surrounding environment sensor 119 and information received by the communication section 126. Examples of the surrounding environment sensor 119 include a temperature sensor, a humidity sensor, and an atmospheric pressure sensor. The communication section 126 successively receives meteorological information from for example a network server or the like.

The system controller 110 can determine a surrounding weather situation corresponding to the atmospheric pressure, humidity, and temperature detected by for example the surrounding environment sensor 119. In addition, the system controller 110 can determine a weather situation corresponding to meteorological information received by the communication section 126. To receive a weather situation from the network server, the system controller 110 successively transmits information of the current position obtained by the GPS receiving section 121 to the network server and receives meteorological information of the area corresponding to the current position from the network server.

Although the system controller 110 can determine a surrounding weather situation corresponding to information detected by the surrounding environment sensor 119 or information received by the communication section 126, the system controller 110 can more precisely determine a weather situation corresponding to both types of information than the foregoing structure.

The system controller 110 determines whether or not it is necessary to adjust an image corresponding to a weather situation such as clear sky, cloudy sky, rain, lightening, typhoon, snow, or the like and a change of a weather situation such as starting of rain, stopping of rain, gathering of clouds, or the like. When the determined result denotes that it is necessary to adjust the image, the flow advances from step F1302 to step F1303. At step F1303, the system controller 110 determines that an image control trigger has occurred. At step F1304, the system controller 110 calculates adjustment values corresponding to the current weather. The system controller 110 obtains adjustment values of for example the display brightness, contrast, sharpness, image capturing sensitivity, and so forth such that the user can clearly see the surroundings with the captured image.

When the processes of step F1303 and F1304 have been performed, the flow advances from step F104 to step F106 shown in FIG. 10. At step F106, the system controller 110 commands the image capturing section 103 to adjust the image capturing sensitivity and commands the captured image signal processing section 115 or the display image processing section 112 to adjust the brightness, contrast, sharpness, and so forth. In these processes, the quality of an image displayed on the display sections 102 is adjusted corresponding to a weather situation. The user can clearly see the surroundings with the image displayed on the display sections 102.

Instead, the system controller 110 may control the lighting section 104 to light up corresponding to a weather situation.

In this example, the system controller 110 determines a weather situation corresponding to information detected by the surrounding environment sensor 119 or information received by the communication section 126. When the image analyzing section 128 recognizes an image of rain, the system controller 110 can exactly detect the start of rain, stop of rain, occurrence of lightning, and so forth.

FIG. 24B shows an exemplary process of determining whether or not an image control trigger that causes a night vision function to operate has occurred corresponding to information detected by the surrounding environment sensor 119.

At step F1310 shown in FIG. 24B, the system controller 110 monitors information detected by the surrounding environment sensor 119. In this example, the surrounding environment sensor 119 is a brightness sensor.

The system controller 110 determines whether or not the surroundings are dark corresponding to information detected by the surrounding environment sensor 119. The system controller 110 digitizes the detected brightness. When the detected brightness is x lux or less, the system controller 110 determines that the surrounds are dark.

When the determined result denotes that the surroundings are dark, the flow advances from step F1311 to step F1313. At step F1313, the system controller 110 determines that an image control trigger that causes the night vision function to be turned on has occurred.

When the process of step F1313 has been performed, the flow advances from step F104 to step F106 shown in FIG. 10. In this case, at step F106, the system controller 110 controls the image capturing and displaying apparatus 101 to turn on the night vision function. In other words, the system controller 110 commands the image capturing control section 111 to increase the infrared image capturing sensitivity of the image capturing section 103.

In this process, the night vision function is executed. In a situation of which the user is unable to see the surroundings because they are dark as shown in FIG. 7A, an increased infrared sensitivity captured image as shown in FIG. 7B is displayed on the display sections 102. Thus, the user can see the surroundings in a dark place.

When the determined result denotes that the surroundings are not dark, the flow advances from step F1311 to step F1312. In this case, at step F1312, when the night vision function (increased infrared sensitivity image capturing operation) has been turned on, the flow advances to step F1314. In this case, at step F1314, the system controller 110 determines that an image control trigger that causes the night vision function to be turned off has occurred. When the process of step F1314 has been performed, the flow advances from step F104 to step F106 shown in FIG. 10. In this case, at step F106, the system controller 110 controls the image capturing and displaying apparatus 101 to turn off the night vision function. In other words, the system controller 110 commands the image capturing control section 111 to restore the infrared image capturing sensitivity to the normal image capturing sensitivity and perform the normal image capturing operation.

In the process shown in FIG. 24B, when the user is in a dark room or the like, the night vision function is automatically turned on, allowing him or her to clearly see the surroundings in the dark room. In contrast, when the user has left a dark room or the like, the night vision function is automatically turned off. In other words, a process of increasing the user's visual ability corresponding to a surrounding situation is accomplished.

Instead, the image analyzing section 128 may detect whether or not the surroundings are dark by analyzing a captured image. When the brightness of the entire captured image has largely decreased, determining that the surroundings are dark, the system controller 110 may determine that an image control trigger that causes the night vision function to be turned on has occurred.

Figure 25:
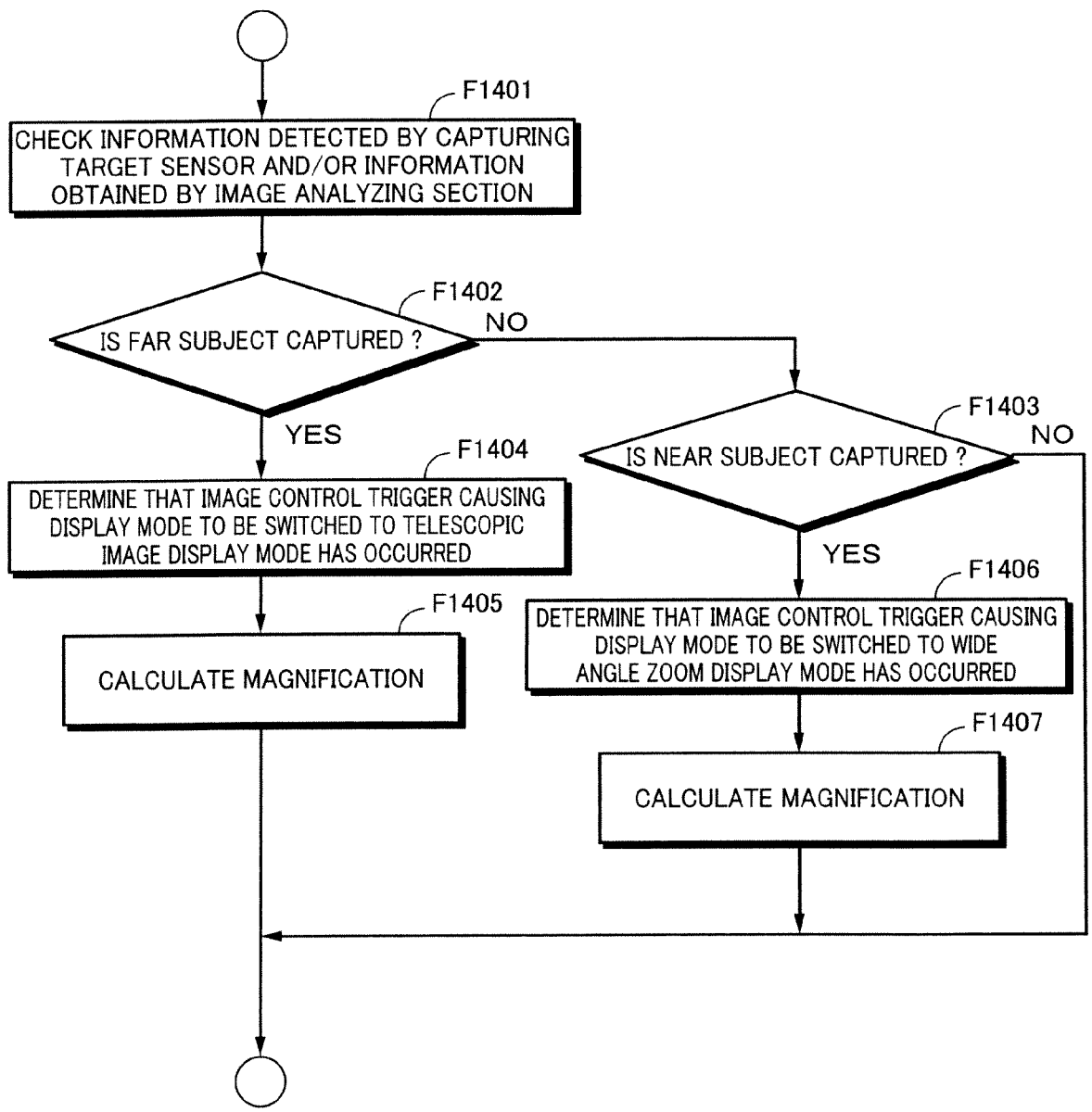
FIG. 25 is a flow chart showing image control trigger determination processes according to the second embodiment of the present invention.

FIG. 25 shows an exemplary process of determining whether or not an image control trigger has occurred corresponding to information detected by the capturing target sensor 120 or information obtained by the image analyzing section 128.

At step F1401 shown in FIG. 25, the system controller 110 monitors one or both of information detected by the capturing target sensor 120 and information obtained by the image analyzing section 128. The capturing target sensor 120 is for example a distance measurement sensor. The image analyzing section 128 calculates the distance to the subject by analyzing a captured image.

In other words, the system controller 110 determines whether a target (a capturing target) that the user is seeing is far or near such as his or her hands corresponding to the information detected by the capturing target sensor 120 and/or the information obtained by the image analyzing section 128.

When the user is seeing a far scene or a game at a seat far from the field of a stadium and the system controller 110 has determined that the capturing target is far, the flow advances from step F1402 to step F1404. At step F1404, the system controller 110 determines that an image control trigger that causes the display mode to be switched to the telescopic zoom display mode has occurred. Thereafter, the flow advances to step F1405. At step F1405, the system controller 110 calculates a proper zoom magnification corresponding to the distance to the capturing target.

When the user is seeing a near scene or a newspaper on his or her hands and the system controller 110 has determined that the capturing target is near, the flow advances from step F1403 to step F1406. At step F1406, the system controller 110 determines that an image control trigger that causes the display mode to be switched to the zoom up (wide zoom) display mode has occurred. Thereafter, the flow advances to step F1407. At step F1407, the system controller 110 calculates a proper zoom magnification corresponding to the distance to the capturing target.

When the processes of step F1404 and step F1405 or the processes of step F1406 and step F1407 have been performed, the flow advances from step F104 to step F106 shown in FIG. 10. At step F106, the system controller 110 commands the image capturing control section 111 to perform the zoom operation with the calculated magnification.

Thus, the display sections 102 display a telescopic image shown in FIG. 3C or a wide zoom image shown in FIG. 4B corresponding to the scene that the user is seeing.

In this example, the system controller 110 controls the telescopic/wide angle zoom operation. Instead, the system controller 110 may control the image capturing and displaying apparatus 101 to change the focus position and enlarge/reduce the image corresponding to the distance to the capturing target.

Figure 26:
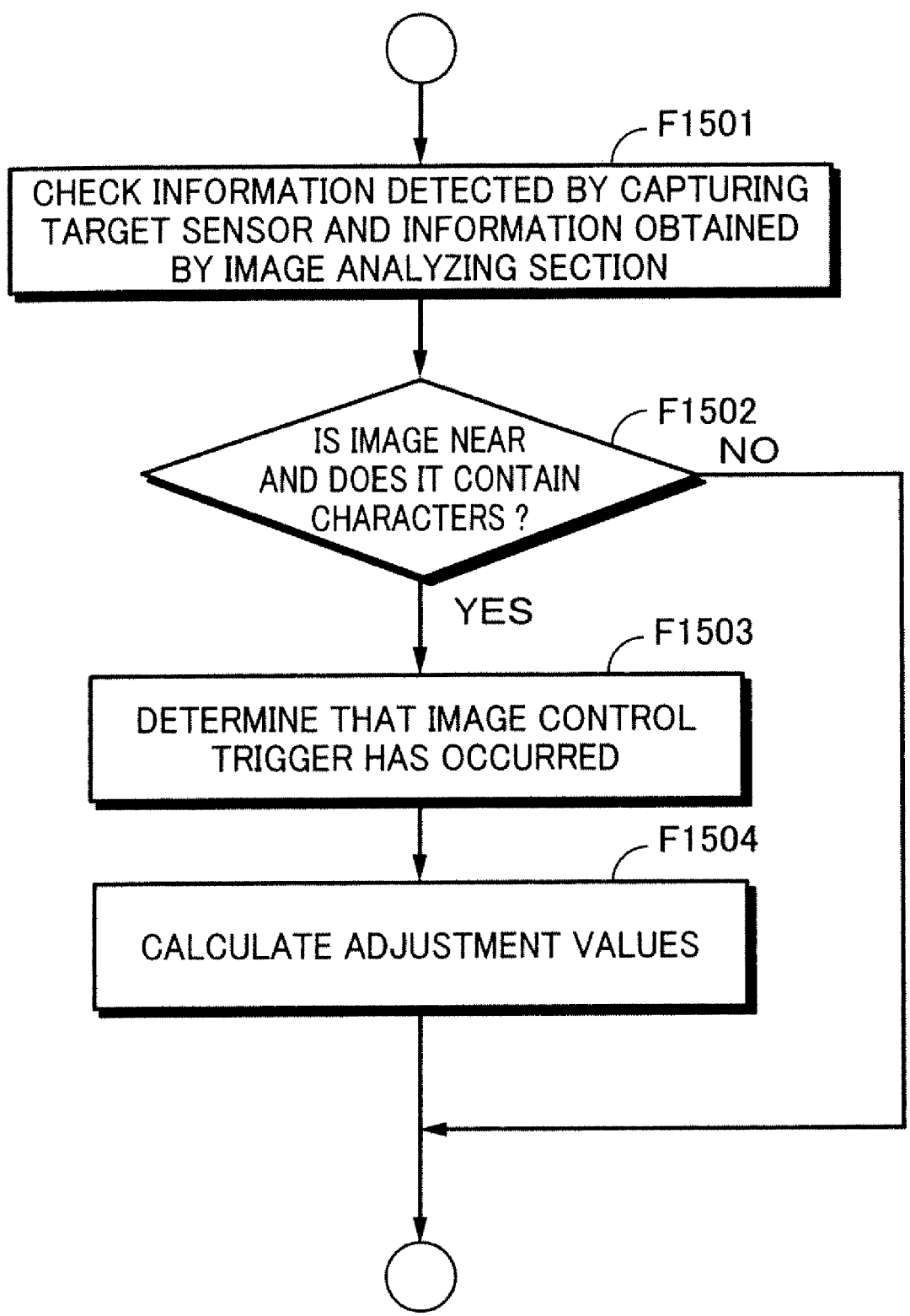
FIG. 26 is a flow chart showing an image control trigger determination process according to the second embodiment of the present invention.

FIG. 26 shows an exemplary process of determining whether or not an image control trigger has occurred corresponding to information detected by the capturing target sensor 120 and information obtained by the image analyzing section 128. In particular, in the exemplary process, it is determined whether or not a capturing target contains characters of a newspaper, a book, or the like.

At step F1501 shown in FIG. 26, the system controller 110 monitors information detected by the capturing target sensor 120 and information obtained by the image analyzing section 128. In this example, the capturing target sensor 120 is a distance measurement sensor. The image analyzing section 128 detects whether or not the subject contains characters by analyzing the captured image.

The system controller 110 determines whether or not the target (capturing target) that the user is seeing is near and contains characters of a newspaper, a book, or the like corresponding to the information detected by the capturing target sensor 120 and/or the information obtained by the image analyzing section 128. In other words, the system controller 110 determines whether or not the user is reading a newspaper on his or her hands.

When the determined result denotes that the capturing target is near and contains characters, the flow advances from step F1502 to step F1503. At step F1503, the system controller 110 determines that an image control trigger has occurred.

At step F1504, the system controller 110 calculates adjustment values with which the user can comfortably read the newspaper or book. For example, the system controller 110 obtains adjustment values of for example the display brightness, contrast, sharpness, image capturing sensitivity, and so forth such that the user can comfortably read the newspaper or the like.

When the processes of step F1503 and step F1504 have been performed, the flow advances from step F104 to step F106 shown in FIG. 10. In this case, at step F106, the system controller 110 commands the image capturing section 103 to adjust the image capturing sensitivity and commands the captured image signal processing section 115 or the display image processing section 112 to adjust the brightness, contrast, sharpness, and so forth. In this process, the quality of the image displayed on the display sections 102 is adjusted. As a result, the display sections 102 display an image that the user can clearly read as shown in FIG. 6B.

In addition to the detection of characters, the surrounding brightness may be detected and the detected result may be influenced to the calculation of the adjustment values.

In addition, when the image analyzing section 128 analyzes the image, the image analyzing section 128 may also recognize the shape of a newspaper or a book as a condition that the flow advances to step F1503.

When the system controller 110 has determined that the capturing target is a newspaper or the like, the system controller 110 may control the lighting section 104 to light up.

Instead of the adjustment of the image quality, the display image processing section 112 may execute an enlargement process and cause the display sections 102 to display an enlarged image as shown in FIG. 4B such that the user can clearly read characters.

When an image contains characters, the image analyzing section 128 may determine the characters and supply them as text data to the system controller 110. In this case, the system controller 110 causes the sound synthesizing section 127 to execute a sound synthesizing process corresponding to the text data detected from the image.

Thus, the sound synthesizing section 127 generates a sound signal as a reading voice of characters contained in the captured image. The system controller 110 causes the sound output section 105 to output the reading voice.

Thus, when the user sees a newspaper or the like, he or she can hear the reading voice thereof.

Figure 27:
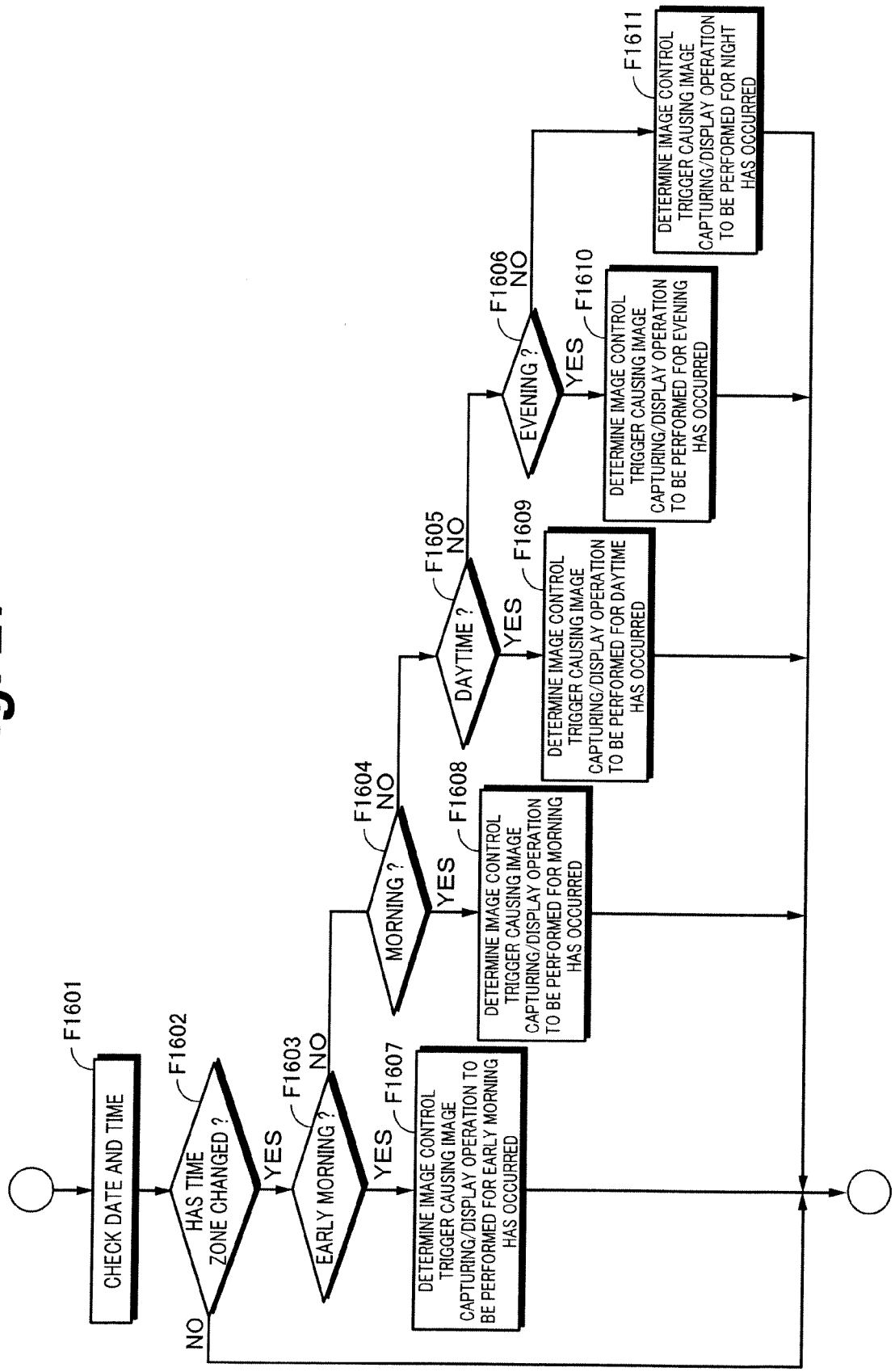
FIG. 27 is a flow chart showing an image control trigger determination process according to the second embodiment of the present invention.

FIG. 27 shows an exemplary process of determining whether or not an image control trigger has occurred corresponding to information of the current date and time counted by the date and time counting section 122.

At step F1601 shown in FIG. 27, the system controller 110 checks the current date and time counted by the date and time counting section 122. The system controller 110 determines a time zone corresponding to the current time, for example morning, a time zone of early morning, morning, daytime, evening, and night. For example, the time zone from 4 o'clock to 7 o'clock is early morning, the time zone from 7 o'clock to 9 o'clock is morning, the time zone from 9 o'clock to 17 o'clock is daytime, the time zone from 17 o'clock to 19 o'clock is evening, and the time zone from 19 o'clock to 4 o'clock is night.

It is preferred that the time zones be changed corresponding to the determined month and day. For example, since the sunrise time and sunset time change corresponding to the month and day, the time zones are changed corresponding to the month and day. For example, in summer, the time zone of early morning is from 4 o'clock to 7 o'clock. For example, in winter, the time zone of early morning is from 6 o'clock to 8 o'clock.

When the determined result at step F1601 denotes that the time zone has changed, the flow advances from step F1602 to step F1603.

When the time zone has changed to early morning, the flow advances from step F1603 to step F1607. At step F1607, the system controller 110 determines that an image control trigger that causes an image capturing operation/display operation to be performed for early morning has occurred.

When the time zone has changed to morning, the flow advances from step F1604 to step F1608. At step F1608, the system controller 110 determines that an image control trigger that causes an image capturing operation/display operation to be performed for morning has occurred.

When the time zone has changed to daytime, the flow advances from step F1605 to step F1609. At step F1609, the system controller 110 determines that an image control trigger that causes an image capturing operation/display operation to be performed for daytime has occurred.

When the time zone has changed to evening, the flow advances from step F1606 to step F1610. At step F1610, the system controller 110 determines that an image control trigger that causes an image capturing operation/display operation to be performed for evening has occurred.

When the time zone has changed to night, the flow advances to step F1611. At step F1611, the system controller 110 determines that an image control trigger that causes an image capturing operation/display operation to be performed for night has occurred.

When the determined result at step F1607, F1608, F1609, F1610, or F1611 denotes that an image control trigger has occurred, the flow advances from step F104 to step F106 shown in FIG. 10. At step F106, the system controller 110 commands the image capturing control section 111 and the display control section 114 to perform the image capturing operation/display operation corresponding to the time zone. For example, the system controller 110 commands the image capturing control section 111 and the display control section 114 to adjust for example the image capturing sensitivity, brightness, contrast, sharpness, and so forth. Instead, the system controller 110 may command the image capturing control section 111 and the display control section 114 to perform an image effect operation such as a soft focus display operation.

In this process, an image corresponding to the time zone is provided to the user. For example, in the early morning, a soft image is provided to the user. In the morning, a clear image having a strong contrast is provided to the user. In the evening, an image in sepia color is provided to the user. At night, a dull image is provided to the user. Thus, an interesting image corresponding to the user's mood and the time zone can be provided to him and her.

Of course, the image quality may be adjusted corresponding to the brightness that changes in each time zone such that the visibility is improved.

In addition to the time zone, the quality of an image may be adjusted corresponding to a weather situation and a user's situation of whether he or she is in a house or not.

Instead, the quality of an image may be adjusted corresponding to the season determined with date and time information, not corresponding to the time zone. In summer, for example a blue component of an image is emphasized. In autumn, for example a red component of an image is emphasized. In winter, for example a white component of an image is emphasized. In spring, for example green/pink components are emphasized. As a result, an image having a sense of season may be provided to the user.

Figure 28A:
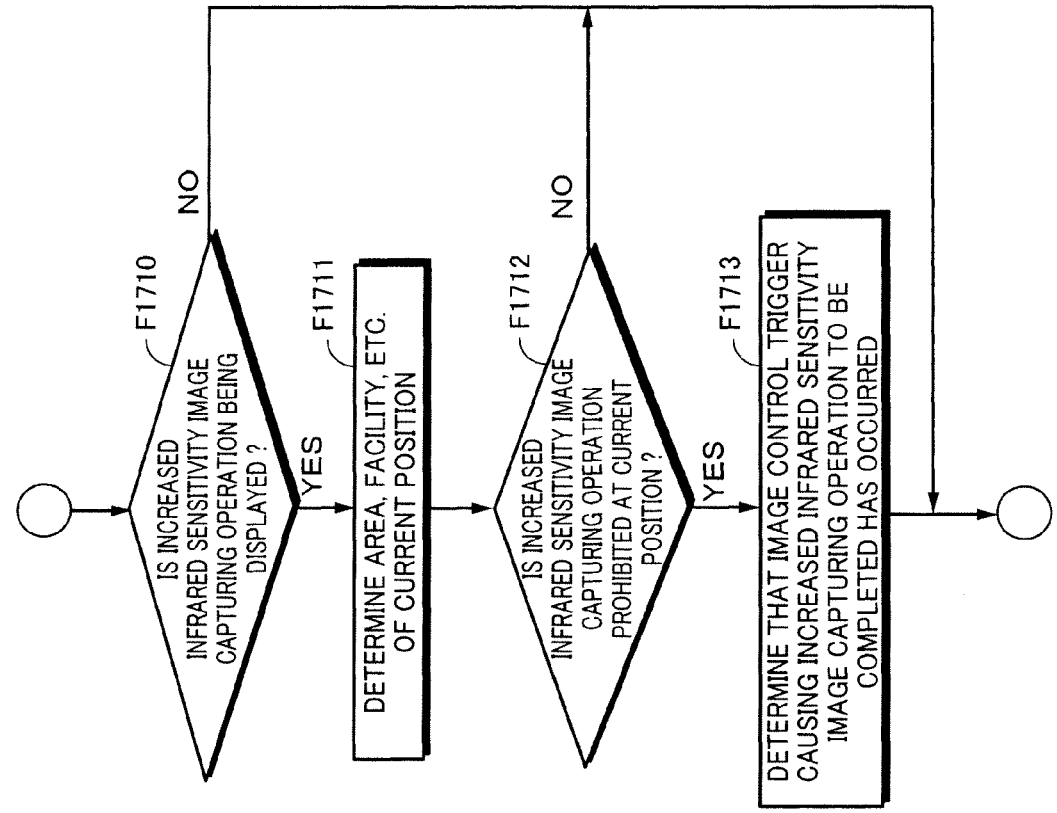
FIG. 28A and FIG. 28B are flow charts showing image control trigger determination processes according to the second embodiment of the present invention.

FIG. 28A shows an exemplary process of determining whether or not an image control trigger has occurred corresponding to information received by the GPS receiving section 121 and the communication section 126.

At step F1701 shown in FIG. 28A, the system controller 110 causes the communication section 126 to transmit information of latitude and longitude of the current position obtained from the GPS receiving section 121 to a network server or a device having a built-in map database, causes the server or device to retrieve information about the current position from the database, and causes the communication section 126 to receive the information about the current position therefrom. When the image capturing and displaying apparatus 101 has a built-in map database, the system controller 110 can retrieve information about the current position from the built-in map database corresponding to the information of latitude and longitude received from the GPS receiving section 121.

The system controller 110 determines whether or not the user is at a place where it is necessary to execute a predetermined image control corresponding to the obtained information of the current position. When the determined result denotes that the current position is a place where it is necessary to execute a predetermined image control, the flow advances from step F1702 to step F1703. At step F1703, the system controller 110 determines that an image control trigger that causes the predetermined image control to be executed has occurred.

When the determined result denotes that the image control trigger has occurred, the flow advances from step F104 to step F106 shown in FIG. 10. At step F106, the system controller 110 commands the image capturing control section 111 and the display control section 114 to execute a predetermined image control.

In this case, examples of the image control are as follows.

When the detected result denotes that the current position is a sports stadium, a circuit, or the like, since a target (capturing circuit) that the user sees is people, cars, or the like that move fast, the system controller 110 commands the image capturing control section 111 to increase the image capturing frame rate such that the subject that moves fast can be properly displayed.

When the current position is a concert hall, a music hall, an entertainment hall, a sports stadium, or the like, the system controller 110 may command the image capturing control section 111 to perform a telescopic image capturing operation corresponding to the distance to the capturing target on the stage. When the distance to a capturing target such as a stage as the current position information can be determined, the telescopic magnification may be set corresponding to the detected distance. The distance to the capturing target may be detected by the capturing target sensor 120 (distance measurement sensor). The telescopic magnification may be set corresponding to the detected distance. Instead of the telescopic operation, the system controller 110 may command the captured image signal processing section 115 or the display image processing section 112 to perform an image enlargement process.

When the current position is a seashore or a mountain, the system controller 110 commands the image capturing control section 111 to perform an increased ultraviolet sensitivity image capturing operation, causes the display sections 2 to display an image as shown in FIG. 8B, and causes the user to recognize the dose of ultraviolet radiation.

In addition, the place name or the name of a facility, a store, or the like of a capturing target may be superimposed with a character image or text corresponding to the obtained information of the current position. Advertisement information, facility's guide information, and warning information of a surrounding area may be displayed on the display sections 102.

Figure 28B:
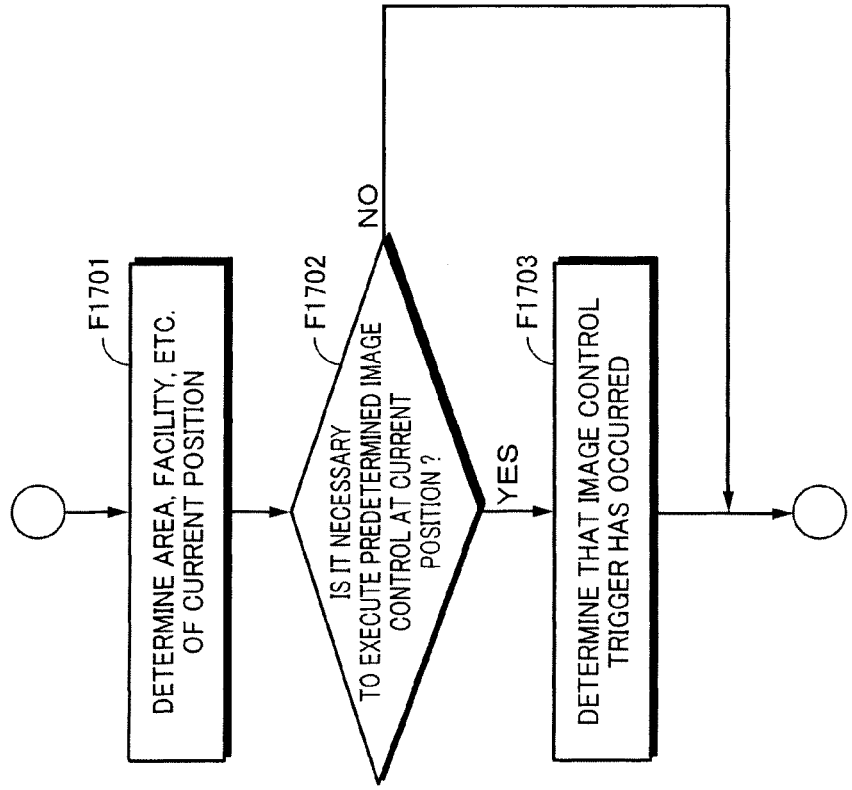

FIG. 28B shows an exemplary process of determining whether or not an image control trigger has occurred corresponding to information received by the GPS receiving section 121 and information received by the communication section 126. In particular, this exemplary process is performed while the increased infrared sensitivity image capturing operation is being performed.

While the image capturing section 103 is performing the increased infrared sensitivity image capturing operation, the flow advances from step F1710 to step F1711 shown in FIG. 28B.

At step F1711, the system controller 110 causes the communication section 126 to transmit information of latitude and longitude of the current position obtained by the GPS receiving section 121 to a network server or a device having a built-in map database, causes the server or device to retrieve information about the current position from the map database, and causes the communication section 126 to receive the information about the current position therefrom. When the image capturing and displaying apparatus 101 has a built-in map database, the system controller 110 retrieves information about the current position from the built-in map database corresponding to information of latitude and longitude received by the GPS receiving section 121.

When the system controller 110 has obtained information about the current position, the system controller 110 determines whether or not it is necessary to prohibit the increased infrared sensitivity image capturing operation at the current position.

When the determined result denotes that it is necessary to prohibit the increased infrared sensitivity image capturing operation at the current position, the flow advances from step F1712 to step F1713. At step F1713, the system controller 110 determines that an image control trigger that causes the increased infrared sensitivity image capturing operation to be completed has occurred.

When the determined result at step F1713 denotes that the image control trigger has occurred, the flow advances from step F104 to step F106 shown in FIG. 10. At step F106, the system controller 110 commands the image capturing control section 111 to complete the increased infrared sensitivity image capturing operation.

Since the increased infrared sensitivity image capturing operation is prohibited corresponding to the location, a special image capturing function such as the increased infrared sensitivity image capturing operation can be prevented from being improperly used.

Figure 29A:
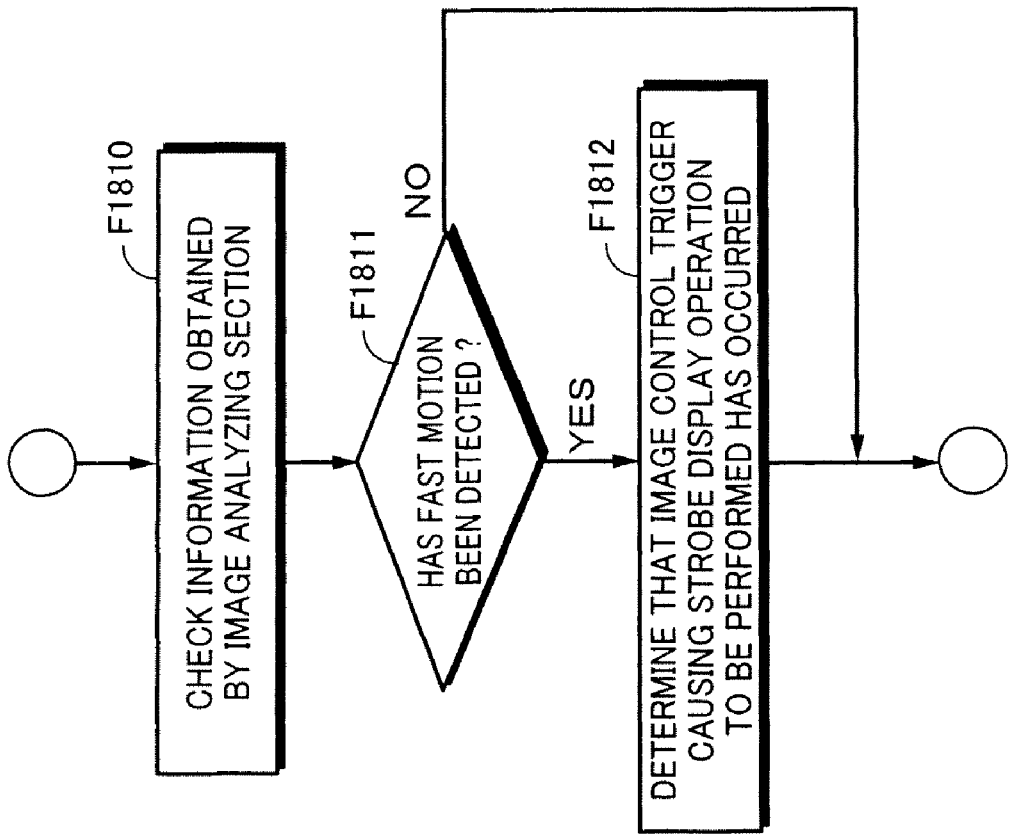
FIG. 29A and FIG. 29B are flow charts showing image control trigger determination processes according to the second embodiment of the present invention.

FIG. 29A shows an exemplary process of determining whether or not an image control trigger has occurred corresponding to information obtained by the image analyzing section 128.

At step F1801 shown in FIG. 29A, the system controller 110 monitors information obtained by the image analyzing section 128. The image analyzing section 128 detects whether or not a subject contains a target by analyzing a captured image.

When the analyzed result denotes that the captured image contains a target, the flow advances from step F1802 to step F1803. At step F1803, the system controller 110 determines that an image control trigger has occurred.

When the determined result at step F1803 denotes that an image control trigger has occurred, the flow advances from step F104 to step F106 shown in FIG. 10. At step F106, the system controller 110 commands the image capturing control section 111 and the display control section 114 to execute a predetermined image control.

Examples of the image control are as follows.

If a target is a bird, when it has been detected in the captured image, the system controller 110 may command the display image processing section 112 to perform a highlight display operation for the portion of the bird in the image as shown in FIG. 22A and FIG. 22B. In this case, when the user watches wild birds, he or she can easily find and follow them.

If a target is a cat and the user likes cats, when a cat has entered his or her field of vision, since the cat is highlighted in the displayed image, he or she can easily recognize it.

If a target is a person, when he or she has been detected in the captured image, the system controller 110 may command the display image processing section 112, the captured image signal processing section 115, or the image capturing section 103 to highlight, enlarge, or zoom up the portion of the person in the image.

If a target is a person, an animal, a building, or the like, only the target may be displayed and the background may be painted out.

Instead, when a person has been detected as a target, an image process of erasing only the person from the image may be performed. For example, an image of which people and artificial things such as cars are masked from a natural scene may be displayed. In this case, a process of filling pixel portions of the target may be performed by an interpolating process with surrounding pixels of the target to be masked.

In addition, an image effect operation such as a mosaic display operation may be performed for a target such as a person.

The process shown in FIG. 29A is performed corresponding to information obtained by the image analyzing section 128. Instead, if a target is a living subject such as a person or an animal, when a pyroelectric sensor as the capturing target sensor 120 has detected the target, the system controller 110 may determine that an image control trigger has occurred.

Figure 29B:
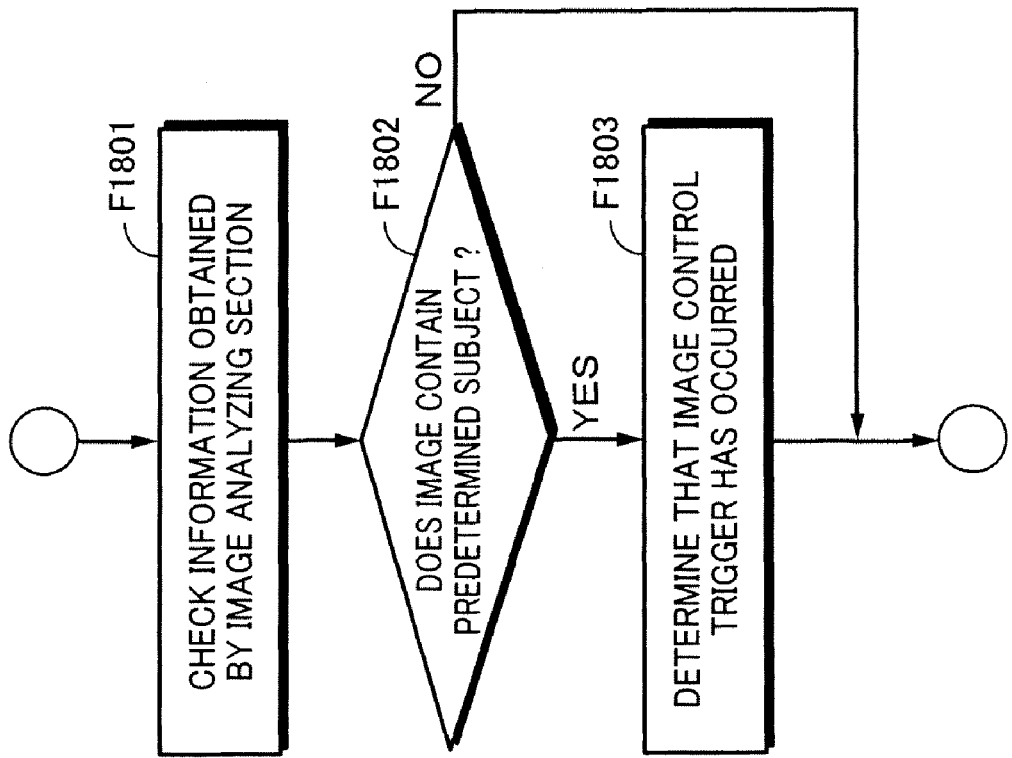

FIG. 29B shows an exemplary process of determining whether or not an image control trigger has occurred corresponding to information obtained by the image analyzing section 128.

At step F1810 shown in FIG. 29B, the system controller 110 monitors information obtained by the image analyzing section 128. The image analyzing section 128 detects whether or not a subject is moving fast by analyzing a captured image for example with the difference between frames of the captured image.

When the detected result denotes that the subject is moving fast, the flow advances from step F1811 to step F1812. At step F1812, the system controller 110 determines that an image control trigger that causes a strobe display operation to be performed has occurred.

When the determined result at step F1812 denotes that the image control trigger has occurred, the flow advances from step F104 to step F106 shown in FIG. 10. At step F106, the system controller 110 commands the display control section 114 to execute an image process such that an image as shown in FIG. 9C is displayed.

In this process, a strobe display operation is performed such that when the user is seeing a sports game, if a player is moving fast, he or she can see the motion of the player.

In this example, when a fast motion has been detected, a trigger that causes the strobe display operation to be performed occurs. Instead, a trigger that causes the display mode to be switched to a high frame rate display operation may occur. Instead, when a capturing target contains a fast motion, a trigger that causes the display mode to be switched to a zoom display mode or a highlight display mode may occur.

FIG. 30A shows an exemplary process of determining whether or not an image control trigger has occurred corresponding to information obtained by the image analyzing section 128. In this example, when a person has been captured, he or she is identified.

At step F1901 shown in FIG. 30A, the system controller 110 monitors information obtained by the image analyzing section 128. The image analyzing section 128 determines whether or not a subject contains the face of a person by analyzing a captured image. When the subject contains the face of a person, the image analyzing section 128 generates personal characteristic data from the image of the face. As described above, the personal characteristic data are for example the ratio (Ed/EN) of the distance EN between the center of the eyes and the nose and the distance Ed of the eyes and the ratio (Ed/EM) of the distance EM between the center of the eyes and the mouse and the distance Ed of the eyes.

When personal characteristic data have been extracted, the flow advances from step F1902 to step F1903. At step F1903, the system controller 110 retrieves personal information from a personal database corresponding to the personal characteristic data.

For example, the system controller 110 causes the communication section 126 to transmit personal characteristic data to a network server or a device having a built-in personal database, causes the server or device to retrieve personal information from the personal database, and causes the communication section 126 to receive the retrieved result therefrom. When the image capturing and displaying apparatus 101 has a built-in personal database, the system controller 110 may retrieve personal information from the personal database corresponding to the personal characteristic data.

When the external device or the system controller 110 has retrieved personal information of a predetermined person from the personal database, the flow advances from step F1904 to step F1905. At step F1905, the system controller 110 determines that an image control trigger that causes personal information to be displayed has occurred.

When the determined result denotes that the image control trigger has occurred, the flow advances from step F104 to step F106 shown in FIG. 10. At step F106, the system controller 110 commands the display control section 114 to for example superimpose the retrieved personal information on a captured image.

When the user sees a person whom the user has met or a famous person in people who are walking and the person or famous person has been registered to the personal database, the display sections 102 display information registered in the personal database (name, organization, place where the user has met, and so forth) along with the person's image. Thus, user can accurately recognize the person.

FIG. 30B shows an exemplary process of determining whether or not an image control trigger has occurred corresponding to information obtained by the image analyzing section 128. This process is performed when an image is not easy to see due to sunshine and shadow as shown in FIG. 21A.

At step F1910 shown in FIG. 30B, the system controller 110 monitors information obtained by the image analyzing section 128. The image analyzing section 128 detects whether or not a bright area and a dark area occur due to an insolation situation in a captured image by analyzing the captured image.

When the analyzed result denotes that there is a difference of sunshine and shadow in the image, the flow advances from step F1911 to step F1912. At step F1912, the system controller 110 determines that an image control trigger has occurred.

When the determined result at step F1912 denotes that an image control trigger has occurred, the flow advances from step F104 to step F106 shown in FIG. 10. At step F106, the system controller 110 commands the image capturing control section 111 and the display control section 114 to perform an image process or partially change the image capturing sensitivity such that the difference of sunshine and shade disappears. As a result, an image that is not much influenced by sunshine and shadow and that is easy to see is provided to the user as shown in FIG. 21B.

When an image contains a partial difference of brightness and darkness due to influence of lighting or the like in a house or a facility not due to influence of an insolation situation or when an image is partly unclear, the system controller 110 may command the image capturing control section 111 and the display control section 114 to partially adjust the brightness, image capturing sensitivity, contrast, and so forth.

In FIG. 23 to FIG. 30A and FIG. 30B, exemplary processes of determining whether or not an image control trigger has occurred at step F104 shown in FIG. 10 have been described. These exemplary processes may be applied to the processes of determining whether or not a monitor display state start trigger has occurred at step F102 shown in FIG. 10 and the processes of determining whether or not the a monitor display state completion trigger has occurred at step F105 shown in FIG. 10.

When the display state is the through state at step F101 shown in FIG. 10, like the exemplary process shown in FIG. 23, if a situation of which the surroundings are dark or too bright has been detected, it may be determined that a monitor display state start trigger and the through state may be switched to the monitor display state.

When the determined result denotes that it is necessary to adjust a capturing image due to a weather situation like the exemplary process shown in FIG. 24A, it may be determined that a monitor display state start trigger has occurred. In this case, in a predetermined weather situation, the monitor display function is executed.

When the determined result denotes that the surroundings are dark like the exemplary process shown in FIG. 24B, it may be determined that a monitor display state start trigger has occurred. In this case, when the surroundings are dark, the monitor display function can be automatically executed.

When a capturing target is far or near like the exemplary process shown in FIG. 25, it may be determined that a monitor display state start trigger has occurred.

When an image containing characters has been detected near the user like the exemplary process shown in FIG. 26, it may be determined that a monitor display state start trigger has occurred.

Like the exemplary process shown in FIG. 27, it may be determined that a monitor display state start trigger has occurred corresponding to a time zone.

When the current position is a predetermined location like the exemplary process shown in FIG. 28A, it may be determined that a monitor display state start trigger has occurred. In this case, the monitor display function can be executed corresponding to a predetermined place or the type of a facility.

When there is a predetermined target like the exemplary process shown in FIG. 29A, it may be determined that a monitor display state start trigger has occurred.

When a fast motion has been detected in a capturing target, like the exemplary process shown in FIG. 29B, it may be determined that a monitor display state start trigger has occurred.

When a predetermined person has been detected like the exemplary process shown in FIG. 30A, it may be determined that a monitor display state start trigger has occurred.

When there is a distribution of brightness and darkness in an image, like the exemplary process shown in FIG. 30B, it may be determined that a monitor display state start trigger has occurred.

In these exemplary processes, when it has been determined that a monitor display state start trigger has occurred, the flow advances to step F103 shown in FIG. 10. As a result, when the user has put on the image capturing and displaying apparatus 101 in the through state, without performing a special operation, the image capturing and displaying apparatus 101 operates in the monitor display state corresponding to a situation and the user can see an image in the monitor display state corresponding to the situation.

Likewise, it can be determined whether or not a monitor display state completion trigger has occurred.

In the exemplary process shown in FIG. 23, when it has been detected that the surroundings are dark or too bright, in a situation of which the surroundings are neither dark, nor too bright, it is determined that a monitor display state completion trigger has occurred and the display state may be restored to the through state.

In the exemplary process shown in FIG. 24A, it is determined whether or not it is necessary to adjust a capturing image due to a weather situation. When the determined result denotes that it is not necessary to adjust a capturing image, it may be determined that a monitor display state completion trigger has occurred and the display state may be restored to the through state.

Like the exemplary process shown in FIG. 24B, it may be determined whether or not the surroundings are dark. When the surroundings are not dark, it may be determined that a monitor display state completion trigger has occurred and the display state may be restored to the through state.

Like the exemplary process shown in FIG. 25, it may be determined whether a capturing target is far or near. When the determined result denotes that the capturing target is neither far, nor near, it may be determined that a monitor display state completion trigger has occurred and the display state may be restored to the through state.

Like the exemplary process shown in FIG. 26, when an image containing characters has been detected near the user, in a situation of which the image has not been detected, it may be determined that a monitor display state completion trigger has occurred and the display state may be restored to the through state.

Like the exemplary process shown in FIG. 27, it may be determined that a monitor display state completion trigger has occurred corresponding to the time zone, month and/or day, season, or the like.

Like the exemplary process shown in FIG. 28A, when the current position is a predetermined position, it may be determined that a monitor display state completion trigger has occurred. In this case, the image capturing function and monitor display function may be stopped corresponding to a predetermined location or the type of a facility.

Like the exemplary process shown in FIG. 28B, when an increased infrared sensitivity image capturing operation is stopped, it may be determined that a monitor display state completion trigger has occurred at step F1713 and the display state may be restored to the through state.

Like the exemplary process shown in FIG. 29A, when there is a predetermined subject, it may be determined that a monitor display state completion trigger has occurred and the display state may be restored to the through state. For example, in this case, a predetermined subject is prohibited from being captured and/or displayed in the monitor display state.

Instead, when the determined result denotes that there is no predetermined subject, it may be determined that a monitor display state completion trigger has occurred and the display state may be restored to the through state.

Like the exemplary process shown in FIG. 29B, when a fast motion of a capturing target has been detected, in a situation of which the fast motion has not been detected, it may be determined that a monitor display state completion trigger has occurred and the display state may be restored to the through state.

Like the exemplary process shown in FIG. 30A, when a predetermined person has been detected, it may be determined that a monitor display state completion trigger has occurred and the display state may be restored to the through state. In this case, the predetermined person is prohibited from being captured and/or displayed in the monitor display state.

Instead, when it has been determined that there is no predetermined person in the image, it may be determined that a monitor display state completion trigger has occurred and the display state may be restored to the through state.

Like the exemplary process shown in FIG. 30B, when a distribution of brightness and darkness has been detected in an image, in a situation of which the difference of brightness and darkness has not been detected, it may be determined that a monitor display state completion trigger has occurred and the display state may be restored to the through state.

In these exemplary processed, when it is determined that a monitor display state completion trigger has occurred and the flow returns to step F101 shown in FIG. 10, in a situation of which the user's necessity of the monitor display state decreases or disappears or a situation of which the monitor display function is prohibited, the display state may be automatically switched to the through state.

[6. Effects, Modifications, and Extensions of Second Embodiment]

According to this embodiment, an image captured by the image capturing section 103 disposed in the eye-glass type mounting unit or the headgear type mounting unit, namely a captured image in the direction of user's eyes as the direction of a subject, is displayed on the display sections 102 in front of his or her eyes. In this case, an image capturing operation or a display operation is controlled corresponding to information about the surrounding brightness, weather, a situation, recognition, a motion of a subject, a position, date and time, and so forth as an external situation. As a result, a situation of virtually assisting or extending user's visual ability can be created.

Since the image capturing operation of the image capturing section 103 and the changes of the display modes corresponding to signal processes of the captured image signal processing section 115 and the display image processing section 112 are performed corresponding to an external situation. Thus, no operational burden is imposed on the user. In addition, since the image capturing and displaying apparatus 101 is appropriately controlled, the user can use it with ease.

In addition, since the display sections 102 become the through state, which is transparent or semitransparent, by controlling its transmissivity, while the user puts on the mounting unit, it does not disturb his or her ordinary life. Thus, in the user's ordinary life, the benefits of the image capturing and displaying apparatus 101 according to this embodiment can be effectively used.

In this embodiment, the image capturing operation of the image capturing section 103 and the display modes accomplished by the signal processes of the captured image signal processing section 115 and the display image processing section 112 have been mainly described. For example, the switching of power on, power off, and standby, the sound volume, and the sound quality of a sound that is output from the sound output section 105 may be controlled corresponding to an external situation. For example, the sound volume may be adjusted corresponding to a time and/or a place. Instead, the surrounding sound volume may be detected and the output volume of the speaker may be adjusted corresponding to the detected surrounding sound volume.

The appearance and structure of the image capturing and displaying apparatus 101 are not limited to those shown in FIG. 1, FIG. 2, and FIG. 20. Instead, various modifications may be made.

For example, a storage section that stores an image signal captured by the image capturing section 103 and a transmission section that transmits the image signal to other devices may be disposed in the image capturing and displaying apparatus 101.

In addition to the image capturing section 103 as a source of an image that is displayed on the display sections 102, an input section and a receiving section that input an image from an external device may be disposed in the image capturing and displaying apparatus 101.

In this embodiment, an example of which the image capturing and displaying apparatus 101 is an eye-glass type mounting unit or a head mounting unit was described. However, as long as the image capturing and displaying apparatus captures an image in the direction of user's eyes and displays an image in front of his or her eyes, the apparatus may be any type such as a headphone type, a neckband type, an ear hanging type, or the like on which the user puts. Instead, the image capturing and displaying apparatus 101 may be a unit that is attached to eye-glasses, a visor, a headphone, or the like using a mounting member such as a clip.

It should be understood by those skilled in the art that various modifications, combinations, sub-combinations and alternations may occur depending on design requirements and other factors insofar as they are within the scope of the appended claims or the equivalents thereof.

What is claimed is:

1. An image capturing and displaying apparatus, comprising:
    image capturing means for capturing an image of a subject in a direction in which a user sees the subject;
    display means disposed in front of eyes of the user and for displaying the image captured by the image capturing means;
    user information obtaining means for obtaining information about a motion and a physical situation of the user; and
    control means for controlling an operation of the image capturing means or an operation of the display means corresponding to information obtained by the user information obtaining means, the control means variably controlling at least one of an image capturing sensitivity of the image capturing means, an infrared image capturing sensitivity of the image capturing means, an ultraviolet image capturing sensitivity of the image capturing means, and a frame rate of the image capturing means.

2. The image capturing and displaying apparatus as set forth in claim 1,
    wherein the control means determines a user wish or a user situation corresponding to information obtained by the user information obtaining means and controls the operation of the image capturing means or the operation of the display means corresponding to a determined result.

3. The image capturing and displaying apparatus as set forth in claim 1,
    wherein the display means is capable of switching a display state from a through state which is transparent or semitransparent to an image display state in which the image captured by the image capturing means is displayed and vice versa.

4. The image capturing and displaying apparatus as set forth in claim 1,
    wherein the user information obtaining means is a sensor which detects an acceleration, an angular velocity, or a vibration.

5. The image capturing and displaying apparatus as set forth in claim 1,
    wherein the user information obtaining means is a sensor which detects a motion of a head portion of the user, a motion of an arm portion of the user, a motion of a hand of the user, a motion of a leg portion of the user, or a motion of a whole body of the user.

6. The image capturing and displaying apparatus as set forth in claim 1,
    wherein the user information obtaining means is a sensor which detects a non-walking state, a walking state, and a running state of the user.

7. The image capturing and displaying apparatus as set forth in claim 1,
    wherein the user information obtaining means is a visual sensor which detects information of a visual sense of the user.

8. The image capturing and displaying apparatus as set forth in claim 1,
    wherein the user information obtaining means is a sensor which detects a visual line of the user, a focus distance of the user, a dilation of pupils of the user, an eye fundus pattern of the user, or a motion of eyelids of the user as information of a visual sense of the user.

9. The image capturing and displaying apparatus as set forth in claim 1,
    wherein the user information obtaining means is a biological sensor which detects biological information of the user.

10. The image capturing and displaying apparatus as set forth in claim 1,
    wherein the user information obtaining means is a sensor which detects heart rate information, pulse information, perspiration information, brain wave information, galvanic skin response information, blood pressure information, body temperature information, or respiratory activity information as biological information of the user.

11. The image capturing and displaying apparatus as set forth in claim 1,
    wherein the user information obtaining means is a biological sensor which detects information which represents a tense state of the user or an excited state of the user.

12. The image capturing and displaying apparatus as set forth in claim 1,
    wherein the user information obtaining means is formed as an input section which is capable of inputting at least eye sight information.

13. The image capturing and displaying apparatus as set forth in claim 1,
    wherein the control means controls the image capturing means to turn on and off an image capturing operation.

14. The image capturing and displaying apparatus as set forth in claim 1,
wherein the control means variably controls the image capturing means to perform image capturing operations from a telescopic image capturing operation to a wide angle image capturing operation.

15. The image capturing and displaying apparatus as set forth in claim 1,
wherein the control means controls a focus distance of the image capturing means.

16. The image capturing and displaying apparatus as set forth in claim 1,
wherein the control means controls an operation of an image capturing lens system of the image capturing means.

17. The image capturing and displaying apparatus as set forth in claim 1,
wherein the control means controls an operation of an image capturing signal processing section which processes a captured image signal obtained by an image sensor of the image capturing means.

18. The image capturing and displaying apparatus as set forth in claim 1,
wherein the display means is capable of switching a display state from a through state which is transparent or semitransparent to an image display state in which an image captured by the image capturing means is displayed and vice versa, and
wherein the control means controls the display means to switch the display state from the through state to the image display state and vice versa.

19. The image capturing and displaying apparatus as set forth in claim 1,
wherein the control means controls the display means to enlarge or reduce the image displayed thereon.

20. The image capturing and displaying apparatus as set forth in claim 1,
wherein the control means controls the display means to separate the image displayed thereon.

21. The image capturing and displaying apparatus as set forth in claim 1,
wherein the control means controls a display brightness of the image displayed on the display means.

22. The image capturing and displaying apparatus as set forth in claim 1,
wherein the control means controls a signal process of an image signal displayed on the display means.

23. The image capturing and displaying apparatus as set forth in claim 1, further comprising:
lighting means for lighting up the subject in the direction of the subject,
wherein the control means controls the lighting means to perform a lighting operation of the lighting means corresponding to information obtained by the user information obtaining means.

24. An image capturing and displaying method of an image capturing and displaying apparatus having image capturing means for capturing an image of a subject in a direction in which a user sees the subject, and display means disposed in front of eyes of the user and for displaying an image captured by the image capturing means, the method comprising the steps of:
obtaining information about a motion of the user or a physical situation of the user; and
controlling an operation of the image capturing means or an operation of the display means corresponding to the information obtained at the obtaining information step, the controlling step including at least one of controlling an image capturing sensitivity of the image capturing means, controlling an infrared image capturing sensitivity of the image capturing means, controlling an ultraviolet image capturing sensitivity of the image capturing means, and controlling a frame rate of the image capturing means.

* * * * *